United States Patent
Michaelson et al.

(10) Patent No.: US 6,469,664 B1
(45) Date of Patent: Oct. 22, 2002

(54) METHOD, APPARATUS, AND COMPUTER PROGRAM PRODUCTS FOR ALERTING SURFACE VESSELS TO HAZARDOUS CONDITIONS

(75) Inventors: Dave Michaelson, Redmond; Ratan Khatwa; Jeanne C. Suchodolski, both of Issaquah, all of WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/606,777

(22) Filed: Jun. 26, 2000

Related U.S. Application Data
(60) Provisional application No. 60/158,255, filed on Oct. 5, 1999.

(51) Int. Cl.$^7$ .............................................. H04B 7/185
(52) U.S. Cl. ................................. 342/357.13; 367/909
(58) Field of Search ........................... 367/909, 99, 128; 342/357.13; 701/208

(56) References Cited

U.S. PATENT DOCUMENTS

| | | | |
|---|---|---|---|
| 3,715,718 A | 2/1973 | Astengo ..................... | 340/970 |
| 3,925,751 A | 12/1975 | Bateman et al. ............ | 340/967 |
| 3,934,221 A | 1/1976 | Bateman et al. ............ | 340/970 |
| 3,934,222 A | 1/1976 | Bateman et al. ............ | 340/970 |
| 3,936,796 A | 2/1976 | Bateman et al. ............ | 340/970 |
| 3,944,968 A | 3/1976 | Bateman et al. ............ | 340/970 |
| 3,947,808 A | 3/1976 | Bateman ..................... | 340/970 |
| 3,947,810 A | 3/1976 | Bateman et al. ............ | 340/970 |
| 3,958,218 A | 5/1976 | Bateman ..................... | 340/970 |
| 3,958,219 A | 5/1976 | Bateman ..................... | 340/970 |
| 4,030,065 A | 6/1977 | Bateman ..................... | 340/970 |
| 4,060,793 A | 11/1977 | Bateman ..................... | 340/970 |

(List continued on next page.)

FOREIGN PATENT DOCUMENTS

| | | | |
|---|---|---|---|
| CA | 1033828 | 6/1978 | |
| DE | 4304561 A | 8/1994 | |
| DE | 4327706 A1 | 2/1995 | |
| DE | 4327890 | 3/1995 | ........... G01C/21/20 |
| DE | 4423233 | 1/1996 | ........... G01C/21/00 |
| DE | 19747234 | 4/1999 | ........... B36B/49/00 |
| EP | 0790487 A2 | 8/1987 | |
| FR | 2689668 | 10/1993 | |
| FR | 2721130 | 12/1995 | |
| GB | 2 266 286 A | 10/1993 | |
| JP | 408253194 A | * 10/1996 | |
| WO | WO 85/03566 | 8/1985 | |

OTHER PUBLICATIONS

Baldwin et al. "GPS–Based Terrain Avoidance Systems—A Solution for General Aviation Controlled Flight into Terrain," *Rannoch Corporation*, (date unknown).

Bateman, "How to Terrain–proof the World's Airline Fleet," *Sunstrand Data Control. Flight Safety Foundation*, 44$^{th}$ IASS, Singapore, 1991.

(List continued on next page.)

*Primary Examiner*—Daniel T. Pihulic

(57) ABSTRACT

A navigational system for surface vessels that provides warning of impending grounding occurrences. A data base of bottom contours and submerged obstructions is compared to various indicators of the surface vessel's position and motion to provide alerts and to display bottom hazards ahead of the vessel.

26 Claims, 31 Drawing Sheets

U.S. PATENT DOCUMENTS

| | | | |
|---|---|---|---|
| 4,063,073 A | 12/1977 | Strayer | |
| 4,215,334 A | 7/1980 | Bateman | 340/970 |
| 4,224,669 A | 9/1980 | Brame | |
| 4,319,218 A | 3/1982 | Bateman | 340/970 |
| 4,484,192 A | 11/1984 | Seitz et al. | 340/995 |
| 4,567,483 A | 1/1986 | Bateman et al. | 340/970 |
| 4,642,775 A | 2/1987 | Cline et al. | |
| 4,646,244 A | 2/1987 | Bateman et al. | |
| 4,675,823 A | 6/1987 | Noland | |
| 4,835,537 A | 5/1989 | Manion | 340/961 |
| 4,894,655 A | 1/1990 | Joguet et al. | 340/988 |
| 4,903,212 A | 2/1990 | Yokouchi et al. | |
| 4,912,645 A | 3/1990 | Kakihara et al. | |
| 4,914,436 A | 4/1990 | Bateman et al. | 340/970 |
| 4,914,733 A | 4/1990 | Gralnick | 340/961 |
| 4,916,448 A | 4/1990 | Thor | 340/970 |
| 4,924,401 A | 5/1990 | Bice et al. | |
| 4,947,164 A | 8/1990 | Bateman | 340/968 |
| 4,954,959 A | 9/1990 | Moroto et al. | |
| 4,987,413 A | 1/1991 | Grove | 340/970 |
| 5,086,396 A | 2/1992 | Waruszewski, Jr. | |
| 5,136,512 A | 8/1992 | Le Borne | |
| 5,140,532 A | 8/1992 | Beckwith, Jr. et al. | |
| 5,153,588 A | 10/1992 | Muller | 340/968 |
| 5,155,688 A | 10/1992 | Tanaka et al. | |
| 5,157,615 A | 10/1992 | Brodegard | |
| 5,196,847 A | 3/1993 | Bateman | 340/970 |
| 5,202,690 A | 4/1993 | Frederick | 342/26 |
| 5,220,322 A | 6/1993 | Bateman et al. | 370/970 |
| 5,252,978 A | 10/1993 | Priestley | 342/29 |
| 5,257,195 A | 10/1993 | Hirata | |
| 5,265,025 A | 11/1993 | Hirata | |
| 5,285,391 A | 2/1994 | Smith, Jr. et al. | |
| 5,293,163 A | 3/1994 | Kakihara et al. | 340/995 |
| 5,293,318 A | 3/1994 | Fukushima | |
| 5,337,242 A | 8/1994 | Yamamoto et al. | |
| 5,400,300 A * | 3/1995 | Bick et al. | 367/909 |
| 5,414,631 A | 5/1995 | Denoize et al. | |
| 5,442,556 A | 8/1995 | Boyes et al. | |
| 5,486,821 A | 1/1996 | Stevens et al. | 340/970 |
| 5,488,563 A | 1/1996 | Chazelle et al. | |
| 5,495,249 A | 2/1996 | Chazelle et al. | 342/36 |
| 5,519,392 A | 5/1996 | Oder et al. | 340/995 |
| 5,526,000 A | 6/1996 | Chazelle et al. | 342/407 |
| 5,581,259 A | 12/1996 | Schipper | 342/451 |
| 5,608,392 A | 3/1997 | Faivre et al. | 340/967 |
| 5,638,282 A | 6/1997 | Chazelle et al. | |
| 5,661,486 A | 8/1997 | Faivre et al. | 342/33 |
| 5,677,842 A | 10/1997 | Denoize et al. | |
| 5,798,712 A | 8/1998 | Coquin | 340/970 |

OTHER PUBLICATIONS

Bennett and Cockburn, "Pilot Monitoring of Display Enhancements Generated From A Digital Data Base," *AGARD Conference Proceedings No. 456*, 1990.

Bennett, "The Use of Digital Map Data to Provide Enhanced Navigation and Displays for Poor Weather Penetration and Recovery," *GEC Marconi Avionics*, 1993.

Bice, "Development of an Automated Ground Collision Avoidance System Using A Digital Terrain Database," *Wright Patterson AFB*, 1989.

DiPadua et al., "Comparison of the General Dynamics Ground Clobber Algorithm with the GCAS and Laws Algorithms," *Crew Station Design Facility, Wright Patterson AFB*, 1988.

Fitzgerald and Brunner, "Use of High–Fidelity Simulation in the Development of an F/A–18 Active Ground Collision Avoidance System," *SAE International*, 1992.

Fitzsimmons, "First moves towards an "intelligent" GPWS," *Interavia/Aerospace World*, 1993.

Grey and Dale, "Advances in Techniques and Technologies for Air Vehicle Navigation and Guidance," *NATO Advisory Group for Aerospace Research and Development (AGARD)*, Guidance and Control Panel 48$^{th}$ Symposium, 1989.

Hewitt, "The Use of Terrain Databased for Avionic Systems," *The Institution of Electrical Engineers*, 1995.

Hopkins et al., "Quo Vadis?," *Flight International 11–17*:37–40, Mar., 1992.

"GCAS—Past, Present and Future of Alert Systems for Abnormal Closure to Ground," *Abstract*, 1993, translation by Kei Kino. (Japanese Article with English Translation).

Kuchar and Hansman, Jr., "Part–Task Simulator Evaluations of Advanced Terrrain Display," Preprints, SAE Aerotech Conference and Exposition, Anaheim, CA, 1993.

Lawrence, "Modern Inertial Technology," Springer–Verlag New York, Inc., 1993.

LeBorn, "A Generic Collision Avoidance System for Tactical Aircraft," *Cubic Defense Systems*, San Diego, California. IEEE National Aerospace and Electronics Conference, 1988.

Moller and Sachs, "Synthetic Vision for Enhancing Poor Visibility Flight Operations," *IEEE AES Systems*:27–42, 1994.

Rueb, et al., "Evaluation of the C/EC/KC–135 Ground Collision Avoidance System (GCAS) (Study 2)," *Integrated Engineering and Tech. Management Directorate*, Wright-Patterson AFB, Final Report, 1993.

Shah, "Ground Collision Warning System Performance Criteria for High Maneuverability Aircraft," *Flight Stability and Control Branch* Wright Patterson AFB, 1988.

Stevens, "Terprom Helps Low–Altitude Flight,: Terrain_Navigation System for Flying at Low Height," *Elektronica* 1986, (Dutch) w/English Transl.

"Safety Through Interactions and International Standards," *Proceedings of the Flight Safety Foundation+e,gra +ee ,* 46$^{th}$ Annual International Air Safety Seminar, Kuala Lumpuir, Malaysia, 1993.

Williams and Mitchell, "Effects of Integrated Flight Path and Terrain Displays on Controlled Flight into Terrain," Center for Human–Machine Systems Research, School of Industrial and Systems Engineering, Georgia Institute of Technology.

Young, "Warning System Concepts to Prevent Controlled Flight Into Terrain (CFIT)," *Defense Systems & Electronics Group*, Texas Instruments, Inc. IEEE, 1993.

"BAE Terrain Software Bound for USF–16," *Flight International*, Aug., 1993, Computer Printout.

"Technology and Air Attack," *Asian Defense Journal*, 1993, Computer Printout.

The F–16 Digital Terrain System, British Aerospace, The Institute of Electrical Engineers, 1995.

Fitzsimons, "Upgrade Classics—Navigating by Numbers," Defense System & Modernisation (DSM), Jun. 01, 1997, p. 11, v.10, No. 02, Computer Printout.

"Terrain Database and Their Use In Navigation and Collision Avoidance," Institute of Electrical Engineers, Electronics Division Colloquim, Professional Group E15, Radar Sonar and Navigation Systems, *Digest No. 1995/066*, 1995, paper by Allerton.

Kuchar and Hansman, Jr., "Part–Task Simulation Study of Candidate Terrain Alerting Displays," Department of Aeronautics and Astronautics, Massachusetts Institute of Technology, Jun. 30, 1993.

Kuchar and Hansman, Jr., "Advanced Terrain Displays for Transport Category Aircraft," ASL, Department of Aeronautics & Astronautics, Massachusetts Institute of Technology, Aug. 23, 1991.

"The Future Flight Deck," The Flight Operations Group of the Royal Aeronautical Society and The Guild of Air Pilots and Air Navigators of London.

Hewitt et al., "A Ground and Obstacle Collision Technique (GOCAT)," *IEEE*, May, 1991.

Moore, "We Have the Technology," *Flying Safety*, Jun., 1992.

Hughes, "Glass Cockpit Study Reveals Human Factors Problems," *Aviation Week & Space Technology*, Aug. 7, 1989.

Hoffman and Burnham, "Airborne Electronic Map systems," *IEEE*, 769–772, 1981.

Burnham and Kline, "Airborne Electronic Terrain Map System, Part 2–Applications," *IEEE*, 786–789, 1981.

Sander, "Algorithms for an Adaptive Dynamic Window in Electronic Map systems," Air Force Wright Aeronautical Laboratories.

Weber and Opttek, "Airborne Electronic Terrain Map System," *IEEE*, 773–778, 1981.

Small, "The Electronic Terrain Map—A New Avionics Integrator –," Avionics Laboratory, Wright–Patterson Air Force Base, Ohio, 356–359.

Tang and Mealy, "Application of Multiple Model Estimation Techniques to a Recursive Terrain Height Correlation System," *IEEE*, 757–764, 1981.

Woodward and Hoover, "Passive Terrain Following Using Stored Map and Global Positioning System," *IEEE*, 779–785, 1981.

"Air Force Evaluating Model of Electronic Map Technology," *Aviation Week & space Technology*, 76, Dec. 19, 1983.

Kuchar and Hansman, Jr., "An Exploratory Study of Plan-View Terrain Displays for Air Carrier Operations," *The International Journal of Aviation Psychology*, 3(1):39–54, 1993.

Paper re: Proceedings of the National Technical Meeting, The Institute of Navigation, Anaheim, California dated Jan. 20–23, 1987 (4 pages).

Paper re: A New Approach to CFIT Prevention: GCAS Ground Collision Avoidance System, Dassault Electronique, Rockwell Avionics, Author: Jean–Francis Manfroy and Lothar J. Taylor dated Nov. 1995 (12 pages).

Proctor, "Avionics Unit Eyes Expanded Markets," *Aviation Week & Space Technology*, Aug. 15, 1994, p. 41.

Proctor, "Terrain Alert Graphics Tested on cockpit Displays," *Aviation Week & Space Technology, Aug. 8, 1994*, p. 51.

Kerrill, Tamara, "Satellite–Guided Airplane Flies Right Into the Future," *Chicago Sun–Times*, Oct. 28, 1994, p. 22.

Malm, Richard, "Engineers Can Tap Into Global Positioning System" *Engineering Times*, Apr., 1995, pp. 11–14.

GCAS Publication, provided by A/S Library Services, Source and Date Unknown, pp. 185–190.

Wilson, Squire and Seakins, University of Southampton, UK "Enhanced Preliminary Design Ship Manoeuvring Simulator Techniques," 40–51.

Fujino, Kagemoto, Ishii, and Kato, "Prediction of Stopping Manoeuvres of a Ship in Shallow Water," *Manoeuvring and Control of Marine Craft*, 101–116.

McCallum, "Practical Ship Manoeuvring Models for Real Ship Manoeuvring Problems," *Manoeuvring and Control of Marine Craft*, 52–72.

Francis, Dove and Pourzanjani, "Development of a Four Degrees of Freedom Linear Ship Manoeuvring Mathematical Model," *Manoeuvring and Control of Marine Craft*, 133–144.

Bate and Sutton, "Investigation of Performance Characteristics of High Speed Planing Craft," *Manoeuvring and Control of Marine Craft*, 203–213.

Whalen and Kahn, "A Digital Simulation Program For Advanced Naval Vehicle Dynamics," provided by LindaHall Library, Source and date unknown, 515–519.

Chudley, Dove and Tapp, "A Review of Mathematical Models Used in Ship Manoeuvres," *Computer Methods In Marine and Offshore Engineering*, 243–258.

Rawson and Tupper, "Chapter 13—Manoeuvrability," *Basic Ship Theory*, vol. 2, fourth edition, 533–557.

Price and Bishop, *Probabilistic Theory of Ship Dynamics*, Chapman and Hall, 221–262.

*General Principals of Ship Control*, chapter 9, pp. 213–232.

Davis, "Analysis And Control Of Ship Motion In A Random Seaway," Massachusetts Institute of Technology, Jun. 1961, 10–17.

"SIMAN—A Program for Estimating A ships Manoeuvring and Operational Capabilities," www.marintek.sintef.no/marintek_eks/software/SIMAN/siman.htm.

Paper, Underkeel Clearance And Reduced Visibility, chapter XIV, 4 pages, http:linksia.com demos marex hsunderk.htm.

U.S. Department of Transportation, United States Coast Guard, "Implementation of Operational Measures For Existing Tank Vessels Without Double Hulls Until 2015," *Navigation and Vessel Inspection Circular No. 2–97*, 5 pages, www.uscg.mil/hq/g–m/nvic/2_97/n2–97.htm.

"Minimum under–keel Clearance", 33 CFR 157.455, Chapter I, Part 157, Subpart G, 3 pages.

"IMO Bibliography of Maritime Literature," printed May 15, 2000, 27 pages, www.*imo*org/imo/Library/literature/sep99lit.htm.

Various Notes regarding Shipwrecks—dates varied, source unknown.

* cited by examiner $\vec{U}$=VELOCITY VECTOR

| 200 | 200 | 300 | 300 | 300 | 300 | 300 | 300 |
|-----|-----|-----|-----|-----|-----|-----|-----|
| 100 | 200 | 200 | 300 | 300 | 300 | 300 | 300 |
| 100 | 200 | 200 | 300 | 300 | 300 | 200 | 200 |
| 200 | 200 | 200 | 200 | 300 | 300 | 200 | 200 |
| 300 | 200 | 200 | 200 | 300 | 300 | 300 | 300 |
| 500 | 300 | 300 | 300 | 300 | 300 | 300 | 300 |
| 500 | 400 | 400 | 300 | 300 | 300 | 300 | 300 |
| 500 | 500 | 500 | 400 | 300 | 300 | 300 | 300 |

LEAST DENSE PATTERN
4 OF 64 = 1/16
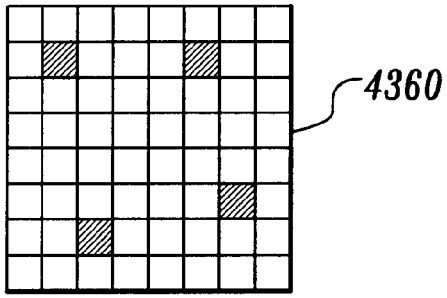
MEDIUM DENSE PATTERN
16 OF 64 = 1/4
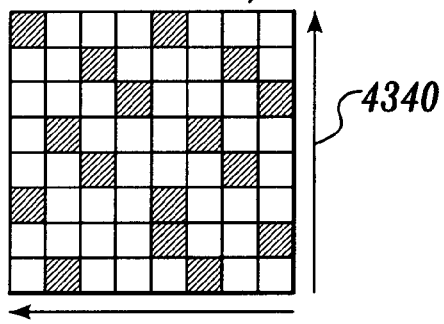
DENSEST PATTERN
32 OF 64 = 1/2
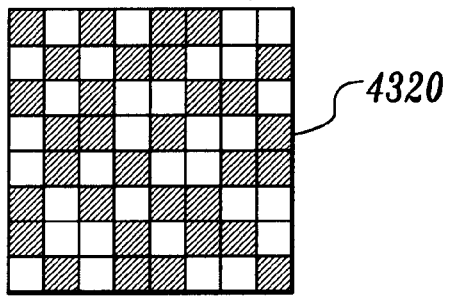
*Fig.41*

METHOD, APPARATUS, AND COMPUTER PROGRAM PRODUCTS FOR ALERTING SURFACE VESSELS TO HAZARDOUS CONDITIONS

BACKGROUND OF THE INVENTION

This application claims priority from co-pending application Ser. No. 60/158,255 filed Oct. 5, 1999 for "Ocean Bottom Proximity Warning Sensor" the complete disclosure of which is incorporated herein by reference.

This invention relates to the prevention of grounding accidents for marine vessels. Grounding accidents in the global shipping fleet are a major source of property loss, costing the industry an estimated $400MM annually in insurance liability on global shipping trade of more than $200 billion. U.S. Coast Guard data from the years 1996–1997 indicate that each year, 1170 vessels (towed barges and tugs counted individually) are involved in groundings, in a total of 758 annual incidents on U.S. shipping lanes and waterways.

Despite this significant adverse impact on shipping and commercial fleets worldwide, there exist limited systems for prevention of grounding accidents. Most ships are equipped with sonar to monitor the actual depth of the water beneath the hull. However, this device is a reactive system that provides only a current status and does not protect against anticipated conditions present along the instantaneous track of the boat. This device also requires active monitoring by ship's crew to detect a hazardous condition. In military operations, use of the sonar may inadvertently betray the boat's location to enemy vessels.

Vessels may also be equipped with moving map displays that show the vessel's progress relative to a stored nautical chart. These systems also require the crew to actively monitor the vessel's progress against the chart and to proactively identify hazardous conditions.

In the aviation industry, various systems have been developed that provide warnings and advisory indications to the pilot of aircraft approaching hazardous terrain. Among such systems are systems generally known as ground proximity warning systems (GPWS) which monitor the flight conditions of an aircraft and provide a warning if flight conditions are such that inadvertent contact with terrain is imminent. Among the flight conditions normally monitored by such systems are radio altitude and rate, barometric altitude and rate, air speed, flap and gear positions. These parameters are monitored and an advisory signal and/or warning signal is generated when the relationship between the parameters is such that terrain impact is likely to occur. Typical examples of such systems are disclosed in U.S. Pat. Nos. 3,715,718; 3,936,796; 3,958,218; 3,944,968; 3,947,808; 3,947,810; 3,934,221; 3,958,219; 3,925,751; 3,934,222; 4,060,793; 4,030,065; 4,215,334; and 4,319,218, all assigned to the same assignee as the assignee of the present invention and hereby incorporated by reference. U.S. Pat. Nos. 5,488,563 and 5,839,080 to Mueller et al. each disclose a controlled flight into terrain alerting system that utilizes a terrain database in conjunction with aircraft dynamics to alert pilots of dangerous proximity to terrain.

However, such systems are designed for aircraft wherein the escape maneuver chiefly consists of adding full power and pitching the aircraft up to initiate a climb. This type of escape from grounding is not available to a surface vessel. U.S. Pat. No. 5,488,563 to Chazelle describes a ground proximity warning system for aircraft that suggests a turning maneuver to escape terrain. However, Chazelle does not disclose or suggest how such a system could be applied to ships, submarines or boats. U.S. Pat. No. 4,646,244 to Bateman discloses a terrain alerting methodology for submarines and aircraft. However, Bateman does not disclose terrain alerts for surface ships or terrain avoidance maneuvers.

SUMMARY OF THE INVENTION

The present invention includes recognition of the need to provide marine vessels with an alert of conditions that may lead to an inadvertent grounding and/or impact with obstacles in the vessel's path. The alerts provided according to the present invention may be reactive and/or predictive alerts.

According to one aspect of the present invention, the ship's sonar is utilized to provide an indication of impending impact with bottom obstructions based upon rate of change of water depth beneath the keel.

According to another aspect of the invention, a ocean bottom terrain data base is provided. The ship's position and anticipated track are compared to the ocean bottom terrain data and an alert is provided when a hazardous condition is detected.

According to another aspect of the invention, the terrain database includes an obstruction or obstacle data base. The ship maximum height and anticipated track can be compared, for example, with the clearance height required under a bridge obstacle, and an alert provided to the crew if a collision hazard exists.

According to another aspect of the invention, ocean bottom hazards are displayed on a visual display representative of a plan view of the ocean or waterway bottom terrain. Preferably the terrain is displayed in various colors and/or dot pattern densities depending upon the degree of grounding hazard to the vessel and/or to the degree of obstacle collison hazard. In a preferred embodiment of the invention, the terrain that does not present a hazard to the vessel is displayed in a first color, terrain that is a potential hazard to the vessel is displayed as second color and terrain which represents an immediate and actual danger to the vessel is colored a third color.

More specifically, the bottom proximity awareness system comprises a navigational system configured to determine latitude, longitude, depth, point of intended movement, velocity, acceleration and/or speed of a vessel employing the system. The navigational system generates signals in response to the listed parameters. The system further comprises: a terrain database comprising depth data for underwater terrain and obstacle information as well as for port facilities; a processor configured to identify from the terrain database depth data within a range of the vessel; warning envelope generator; and a warning device. Further advantages and features of the present invention will be described in detail below.

BRIEF DESCRIPTION OF THE DRAWINGS

FIG. 35 illustrates data blocks constructed according to a preferred embodiment of the present invention;

FIG. 41 is a diagram of the different fractal patterns used to provide the variable density display of non-hazardous display indications;

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

1.0 Overview

Figure 1:
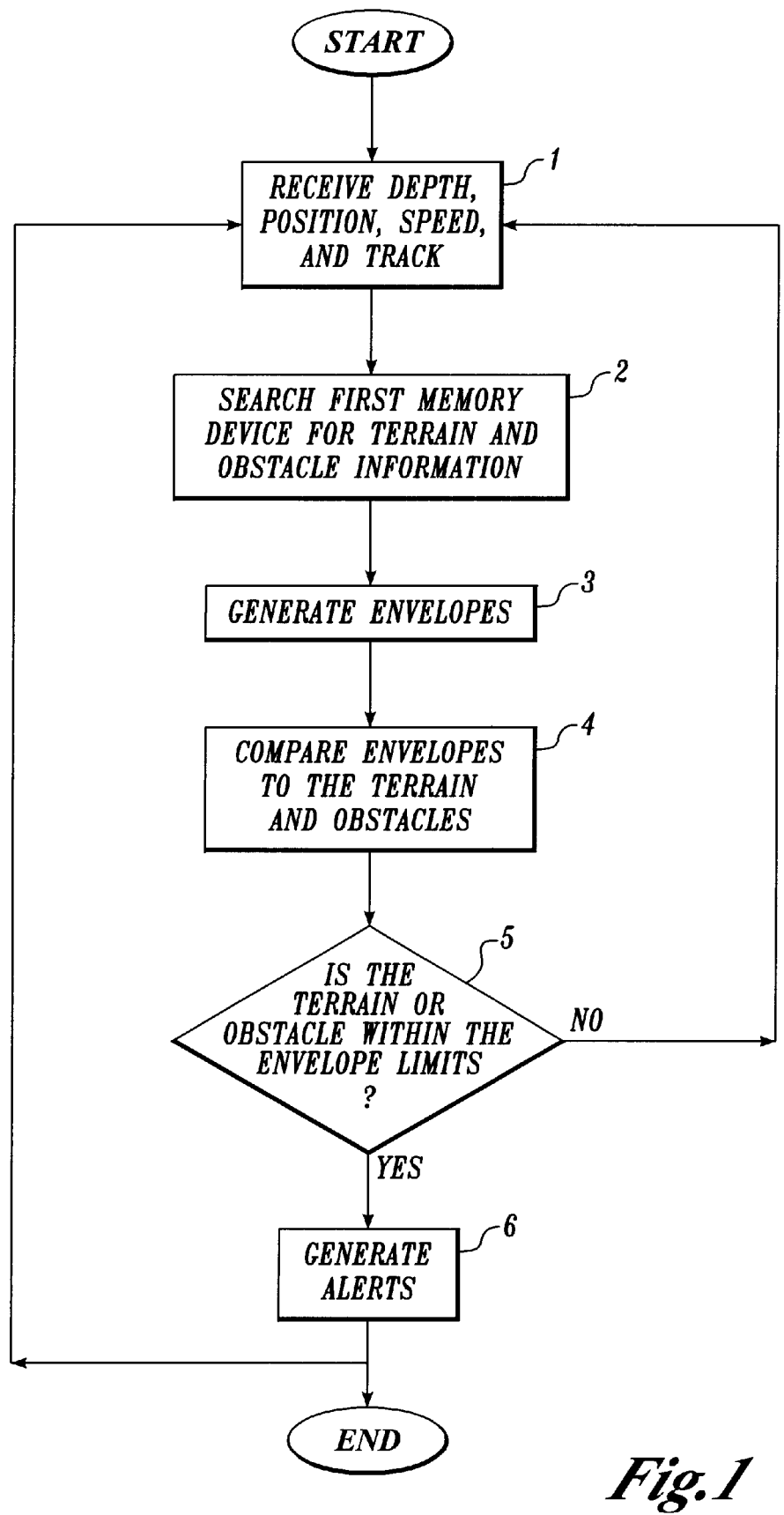
FIG. 1 is a top level flow chart illustrating operation of a warning system in accordance with a preferred embodiment of the invention.

FIG. 1 contains a flow diagram illustrating the conceptual theory and operation of the present invention. In FIG. 1, symbols representative of the depth and velocity/speed of the vessel, the track of the vessel, and the position of the vessel are received in step 1. In step 2, search logic, based on the position of the vessel, retrieves terrain and obstacle data relating to terrain and obstacles that are near the vessel current position. In step 3, based on the position, track, and speed of the marine vessel and the position and depth of terrain and obstacles proximate to the marine vessel, a caution and warning envelope generator generates envelopes either about the vessel or about the surrounding terrain and obstacles. Optionally, and not shown in FIG. 1, the alert may be generated by comparing the closure rate of terrain with a predetermined closure rate limit as described more fully below. The envelopes represent a proximity limitation between the surrounding terrain and obstacles and the marine vessel, such that if the region between the marine vessel and the terrain is less than the envelopes, the marine vessel is in danger of colliding with the terrain.

Steps 4, 5 and 6, compare the position of the marine vessel and the position of the terrain and obstacles with the envelopes. If the marine vessel and the terrain are in closer proximity to each other than the area defined by the envelope, either both or one of a aural or a visual indication to the crew is provided that the vessel is in danger of colliding with the terrain. Optionally, step 6 may further include avoidance maneuver guidance. In addition, based on the generated envelopes and the output of the comparison step, appropriate displays may be provided to the crew illustrating the proximity of the marine vessel to the surrounding terrain and obstacles and alerting of any potential dangers. As such, the apparatus, methods, and computer program products of the present invention provide the user of a marine vessel information concerning the proximity of surrounding terrain such that the user may operate the marine vessel with reduced probability of collision or grounding.

Figure 2:
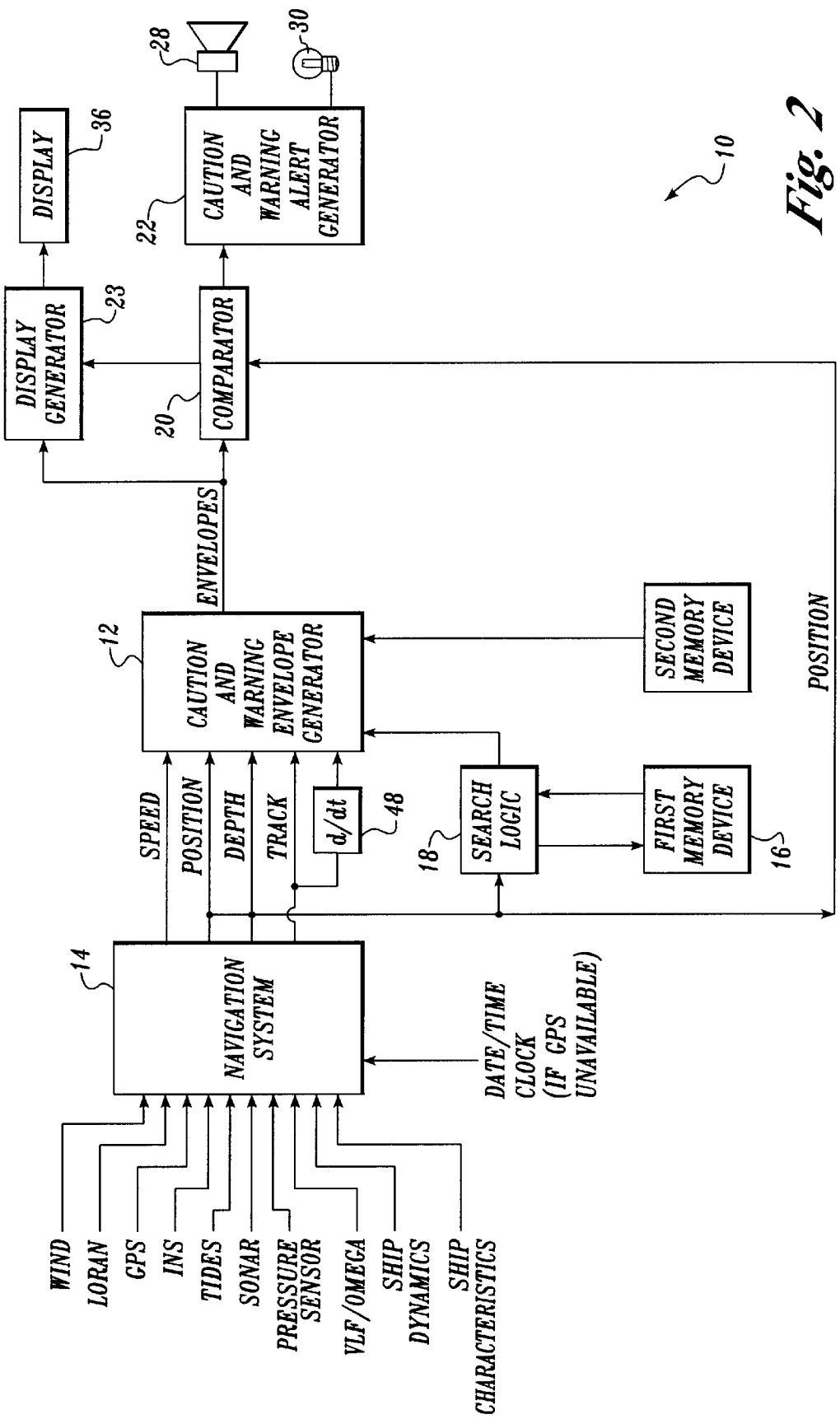
FIG. 2 is a block diagram of a warning system according to a preferred embodiment of the invention.

FIG. 2 contains a block diagram of an apparatus for providing terrain proximity alerts to a marine vessel according to one embodiment of the present invention. The apparatus of this embodiment of the present invention includes an alert generator 10 having a caution and warning envelope generator 12 for generating caution and warning envelopes. The apparatus of the present invention also includes a navigation system 14. The navigation system provides the speed/velocity of the marine vessel, the predicted track of the marine vessel, and the position of the marine vessel, (e.g., latitude and longitude) as well as corrections for tides, currents, ship dynamics and keel depth. Apparatus 10 also includes a first memory device 16 containing coordinate positions of terrain and obstacles, as well as the elevation or depth of the terrain for all or a portion of the global positions of the earth. Additionally, the apparatus of the present invention further includes search logic 18 for searching the first memory device and retrieving terrain data for terrain that is in proximity to the marine vessel.

A comparator 20 is coupled to the output of navigation system 14 and the caution and warning envelope generator 12. Comparator 20 receives the caution and warning envelopes generated from the caution and warning envelope generator and the coordinates of the position of the marine vessel from the navigation system. Based on the position of the marine vessel and the envelopes generated by the caution and warning envelope generator, the comparator determines whether the space between the marine vessel and the terrain proximate to the marine vessel is less than the boundaries defined by at least one of the caution and warning envelopes generated by the caution and warning envelope generator.

To notify the user of the proximity of terrain and obstacles to the marine vessel, the apparatus of the present invention further includes a caution and warning alert generator 22 connected to the comparator 20 for indicating to the user either aurally by a speaker 28 and/or visually by a lamp 30 of approaching terrain. Additionally, the apparatus of the present invention may also include a display generator 23 connected to the output of caution and warning envelope generator 12. Display generator 23 generates attitude and map displays that are applied to a display 36. Display generator 23 controls display 26 to display either or both a side view image showing the terrain and obstacles that lie in the path forward of the track of the marine vessel and a top view of the terrain below the marine vessel.

Signals from comparator 20 may also be applied to display generator 23. These signals permit display generator 23 to indicate whether the distance between the marine vessel and terrain is less than the boundaries defined by the caution and warning envelopes. The terrain threat severity is typically illustrated in the displays by changing the color and/or dot pattern density of the terrain displayed by the display to the user. The elements features and operation of the present invention described briefly above, will now be described in detail below.

In addition to providing apparatus and methods, the present invention also provides computer program products for providing a terrain proximity warning system for use in marine vessels. The computer program products have a computer readable storage medium having computer readable program code means embodied in the medium. In FIG. 2, the computer readable storage medium may be part of the memory device 16, and the alert generator 10 of the present invention may implement the computer readable program code means to provide a terrain proximity warning system for use in marine vessels as described in the various embodiments above.

The computer-readable program code means includes first computer instruction means for comparing a current coordinate position of the vessel to a prestored coordinate position of terrain proximate to the vessel and second computer instruction means for providing an alert when the vessel is in a potentially hazardous proximity to the terrain as defined by a predetermined criterion to be described in detail below.

In some embodiments, the computer-readable program code means further includes computer instruction means for storing a database containing depth data for different global coordinates of the earth. In this embodiment, the first computer instruction means determines the current coordinate position of the vessel and searches the memory device for the prestored coordinate position of terrain proximate to the vessel. The computer-readable program code means may further include a computer instruction means for generating an envelope relative to at least one of the vessel and the proximate terrain. The first computer instruction means determines if the other of the vessel and the terrain penetrates the envelope, and the second computer instruction means provides an alert if the envelope is penetrated.

FIGS. 1 and 2 are flowchart block diagram and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations of FIGS. 1 and 2, and combinations of blocks or steps in the block diagram, flowchart or control flow illustrations, can be implemented by special purpose hardware-based computer systems which perform the specified functions or steps, or combinations of special purpose hardware and computer instructions 2.0 Navigation System and Ship Dynamics The present invention receives various inputs and together with stored models of the vessel's characteristics and performance, outputs data useful for computing the bottom proximity alert envelopes. In the block diagram of FIG. 2, these operations may be performed by Navigation system 14. The ship's current position may be obtained by reference to onboard navigation systems such as a global positioning system (GPS), inertial navigation system (INS), LORAN, and/or VLF/OMEGA. Optionally, a navigation fix can be manually entered into the ship's navigation system or autopilot by the crew and this information supplied to navigation system 14. Preferably, navigation system 14 retains the vessel's current position as a set of latitude/longitude coordinates.

While GPS is typically the most advantageous to use as it provides the most accurate data, it must be understood that any particular navigation system may be used. This is typically dependent upon the type of marine vessel. For instance, a military grade marine vessel may include a GPS system for navigation, while a privately owned fishing or water sports craft may include less expensive systems such as a Loran. A combination of systems may also be implemented. Kalman filtering may also be employed to obtain A blended navigation solution based on the various navigation inputs.

Navigation system 14 may also use the time derivatives of position information to obtain information on ship speed and course and current present heading, as well as set and drift due to local currents. Such calculations are well known to those of ordinary skill in the art. Optionally, navigation system 14 may receive these inputs directly from other onboard systems, for example, the autopilot, GPS +/–INS, that calculate these values.

The position, data and the data described in the previous paragraph are used to develop an estimate of the vessel's anticipated track and/or the vessel's instantaneous heading and velocity vectors. This data is in turn utilized for the computation of alerts in the manner(s) to be described in more detail below.

Navigation system 14 also stores data or retrieves input from other shipboard systems as needed to compute the maximum hull depth. In the case of ships and other surface operated marine vessels, keel depth will vary as a function of the center of gravity, center of buoyancy, and displacement of the vessel. A pressure sensor(s) or other fathometer may also be employed at the keel or along the hull to directly measure the depth below keel or draft of the surface vessel. Such data may therefore include the nominal keel depth, current weight of vessel, consumables and cargo, and moment of inertia data as well as tide tables. The tide tables may be used in conjunction with clock data obtained from the ship's clock or GPS system to compute changes from mean sea level. These changes may be applied either as a correction to the maximum hull depth/height of the vessel or applied as a correction to the depth/height of terrain features. In a preferred embodiment of the invention, the tide correction is applied to the hull depth/height to avoid the numerous calculations necessary to apply this correction to all terrain features.

The invention may also contain data useful for computing vessel motion and performance characteristics. Typical analysis of vessel motion includes analysis of both "calm water" effects as well the vessel sea keeping characteristics. The "calm water" effects are those that are attributable to forces arising from operation of the vessel's control surfaces and propulsion systems. Sea keeping characteristics analyze the vessel motion due to wave action in the frequency domain.

A preferred embodiment of the invention thus includes a modular six degree of freedom model of vessel behavior. Optionally, a reduced set of equations with fewer degrees of freedom can be used. A reduced set of equations saves computation time and may be sufficient when only the translation and heave motions of the ship need be calculated. For completeness, the complete model may be generically described as given below.

$$m \begin{bmatrix} \dot{u} \\ \dot{v} \\ \dot{r} \end{bmatrix} = f \left\{ \begin{bmatrix} \text{hydrodynamic} \\ \text{terms} \end{bmatrix} + \begin{bmatrix} \text{propulsion} \\ \text{terms} \end{bmatrix} + \begin{bmatrix} \text{inertial} \\ \text{terms} \end{bmatrix} + \begin{bmatrix} \text{wave action and} \\ \text{environmental terms} \end{bmatrix} \right\}$$

where:

m is the vessel mass matrix

U is the vessel speed vector

Figure 3A:
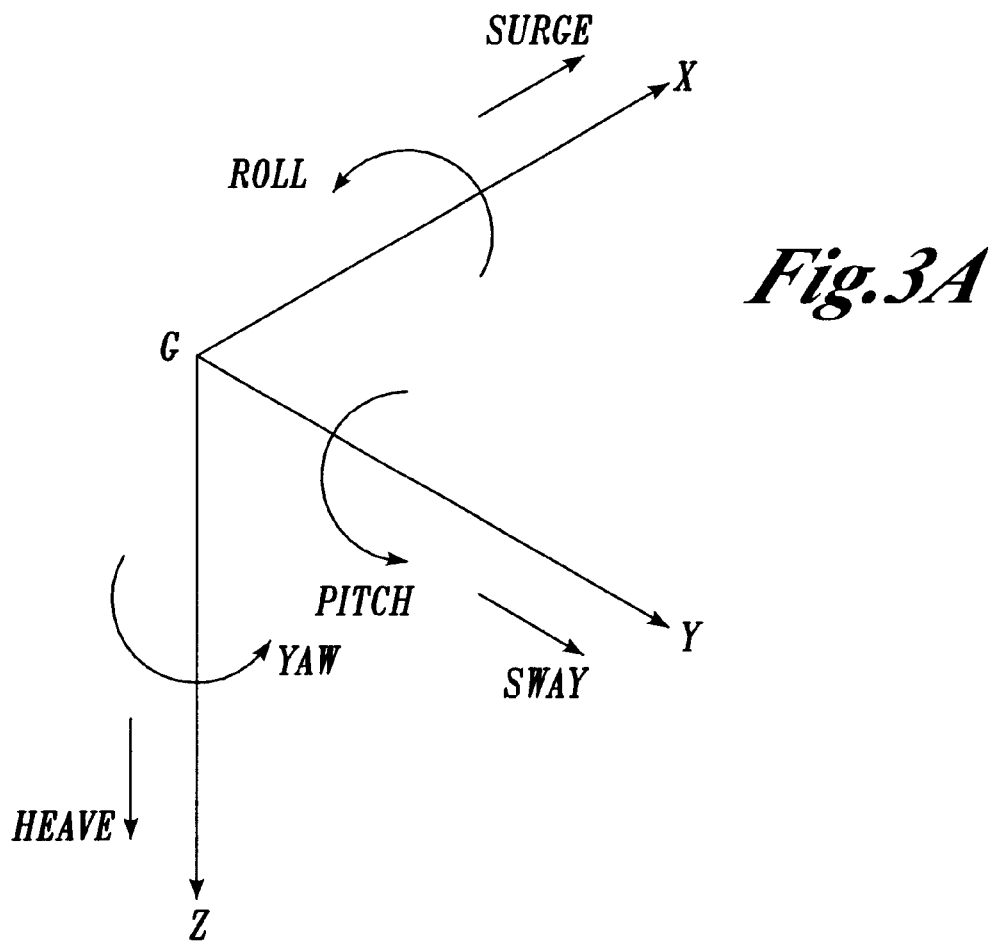
FIGS. 3A and 3B illustrate a set of coordinates axes and forces useful for understanding ship motions as described in the present application.

X, Y, Z and the surge, heave and sway forces as shown in FIG. 3 and $\dot{u}, \dot{v}, \dot{r}$ are the angular rates about the axes of FIG. 3

Figure 3B:
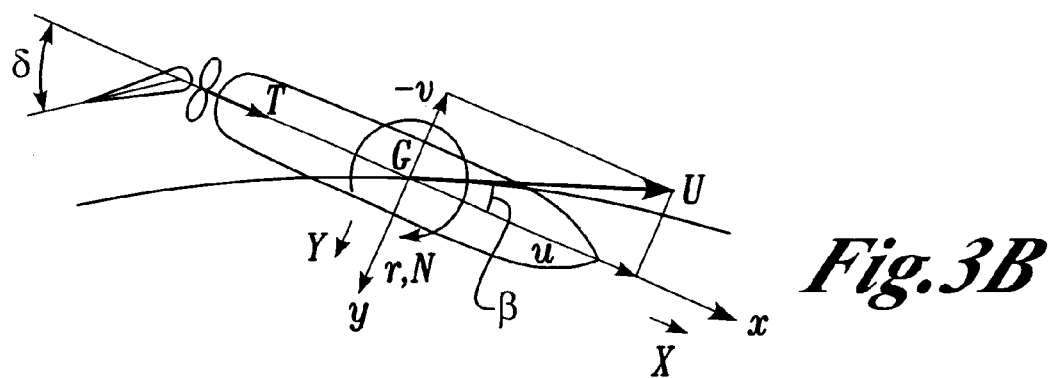

Although there are several mathematical models suitable for use with the present invention, the modular approach permits modeling of effects due to propulsion and steering as well as vessel configuration to be easily incorporated. Wilson et al. in *Modeling and Control of Marine Craft* (Elsevier Applied Science, Pourzanjani and Roberts eds.), incorporated herein by reference for all purposes, describe one set of models suitable for use with the present invention. Specifically, these equations describe the forces X, Y, Z and corresponding moments K, M, N about the orthogonal axes x, y, z. In the analysis to follow, these equations are written with a coordinate system centered on the vessel center of gravity, however, it is to be understood that the invention is not so limited and as known to those of skill in the art, similar equations may be written about any axis, for example the stability, or equilibrium axes. The generalized equations of motion can thus be written as:

$$X = m(\dot{u} - rv) \quad \text{surge equation}$$

$$Y = m(\dot{v} + ru) \quad \text{sway equation}$$

$$N = I_{zz}\dot{r} \quad \text{yaw equation}$$

Where $\dot{r}$ is the angular rate of yaw with respect to time, and u, v are the velocity components of the vessel track as shown in FIG. 3B.

Direct measurement of the forces X, Y, Z proves difficult in practice and therefore it is customary to expand these equations as set of differential equations written in terms of measurable quantities. These set of equations are sometimes known as the state space equations for the vessel. By way of example, the surge, sway and yaw equations can be expanded to have the form:

$$m(\dot{u} - rv - x_G r^2) = X_{\dot{u}}\dot{u} - Y_{\dot{v}}vr - \frac{u}{|u|}Y_{dotr}r^2 + X_{vr}vr$$

$$m(\dot{v} + ru + x_G\dot{r}) =$$

$$Y_{dotv}\dot{v} + Y_{\dot{r}}\dot{r} + Y_v v + \frac{u}{|u|}Y_r r + Y_{v|v|}v|v| + Y_{v|r|}v|r| + \frac{u}{|u|}Y_{r|r|}r|r|$$

$$I_{zz}\dot{r} + mx_G(\dot{v} + ur) = N_{\dot{v}}\dot{v} + N_{\dot{r}}\dot{r} + N_r r + \frac{u}{|u|}N_v v + N_{r|r|}r|r|$$

In the preceding equations all terms with subscripts mean partial differentiation with respect to that variable. Some terms in these equations have absolute values. The absolute value operator ensures that the force contribution acts in the correct direction when the vessel is turning. Derivatives are typically in non-dimensional form, relating performance to design parameters such as block coefficient, draft and beam. The nondimensional matrix of coefficients can be determined empirically or analytically during ship design and sea trials. Alternatively, in the absence of vessel specific data, and as is known to those of skill in the art, the various non-dimensional coefficients have been determined for various classes of vessels and can be applied with minimal error to the vessel of interest. Propulsion and thrust effects may also be considered in terms of dimensionless coefficients in the manner taught by Wilson et al. in Pourzanjani and Roberts.

Maximum hull depth may also vary as a function of the surface vessel's motion in seas. For this reason, the invention may also contain data useful for computing the vessel motion due to wave action. In *Probabilistic Theory of Ship Dynamics* by Price and Bishop (Wiley and Sons, NY), the authors describe methods for determining the resultant vessel motion using a six column vector of state variables. Specifically, for a rigid ship traveling with constant forward speed $\overline{U}$ at an arbitrary angle to regular sinusoidal waves, the resultant motions in the six degrees of freedom are governed by the set of second order linear differential equations written about the ship's equilibrium axes:

$$(m+a)\ddot{q}(t) = b\dot{q}(t) + cq(t) = Q_0 e^{iw_e t}$$

The 6×1 column matrices $Q_0$ and q(t) represent amplitude of input and output respectively:

$$Q_0 = \begin{bmatrix} X \\ Y \\ Z \\ K \\ M \\ N \end{bmatrix} \quad q(t) = \begin{bmatrix} x(t) \\ y(t) \\ z(t) \\ \phi(t) \\ \theta(t) \\ \psi(t) \end{bmatrix}$$

X, Y, Z=amplitudes of surge, sway and heave forces

K, M, N=amplitudes of roll, pitch and yaw moments $W_e$=frequency of wave encounter and x(t), y(t), z(t)=surge, sway and heave motions $\Phi(t)$, $\theta(t)$, $\psi(t)$=variations or roll, pitch and yaw orientations with respect to the equilibrium axes.

The origin of the body axis in the ship for the sea keeping equations is usually taken at the point of trisection of the midship section, longitudinal plane of symmetry and the waterplane. In general, this origin does not coincide with the center of mass. However, for simplification, it may be assumed that the ship, with lateral symmetry, has a center of mass coincident with the origin of the body axes at the point of trisection. In this event the symmetric 6×6 generalized mass matrix m is:

$$m = \begin{bmatrix} m & 0 & 0 & 0 & 0 & 0 \\ 0 & m & 0 & 0 & 0 & 0 \\ 0 & 0 & m & 0 & 0 & 0 \\ 0 & 0 & 0 & I_{xx} & 0 & -I_{xz} \\ 0 & 0 & 0 & 0 & I_{yy} & 0 \\ 0 & 0 & 0 & -I_{xz} & 0 & I_{zz} \end{bmatrix}$$

where m is the mass of the ship, $I_{xx}$, $I_{yy}$, and $I_{xx}$ are the principal moments of inertia and $I_{xx}$ is a product of inertia that is zero if the ship has fore- and aft-symmetry.

The elements of 6×6 matrix a are a combination of hydrodynamic forces which are in phase with the acceleration of the ship. By analogy with the mass matrix, a is referred to as the 'added mass matrix' with (m+a) is the virtual mass matrix. Physically it may be described very loosely as the quantity of fluid in the vicinity of the ship which is accelerated with the ship. On the other hand, the elements of the 6×6 damping matrix b are a combination of hydrodynamic forces which are in phase with the velocity of the ship and are associated with energy dissipation. In an ideal fluid, energy can only be dissipated by the generation and propagation of waves in the free surface.

For a laterally symmetric ship, the added mass and damping matrices have the forms:

$$a = \begin{bmatrix} X_{\dot{x}} & 0 & X_{\dot{z}} & 0 & X_{\dot{\theta}} & 0 \\ 0 & Y_{\dot{y}} & 0 & Y_{\dot{\phi}} & 0 & Y_{\dot{\psi}} \\ Z_{\dot{x}} & 0 & Z_{\dot{z}} & 0 & Z_{\dot{\theta}} & 0 \\ 0 & K_{\dot{y}} & 0 & K_{\dot{\phi}} & 0 & K_{\dot{\psi}} \\ M_{\dot{x}} & 0 & M_{\dot{z}} & 0 & M_{\dot{\theta}} & 0 \\ 0 & N_{\dot{y}} & 0 & N_{\dot{\phi}} & 0 & N_{\dot{\psi}} \end{bmatrix}; \quad b = \begin{bmatrix} X_{\dot{x}} & 0 & X_{\dot{z}} & 0 & X_{\dot{\theta}} & 0 \\ 0 & Y_{\dot{y}} & 0 & Y_{\dot{\phi}} & 0 & Y_{\dot{\psi}} \\ Z_{\dot{x}} & 0 & Z_{\dot{z}} & 0 & Z_{\dot{\theta}} & 0 \\ 0 & K_{\dot{y}} & 0 & K_{\dot{\phi}} & 0 & K_{\dot{\psi}} \\ M_{\dot{x}} & 0 & M_{\dot{z}} & 0 & M_{\dot{\theta}} & 0 \\ 0 & N_{\dot{y}} & 0 & N_{\dot{\phi}} & 0 & N_{\dot{\psi}} \end{bmatrix}$$

where, for example, $K_{\dot{\phi}}$, $K_{104}$ are the added hydrodynamic roll moments associated with the roll angular acceleration $\phi(t)$ and with angular yaw acceleration $\theta(t)$ respectively. The quantities $Z_{\dot{z}}$ and $Z_{\dot{\theta}}$ are the hydrodynamic damping forces associated with the heave velocity $\dot{z}(t)$ and with pitch angular velocity $\dot{\theta}(t)$, respectively.

Finally the 6×6 restoring matrix accounts for the hydrostatic contributions, although there may be some small additional dynamic effects if the center of mass and orgin of the body axes do not coincide. There then exist restoring moments associated with the center of mass of the ship in an angular displacement of the ship. For a harmonically oscillating ship, it is seen that the total hydrodynamic force in phase with the displacement is $(-\omega_e^2 a + c)$. In effect, there therefore exists some arbitrariness in the definitions of the matrices a and c. On the assumption that c is due to hydrostatic effects only, however, the definitions become unique. For the surface ship, the restoring matrix then has the form:

$$c = \begin{bmatrix} 0 & 0 & 0 & 0 & 0 & 0 \\ 0 & 0 & 0 & 0 & 0 & 0 \\ 0 & 0 & Z_z & 0 & Z_\theta & 0 \\ 0 & 0 & 0 & K_\phi & 0 & 0 \\ 0 & 0 & M_z & 0 & M_\theta & 0 \\ 0 & 0 & 0 & 0 & 0 & 0 \end{bmatrix}$$

where, for example, $Z_z$ is the heave restoring force associated with a unit heave displacement, $z(t)$ etc. One outcome of the use of equilibrium axes, instead of body axes, is removal of the explicit symbol $\overline{U}$ from the equations of motion. The quantity $\overline{U}$ does appear in equations used in the analysis of directional stability and control.

In general, the matrices a, b and c are supposed constant with respect to time but, on the assumption that only the response that is proportional to $e^{i\omega_e t}$ is of interest, some elements are dependent on the frequency of wave encounter $\omega_e$. Substituting the foregoing matrices into the initial differential equation yields two sets of coupled equations. One set involves the symmetric motions of surge, heave, pitch and the other involves the antisymmetric motion of roll, sway and yaw. By assuming that the surge motions are an order smaller than the other symmetric motions, a case can be made for simplifying the analysis to the two coupled differential equations involving the pitch and heave motions. In effect, the disturbances of the laterally symmetric ship have been divided into two categories:

a) equations of small symmetric departures from a steady reference motion.

b) equations of small antisymmetric departures from a steady reference motion.

The equations describing the coupled motions for heave and pitch due to sea keeping effects are seen to be of the form:

$$\begin{bmatrix} m + Z_{\ddot{z}} & Z_{\ddot{\theta}} \\ M_{\ddot{z}} & I_{yy} + M_{\ddot{\theta}} \end{bmatrix} \begin{bmatrix} \ddot{z}(t) \\ \ddot{\theta}(t) \end{bmatrix} + \begin{bmatrix} Z_{\dot{z}} & Z_{\dot{\theta}} \\ M_{\dot{z}} & M_{\dot{\theta}} \end{bmatrix} \begin{bmatrix} \dot{z}(t) \\ \dot{\theta}(t) \end{bmatrix} + \begin{bmatrix} Z_z & Z_\theta \\ M_z & M_\theta \end{bmatrix} \begin{bmatrix} z(t) \\ \theta(t) \end{bmatrix} = \begin{bmatrix} Z \\ M \end{bmatrix} e^{i\omega_e t}$$

The various coefficients $Z_{\ddot{z}}$, $Z_\theta$, $M_{\ddot{z}}$, etc., may be derived from experiment or by analytical means. Table I shows the coefficients as derived from the modified strip theory of Gerritsma and Beukelman and from the velocity potential approach of Vugts, and Salvesen, et al. as presented in Price and Bishop. In Table I, m(x) is the two dimensional sectional added mass per unit length and N(x) is the two dimensional damping coefficient per unit length for heave while B(x) is the sectional beam at the waterline. The position coordinate $x^A$ added mass $m^A$ and damping coefficient $N^A$ are associated with the ship's aftermost section.

TABLE 1

| Coefficient | Modified strip theory of Gerritsma and Beukelman | Theory of Vugts and Salvesen et al. |
|---|---|---|
| $Z_{\ddot{z}}$ | $\int m(x)dx$ | $\int m(x)dx - \overline{U}\omega_e^{-2} N\dot{}$ |
| $Z_{\dot{z}}$ | $\int N(x)dx + \overline{U}m\dot{}$ | $\int N(x)dx + \overline{U}m$ |
| $Z_z$ | $\rho g \int b(x)dx$ | same |
| $Z_{\ddot{\theta}}$ | $-\int xm(x)dx - \overline{U}\omega_e^{-2}\int N(x)dx - \overline{U}^2\omega_e^{-2}m\dot{}$ | $-\int xm(x)dx - \overline{U}\omega_e^{-2}\int N(x)dx + \overline{U}\omega_e^{-2}x\dot{}N\dot{} - \overline{U}^2\omega_e^{-2}m\dot{}$ |
| $Z_{\dot{\theta}}$ | $-\int xN(x)dx + \overline{U}\int m(x)dx - \overline{U}x\dot{}m$ | $-\int xN(x)dx + \overline{U}\int m(x)dx - \overline{U}x\dot{}m - \overline{U}^2\omega_e^{-2}N\dot{}$ |
| $Z_\theta$ | $-\rho g \int xB(x)dx$ | same |
| $M_{\ddot{z}}$ | $-\int xm(x)dx$ | $-\int xm(x)dx + \overline{U}\omega_e^{-2}\int N(x)dx + \overline{U}\omega_e^{-2}x\dot{}N\dot{}$ |
| $M_{\dot{z}}$ | $-\int sN(x)dx - \overline{U}x\dot{}m\dot{} - \overline{U}\int m(x)dx$ | same |
| $M_z$ | $-\rho g \int xB(x)dx$ | same |
| $M_{\ddot{\theta}}$ | $\int x^2 m(x)dx + \overline{U}\omega_e^{-2}\int xN(x)dx + \overline{U}^2\omega_e^{-2}\int m(x)dx + \overline{U}\omega_e^{-2}x\dot{}m\dot{}$ | $\int x^2 m(x)dx + \overline{U}^2\omega_e^{-2}\int m(x)dx - \overline{U}\omega_e^{-2}(x\dot{})^2 N\dot{} + \overline{U}^2\omega_e^{-2}x\dot{}m\dot{}$ |
| $M_{\dot{\theta}}$ | $\int x^2 N(x)dx + \overline{U}(x\dot{})^2 m$ | $\int x^2 N(x)dx + \overline{U}^2\omega_e^{-2}\int N(x)dx + \overline{U}(x\dot{})^2 m^A + \overline{U}^2\omega_e^{-2}x\dot{}N\dot{}$ |
| $M_\theta$ | $\rho g \int x^2 B(x)dx$ | same |
| Z | $\zeta_0 \int e^{ikx} e^{-kT} * [\rho g B(x) - \omega\{\omega_e m(x) - iN(x)\}]dx + i\omega\zeta_0 \overline{U} m\ e^{ikx\dot{}} e^{-kT\hat{}}$ | same $+\zeta_0 \overline{U}\omega_e^{-1} e^{ikx\dot{}} e^{-kT\hat{}} \omega$ |

TABLE 1-continued

| Coefficient | Modified strip theory of Gerritsma and Beukelman | Theory of Vugts and Salvesen et al. |
|---|---|---|
| M | $-\zeta_0 \int e^{ikx} e^{-kT_*} x[\rho g B(x) - \omega\{\omega_e m(x) - iN(x) - i\overline{U}m(x)\}]dx - i\zeta_0 \omega \overline{U} x\, m\, e^{ikx} e^{-kT_*}$ | same $- \zeta_0 \int e^{ikx} e^{-kT_*} \overline{U}\omega_e^{-1} \omega N(x) dx$ $-\omega\zeta_0 \overline{U}\omega_e^{-1} x\, N\, e^{ikx} e^{-kT_*}$ |

The quantity $T_*$ in the force and moment amplitudes in Table I is defined as:

$$T_* = \frac{1}{k}\ln\left\{1 - \frac{2k}{B(x)}\int_{-T}^{0} y e^{kz} dz\right\}$$

While T is the draught of the ship. A simplification to this expression is made by equating $T_*$ the mean draught at each section, i.e.

$$T_* \frac{\text{Area of cross-section}}{\text{sectional waterline beam}}$$

This approximation holds for sections with regular shaped hulls, but care must be taken when considering, for example, a bulbous bow, sine otherwise errors may be introduced in the evaluated wave exciting force and moments.

The actual amplitude and frequency of the waves experienced by the vessel when underway, can be calculated iteratively using numerical analysis. In particular, changes in the measured GPS altitude and the time period between such changes may be used to approximate the wave motion for input in to the state equations. As an alternative the vertical accelerations may be measured directly from the INS unit to obtain the wave approximation.

The complete set of calm water and sea keeping performance equations can thus be solved numerically by the present invention to describe vessel motion and performance and to predict an anticipated track or path if desired. In one preferred embodiment of the invention, navigation system 14 is utilized for performance of these calculations. The vessel unique data required to obtain the matrices of calm water and sea keeping state space coefficients may be directly input into system 10 at the time of installation aboard the ship. Optionally, system 10 may be loaded with a set of data for various classes and/or designs of vessels with this data stored in a look up table memory within system 10 and accessible by navigation system 14. When system 10 is installed aboard as a line replaceable unit or other hardware device, the category of vessel can then be selected by a programming pin.

Those of ordinary skill in the art will also recognize that the state equations may be integrated over a relatively longer period of time to obtain the kinematics of the ship and obtain a projected track and other predictions of ship performance. Those of skill in the art will further recognize that other formulations of equations describing vessel motion, may also be utilized with the present invention and the invention is not limited to the specific state space models described above. In addition many commercial software packages exist that model ship performance and may be adapted for use with the present invention. One such package called, SIMAN, offered by MARINTEK (www.marintek.sintef.no) of Norway can predict all International Marine Organization (IMO) maneuvers and operational capabilities for single screw/single rudder and twin screw/twin rudder common merchant monohull displacement ships. In addition, SIMAN can calculate crabbing, station keeping, under the influence of wind, wave and current forces.

Any of the methods described above for predicting the ship motion may also be used to predict ship performance, for example, in a turning maneuver and or stopping distances under various speed, rudder, and screw configurations. The turning performance and stopping distance data can further be utilized to calculate an avoidance maneuver as will also be described below.

Figure 4:
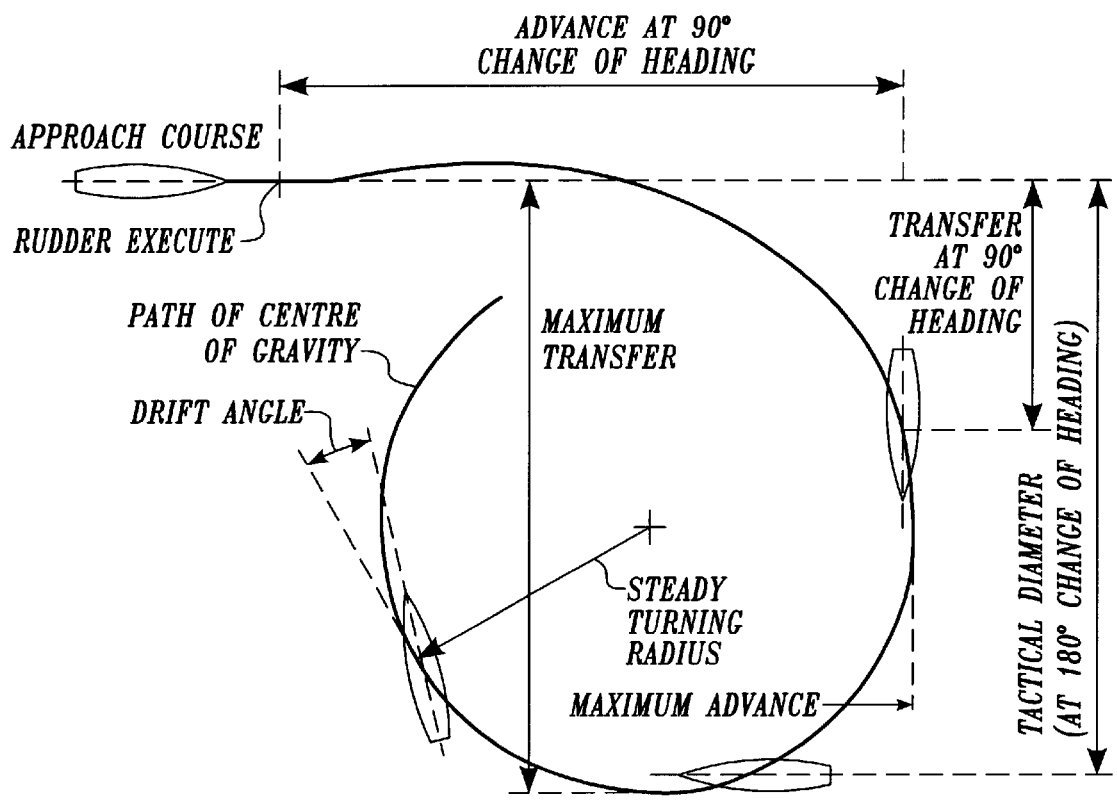
FIG. 4 illustrates a turning maneuver and the nomenclature associated therewith.
Figure 5:
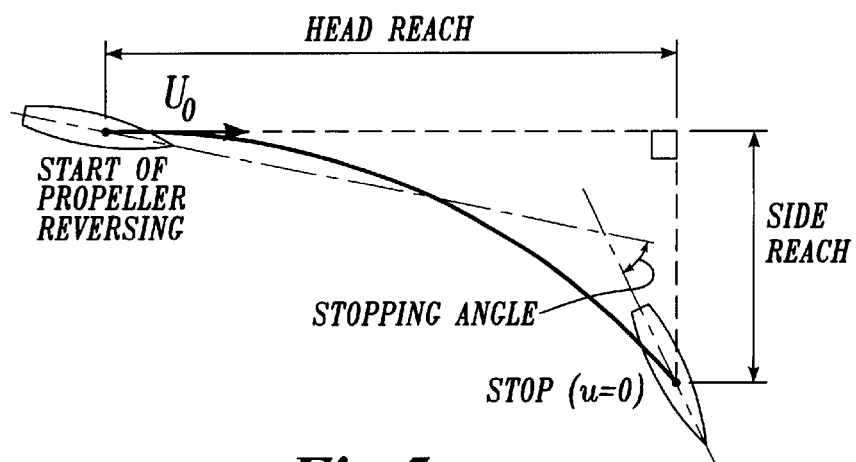
FIG. 5 illustrates a stopping maneuver and the nomenclature associated therewith.

The International Marine Organization (IMO) has also developed a set of standards for turning and stopping based on ship length. These performance standards may be used to ascribe nominal valves to ship performance based on ship length when the actual values are not known. FIGS. 4 and 5 illustrates the displacements for the standard IMO maneuvers. Specifically FIG. 4 illustrates a turning circle and FIG. 5 illustrates a stopping maneuver. The coordinate systems are as given in FIGS. 3A and 3B. Specifically, the IMO resolution A. 571(18) states that the maneuverability of a ship will be considered satisfactory if the following criteria are met:

Turning ability: the advance should not exceed 4.5 ship lengths and the tactical diameter should not exceed 5 ship lengths in the turning circle maneuver.

Stopping ability: the track reach in the aster stopping test should not exceed 15 ship lengths.

Thus in the absence of ship specific performance data useful for solving the equations of motion provided above, the maximum expected displacements for collision avoidance can generically be assumed to be as follows:

Along G-X—distance to full stop=15L;

Along G-Y—tactical diameter at 180 degrees change of heading during a turn=5L

For large vessels, wind may have an impact on vessel performance characteristics especially when turning. The influence of wind on ship performance can be incorporated into the state space equations as additional environmental terms in the manner taught by Wilson et al.

Optionally, each ship typically has a set of advance and transfer tables that describe the forward and lateral distances traveled by the ship in a 90° turn at various speeds. These values are usually determined during sea trials of the vessel by performing turning circles at various speeds. The advance and transfer values for each vessel may be loaded into system 10 at time of installation for later access by navigation system 14.

3.0 Coastal, Waterway and Port Data Bases

The present invention, for example in system 10 memory, stores information concerning the position, depth and height of terrain and obstacles for different locations on earth. In this application terrain is used interchangeably to mean both geographic and man made features and obstacles. This information is usually stored in the first memory device as a latitude and longitude with an associated depth or clearance height referenced to mean sea level. There are many different ways and formats in which the position and depth information for the terrain and obstacles could be stored in the first memory device. Data from which to create these databases may be obtained from a variety of sources including NOAA Bathametrics data and/or from digitizing nautical charts.

In one embodiment, in order to save storage space, the terrain and obstacles may be represented by geometric shapes, such as cones, that are superimposed over the terrain and obstacles. These geometric shapes have a height that corresponds approximately to the height of obstacle. As such, each terrain feature or obstacle in the memory device may be defined by a position, height, and width. For example, a mountain or mountain range may be represented by a cone or series of cones illustrating the peak of the mountain or the base of the cone represents the base of the mountain. This method of data storage is described in greater detail in U.S. Pat. No. 4,646,244 to Bateman et al., "Terrain Advisory System" incorporated herein by reference. As illustrated in the Bateman '244 patent, this method of data storage allows for compaction of the data such that smaller storage devices may be utilized.

Figure 6:
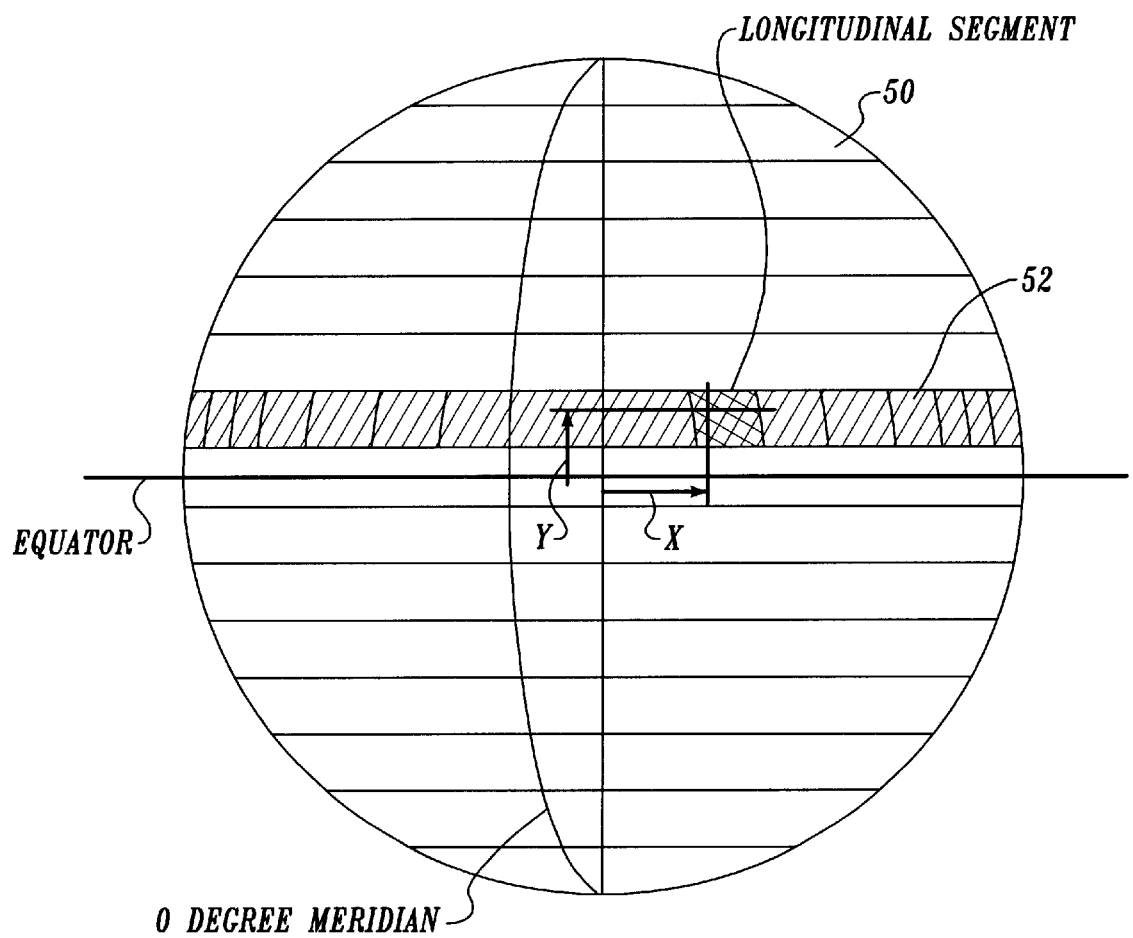
FIG. 6 illustrates the organization of terrain data into latitude and longitude segments in accordance with a preferred embodiment of the invention.
Figure 7:
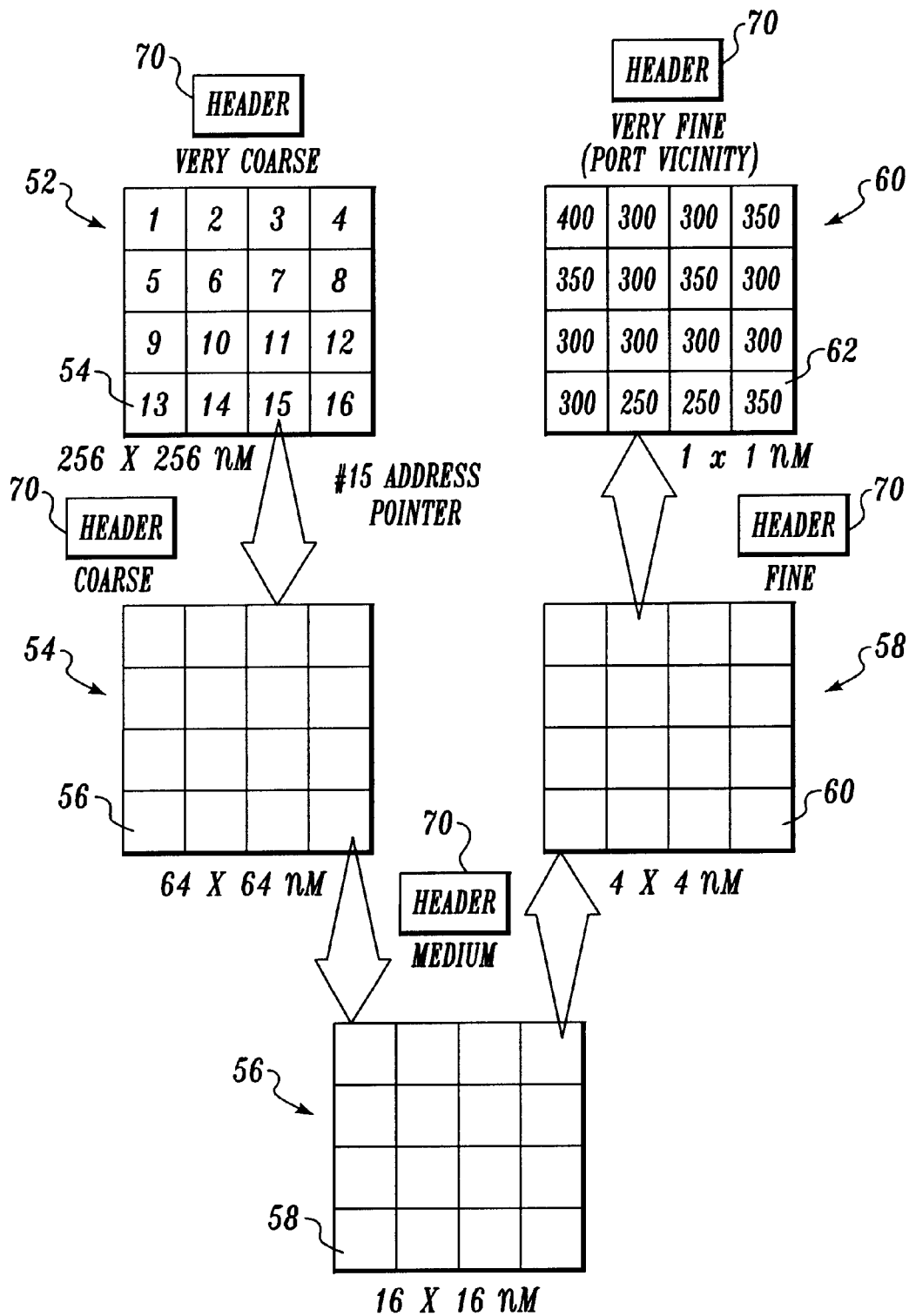
FIG. 7 is a graphical representation of the various memory map and resolution sequencing in accordance with the present invention.

In a preferred embodiment of the invention, however, the port data and coastal/waterway data are separated into two different data bases 26 and 24, respectively, as illustrated in FIGS. 6–8. Such a configuration allows either of the data bases 24 or 26 to be updated without the need to update the other.

Port data base 26 contains various types of information relating to ports, such as channel approaches, buoys, docks, underwater features and obstructions, tides and designation data. Data base 24 is preferably structured to provide varying resolutions of terrain data as a function of the topography of the terrain, as well as water depth. For example, a relatively high resolution can be provided close to port and to shore while in deeper water, a coarser resolution is sufficient.

Data bases 24 and 26 may be formed from semiconductor storage devices well known to those of skill in the art such as, for example: flash erasable programmable read only memory (ROM) devices, such as a flash EEPROM; or mini hard disk drives, and/or PCMCIA cards which could take advantage of known data compression techniques to reduce the amount of storage space required and also promote easy data retrieval by search algorithm 29.

FIGS. 6 through 8 illustrate the organization of data bases 24 and 26. In FIG. 6 the world is divided into a plurality of latitude bands 50, for example each about 4° wide around the equator such that each longitudinal segment 52 is about 256×256 nautical miles. In order to maintain a relatively constant segment size, the number of longitudinal segments 52 per latitude band 50 are reduced closer to the poles.

Since the number of latitude bands 50 and the number of longitudinal segments 52 per latitude band 50 is fixed, determination of the particular segment corresponding to the current vessel position is readily determined. For example, the vessel current latitude X is used to determine the latitude band number. Next, the number of longitudinal segments 52 associated with that band 50 is determined either by way of a LOOK-UP table or by calculation. Once the number of longitudinal segments 52 in the particular latitude band 50 of interest is determined, the current longitudinal position Y of the vessel can be used to readily determine the longitudinal segment number.

The minimum data associated with each longitudinal segment 52 corresponds to the point closest to the surface as defined by the mean sea level within that segment. As mentioned above, each of the segments 52 is approximately 256×256 nautical miles. As shown in FIG. 7, longitudinal segments 52 are broken down into various subsquares to provide varying levels of resolution. For example, each segment 52 may be broken down into a plurality of subsquares 54, each subsquare 54 being 64×64 nautical miles to provide a very coarse resolution. The subsquares 54, can, in turn, be further subdivided into a number of subsquares 56, for example, each 16×16 nautical miles, to provide a coarse resolution. These subsquares 56, in turn, can be subdivided into a plurality of subsquares 58, for example each 4×4 nautical miles, to provide a medium resolution. The subsquare 58 can also be broken down into a plurality of subsquares 60, for example 1×1 nautical miles, to provide a fine resolution. In the vicinity around ports, it may even be desirable to break down the subsquares 60 down into smaller subsquares 62 to provide even finer resolution, for example ¼×¼ nautical miles. These segments may be further subdivided as needed to provide the desired resolution.

Figure 8A:
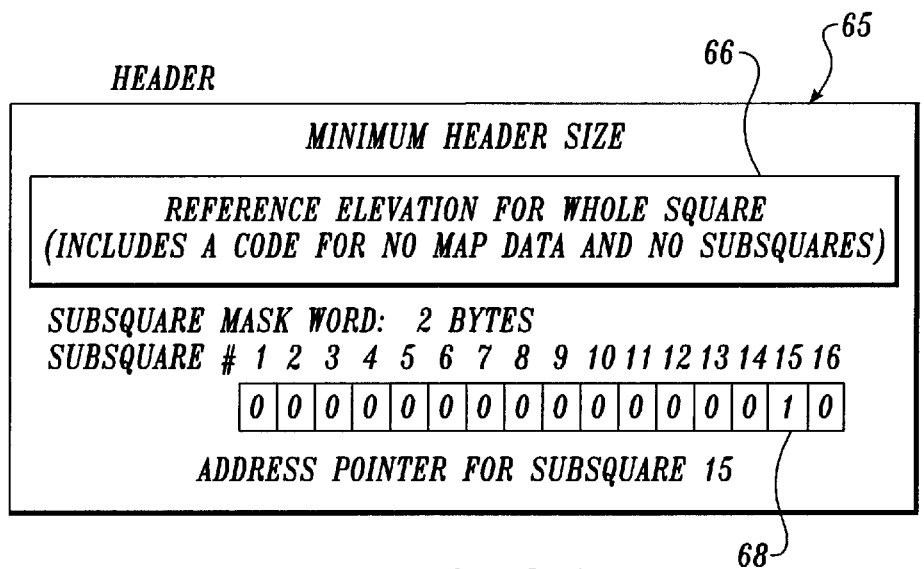
FIG. 8A is an exemplary representation of the digital header and subsquare mask word for identifying geographical areas in accordance with the present invention.

As shown in FIG. 8A, the data associated with each longitudinal segment 52 comprises a header 65 which includes a multiple data byte 66 which includes the reference depth which corresponds to the point of least depth for all the subsquares within the segment, which assumes that the highest point in a square is representative of the entire square elevation. Multiple data byte 66 may also include a flag to indicate when no further subdividing is required for certain geographical areas, for example, deep water areas. To facilitate updating the data base on a piecewise basis, multiple data bye 66 may also contain a flag bit or code indicating that data corresponding to further subdivisions does not exist for a particular segment 52 containing a code indicating that no map data exists in the segment.

For areas having significant underwater terrain and areas in the vicinity of a port, the longitudinal segments 52 are subdivided as discussed above. In such a situation, the stored data would include a 2-byte mask word 68, which points to the subsquares having different depth data. For example, as shown in FIG. 8A, the 2-byte mask word 68 is illustrated with a pointer in the box 15 within the subsquare 54 within the longitudinal segment 52, which represents a different depth which points to the next finer layer of resolution as discussed above. The subsquares each include a header 70 including a mask as described above to enable a pointer for each subsquare having a different depth to point to the next finer layer until the finest resolution level desired is reached as shown.

The data base structure provides for flexibility as to resolution required and can be constructed on a piecewise basis at different times. As such, the structure contains the entire framework necessary to add new data or modify existing data without changing any of the software. The size of the data base is proportional to the resolution and the size of the area to be covered.

Figure 8B:
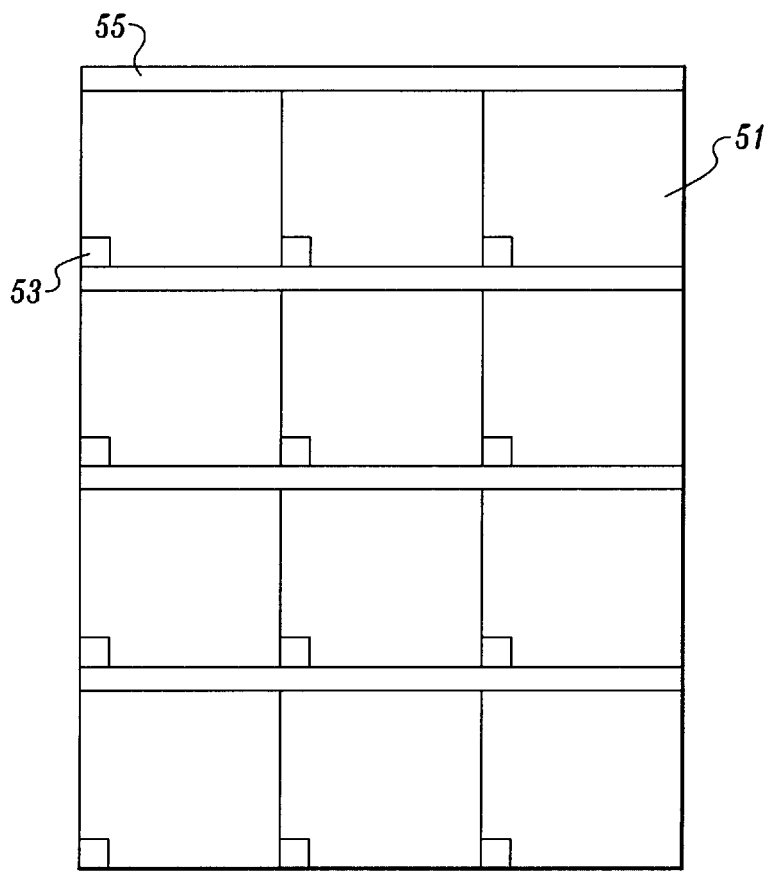
FIG. 8B is a terrain map alternative to FIG. 7.

Alternatively, the world may be divided into a plurality of, for example, 1°×1° map files or cells 51 as shown in FIG. 8B. The various map files 51 may be formed with variable resolution. More particularly, each of the map files may be subdivided into a plurality of subcells 53 with the most significant terrain depth in each subcell indicated, with the resolution of all of the subcells within a particular map file being of the same resolution.

The size of the subcells 53 is varied to provide varying degrees of resolution. For example, for relatively high resolution, the size of the subcells 53 may be selected as either 15×15 arc seconds or 30×30 arc seconds. The size of the subcells 53 may also be varied as a function of the terrain in particular coastal or waterway areas. The size of the subcells 53 may also be varied as a function of the distance to the nearest port or shoreline.

Figure 9:
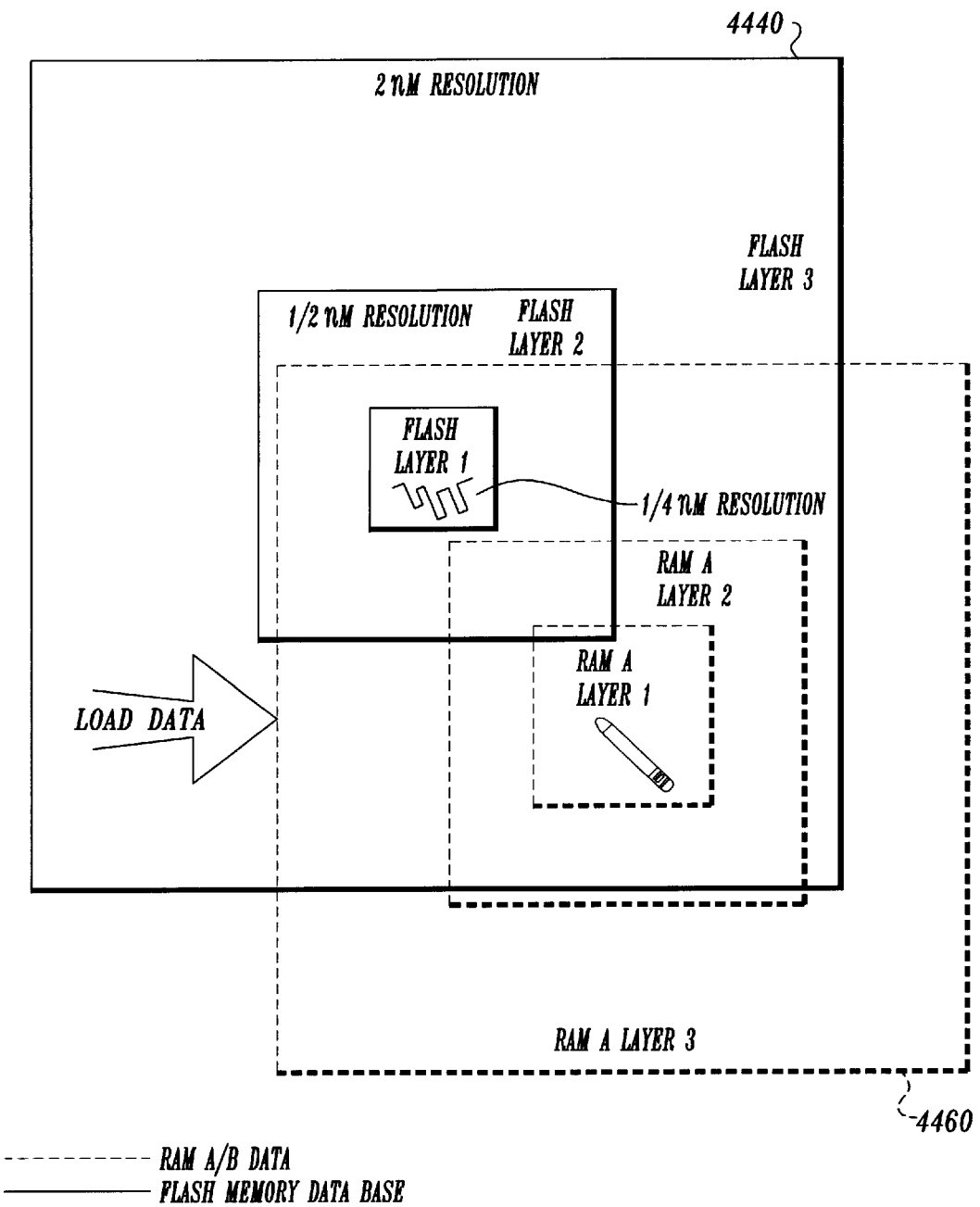
FIG. 9 is a block diagram illustrating the configuration of a flash ROM for a terrain data base and a RAM used with a preferred embodiment of the present invention.

As discussed below and as illustrated in FIG. 9, the data base may be compressed by a compression algorithm and stored in a flash read only memory (ROM). Various compression algorithms already known to those of skill in the art are suitable for this application. The compression algorithm does not form a part of the present invention.

In order to simplify computation, each of the map files includes a header 55, which includes, inter alia, the resolution of the particular map file 51 as well as the location of one or more corners, for example, the northwest and southwest corners. The headers 55 as well as the map files 51 are discussed in more detail below and illustrated in more detail in FIG. 10.

4.0 Alerting Envelope Logic/Avoidance Logic

Information about the ship position and dynamics as described in Section 2.0 are compared to the terrain and obstacle information according to an alert logic designed to alert the crew to potential collision hazards. The alert logic can take one of several forms as described in greater detail in the following sections. Use of the various alert logic schemes is not necessarily mutually exclusive, and can coexist. In alternative embodiments of the invention, the present invention may further include an avoidance guidance logic that advises the crew what actions to take once a potential collision hazard has been detected by the alert logic. The avoidance logic is also described in greater detail below.

The general basis for the design of the grounding/obstacle avoidance logic is to provide sufficient information to the vessel's crew to avoid groundings or collisions. The alerting logic is preferably consistent with the following objectives:

(a) Sufficient lateral and under-keel clearance is maintained between current vessel position and surrounding obstacles;

(b) Short-term lateral and vertical clearances will remain acceptable;

(c) The initial position at which clearance becomes unacceptable is evident (should the vessel be heading towards a potential obstacle); and (d) The last position at which a standard maneuver would prevent grounding if the path remains unchanged in condition (c) is identified above.

Condition (a) is preferably satisfied with reactive system modes, whereas (b)–(d) can be satisfied by predictive modes. These modes are discussed in greater detail below. Human factors data from collision avoidance studies has shown that predictive type information improves operator performance with respect to averting collisions.

4.1 Reactive Alerting

A first embodiment of the invention utilizes a sonar device to sense the depth of underwater obstructions beneath the vessel. The invention evaluates the time rate of change of the depth soundings and does not require input from the terrain database. When the time rate of change exceeds a predetermined value, an alert is provided to the crew. The alert may be aural, visual or both.

Such a device as a tool to avoid groundings is mostly applicable to submarines and is less applicable to large surface vessels since the time rate of change of the terrain below a surface going vessel may be far in excess of the surface vessel's ability to conduct a turn for avoidance. Furthermore, terrain such as shallow sand bars and other uncharted obstacles may appear suddenly supplying little time for avoidance. Grounding avoidance may be further complicated when operations in narrow channels compromises maneuverability. While it may appear pointless to alert the crew to an inevitable grounding, the alert may have a significant positive impact on damage control, crew preparedness and other proactive management of the grounding incident.

Figure 11:
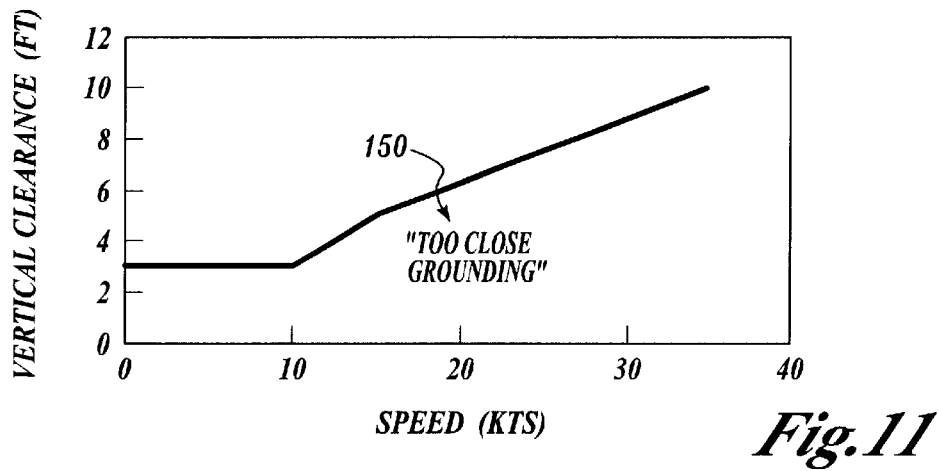
FIG. 11 illustrates an insufficient terrain clearance reactive alerting envelope according to a preferred embodiment of the present invention.

FIG. 11 shows a warning envelope based on insufficient terrain clearance when the vessel is moving in shallow or coastal waters, for example when in a river channel or approaching a port or harbor. In the curve of FIG. 11 an audible "TOO CLOSE GROUNDING" warning is given when the vessel enters region 150 of the graph. A warning light or other visual warning indication may also be provided.

4.2 Predictive Alerting

In the previous section, the alerting scheme is reactive and detects encroaching terrain. Predictive alerts are possible when the position of the vessel is known relative to the position of the proximate terrain. The following sections detail various predictive alerting schemes which can be utilized with the present invention.

4.2.1 Predictive Alerts Based On Standard Maneuvers

In one embodiment of the invention, a predictive alert envelope has dimensions based on the displacements required to execute an evasive maneuver. The terrain data is compared to the boundaries of this envelope and if any terrain data is found to be located within the boundaries of the envelope, an alert warning is given of a potential hazard.

This embodiment of a predictive alerting scheme constructs protection envelopes in the direction of travel of the vessel based upon the last position from which a standard IMO maneuver can be executed to prevent grounding or collision with obstacles. This alerting scheme, while applicable to all cases, has the advantage of being readily constructed for all vessels since only the ship length need be known to define the envelope dimensions. Based on the IMO standard maneuvers as described in Section 2.0 and FIGS. 4 and 5, the maximum expected displacements for collision avoidance are: (1) the distance required for a full stop along axis G-X of FIG. 3; and (2) the distance equal to the tactical diameter for 180° change of heading.

Figure 12:
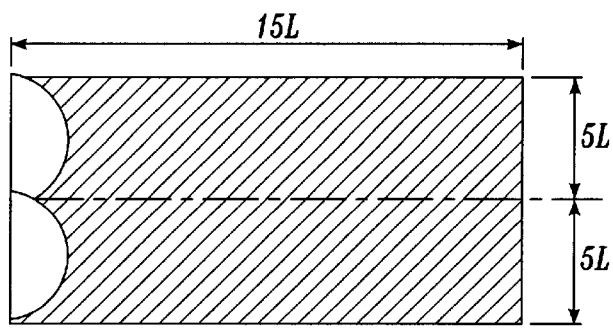
FIG. 12 illustrates a plan view showing the boundaries of an alert envelope according to an embodiment of the present invention.

The hatched portion of FIG. 12 defines the resulting lateral dimensions of the alerting. The semi-circular path that is not cross-hatched represents the path followed during a turn where the diameter is equivalent to the maximum allowable tactical diameter and is therefore excluded from the alerting envelope. Note that a slightly higher safety margin may be achieved if the latter semicircular areas adopted a diameter equal to the IMO upper limit of 4.5 for the advance at 90 degrees heading.

Figure 13:
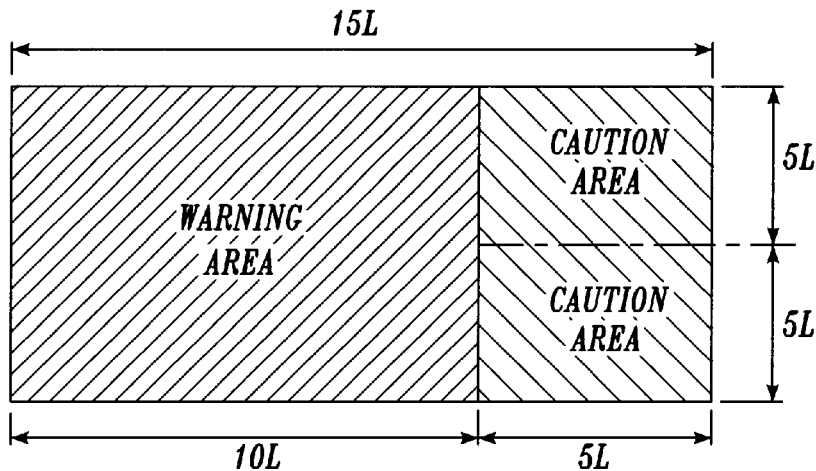
FIG. 13 illustrates a plan view of an alert envelope having both caution and warning boundaries according to an embodiment of the present invention.

One potential mechanism to provide two levels of alerting, namely caution and warning, is depicted in FIG. 13. The first alert (caution) is provided at the initial position when clearance becomes unacceptable if the vessel is heading towards a potential obstacle. The second alert (warning) is provided at a distance that is equivalent to at least twice the advance at 90 degrees change of heading, and it therefore allows for a safe turn away from obstacles. Note that increasing the magnitude of the entire look-ahead distance may increase the probability of false/nuisance alerts.

Figure 14:
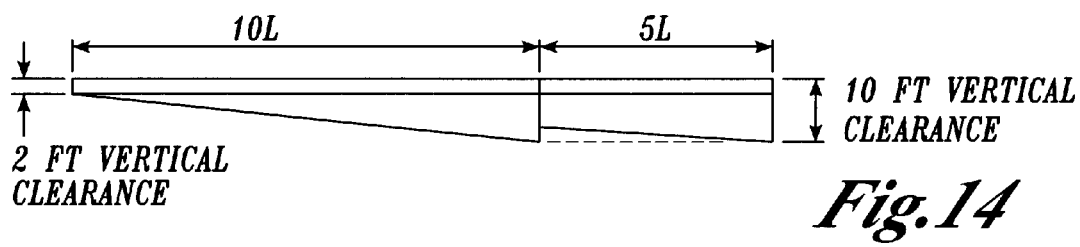
FIG. 14 illustrates a side view showing vertical tolerancing of an alert envelope constructed according to an embodiment of the invention.
Figure 15:
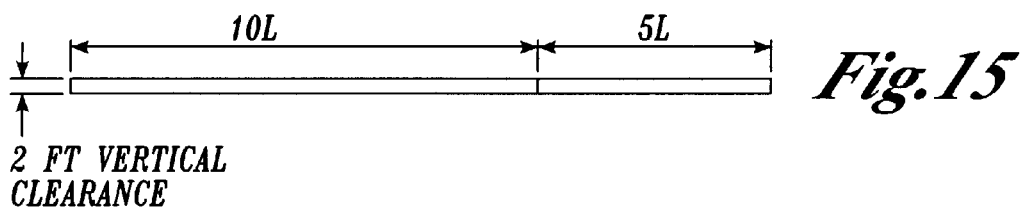
FIG. 15 illustrates a side view showing vertical tolerancing of an alert envelope for shallow water operations constructed according to an embodiment of the present invention.

FIGS. 14–15 describe the dimensioning of the protection envelope in the vertical plane. As known to those of skill in the art, in some ports an under-keel clearance on the order of 2 is permissible. The minimum permissible clearance thus has a minimum of 2 feet and increases linearly in the longitudinal direction as depicted in FIG. 14.

The envelope of FIGS. 13 and 14 are especially useful when cruising or for operations in unconfined areas. For port/harbor type operations the under-keel clearance envelope is preferably modified as shown in FIG. 15. The condition of being in a port/harbor operation can be determined by comparing the ship's position to known ports/harbors or riverways stored in the terrain data base.

Figure 16:
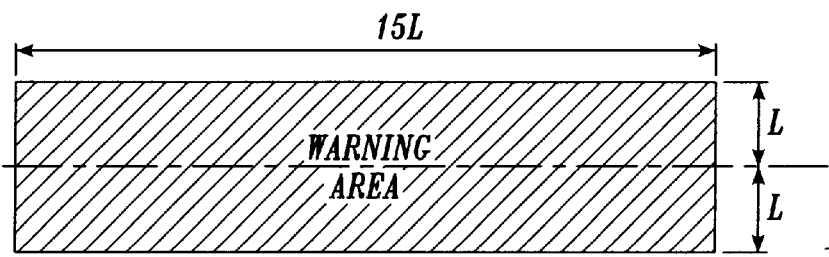
FIG. 16 illustrates a plan view of an alert envelope for operating in confined spaces according to an embodiment of the present invention.

In those areas (including ports) where the vessel is constrained to maneuver in narrow channels, the possibility may not exist to execute a full turning circle to avoid potential obstacles. This condition implies that it may be desirable to reduce the width of the lateral warning envelope presented in FIG. 13 in those instances. For initial turn and full stop maneuvers the side reach magnitude is generally less than one ship length. The lateral alerting envelope is thus modulated accordingly and is as depicted in FIG. 16. Note that the as the ability to perform a full turn does not exist in a narrow channel, the entire envelope is based on a stopping maneuver and only a single alert (warning) is generated by this envelope. In cases where the channel width is close to or less than 2 L, a further reduction of envelope width is preferable, the exact requirements being dictated by local considerations.

The envelopes described in FIGS. 12–16 above can also be applied to verify clearance beneath overhead obstruction such as bridges. In such an application the envelope retains the plan view dimensions for the given location as discussed in connection with FIGS. 12, 13 and 16. The envelope vertical profile, however, can be set at some fixed, nominal value, for example 0.5 feet and need not be reconfigured as a function of

4.2.2 Geometric Envelope Predictive Alerts

In an alternative embodiment of the invention the predictive envelope is based on a constant time to impact. The envelope can be defined around each terrain feature, or optionally, with reference to the marine vessel itself. In this instance, whenever the marine vessel track or marine vessel envelope contacts the surface defining the terrain feature a caution and/or warning alert is given. Such a system has the advantage that any warning time could be selected. For purposes of illustration, depiction of the terrain is described with reference to the teaching of the Bateman U.S. Pat. No. 4,646,244 patent. The Bateman U.S. Pat. No. 4,646,244 is incorporated herein by reference for all purposes. Furthermore, in some instances, it has been found that a constant time to impact envelope is too sensitive and may cause nuisance warnings. Consequently, it has been found advantageous to modify the constant time to impact to make it more sensitive when the vessel is heading directly at terrain and less sensitive when the vessel is merely passing by the terrain.

Figure 17:
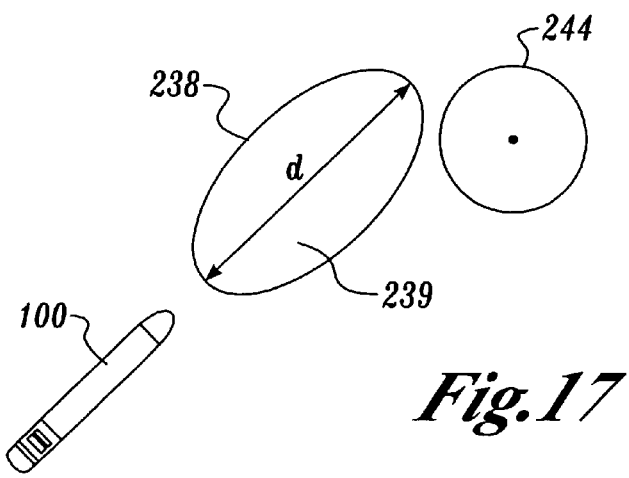
FIG. 17 illustrates a constant time to impact alert envelope constructed according to an embodiment of the present invention.
Figure 18:
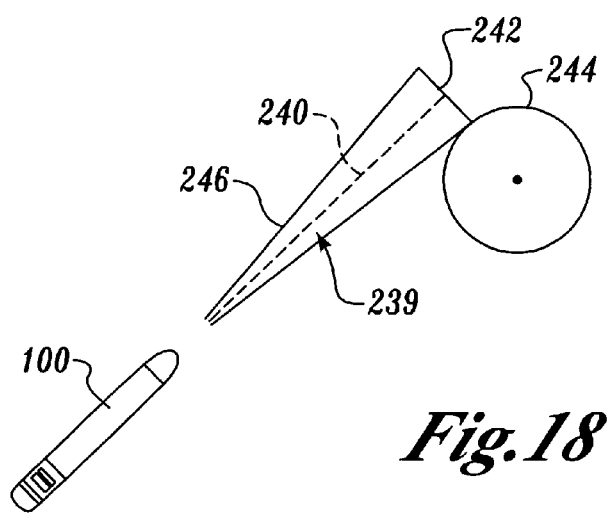
FIG. 18 illustrates an alert envelope generated with reference to the marine vessel according to an embodiment of the present invention.
Figure 19:
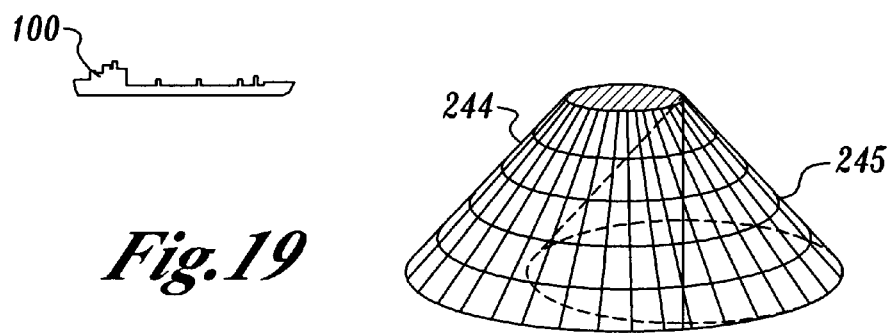
FIG. 19 illustrates an alert envelope based on projected track according to an embodiment of the present invention.

FIGS. 17, 18 and 19 illustrate the creation of a constant time to impact envelope according to one embodiment of the present invention. Specifically, FIG. 17 illustrates a cone 244 defining a terrain feature or obstacle that is being approached by the marine vessel 100. The distance that the protection envelope extends is governed by the desired warning time to impact. In one embodiment the envelope may be constructed about the terrain feature as represented by cone 244. For example, for a marine vessel traveling at a high speed, the boundary 244 of the envelope surrounding the terrain extends further from the terrain than for a marine vessel traveling at low speeds. In addition, the direction of the extension of envelope 244 from the terrain is also determined by the position and heading of the marine vessel.

The envelope 238 may also be centered on the marine vessel itself as shown in FIGS. 18 and 19. In the embodiment of FIGS. 17 and 18, the envelope 244 surrounding the terrain remains of fixed geometry and does not vary as a function of distance from the approaching vessel. In FIG. 17, envelope 239 is substantially planar and extends out from vessel 100 at a depth equivalent to the maximum keel depth. The width of envelope 239 can be defined by the transfer distance required to complete a turn away from the terrain obstacle.

In FIG. 18, envelope 239 is centered on the vessel track 240 and extends out to a distance 242 based on constant time to impact. Boundaries 246 of envelope 239 expand with distance from the vessel to account for navigation uncertainties in vessel projected position. One possible method of defining side 246 utilizes the inaccuracies in the prediction of the travel path by differentiating the track signal of the marine vessel to provide a rate of change of track direction over time. Using the rate of change in track and the desired warning time to impact, defines the sides 246 of the envelope. Envelope 239 is also planar and centered on the vessel in the direction of travel at a depth equivalent to the maximum keel depth.

The envelopes of FIGS. 17 and 18 may also be anchored to the mast height of the vessel to check for overhead obstruction clearance in a manner similar to that described for underwater terrain. A protection envelope 244 is also constructed about the obstacle. The boundaries of this envelope may also be configured to operate as described in FIG. 19.

The desired warning reaction time used to define the envelope length may be based on a distance for the marine vessel to come to a complete stop before colliding with the terrain. This distance is then used as the boundary of the envelope generated about the terrain. Similarly, the desired warning reaction time may be based on the distance required for the marine vessel to make an evasive maneuver with respect to the terrain. In this embodiment, the stored ship performance characteristics are used to define such a maneuver and calculate the warning time. Based on this warning time data, a minimum distance between the terrain and the marine vessel needed to perform an evasive action is ascertained. This minimum distance is used as the boundary of the envelope generated about the terrain.

The protection envelope and the position of the vessel are then compared. If the marine vessel and the terrain are in closer proximity to each other than the area defined by the envelope either both or one of an aural or a visual indication is provided to the crew. The envelopes may also be provided to the display generator. The display illustrates to the crew illustrating the proximity of the marine vessel to the surrounding terrain and alerting visually to the crew of any potential dangers.

4.2.3 Look Ahead/Look Down Predictive Alerts

In an additional embodiment of the invention the alert envelopes are constructed to look down as well as ahead of the vessel. As in the embodiment of Section 4.2.1 the protection envelopes described herein have a configurable dimension in the vertical plane and thus define a volume.

Figure 20:
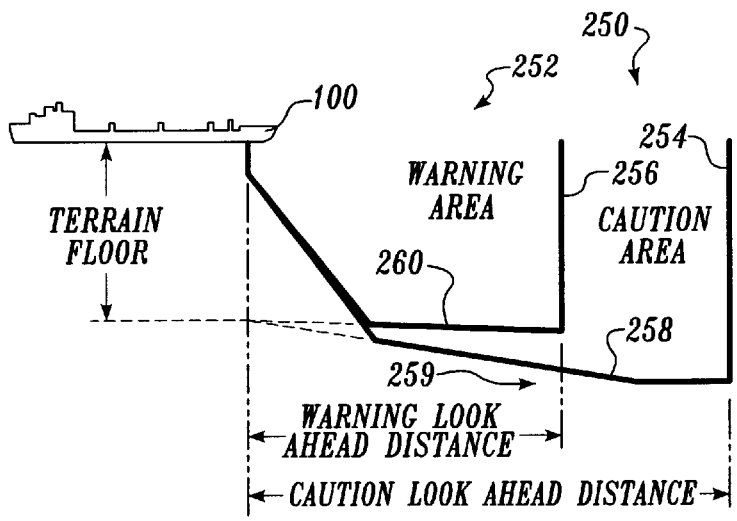
FIG. 20 illustrates a look ahead/look down alert envelope according to a preferred embodiment of the invention.

FIG. 20 illustrates caution and warning envelopes obtained using a look-ahead/look-down envelope. Specifically, the apparatus, methods, and computer program products of the present invention according to this embodiment generate both a caution and a warning envelope, 250 and 252, respectively. The caution warning envelope 250 is typically generated to provide initial caution alerts to the user of the marine vessel concerning terrain that is proximate to the marine vessel, while the warning envelope 252 is typically generated to provide a more critical indication to the user that the marine vessel is in immediate danger of colliding with the terrain and obstacles and evasive action is required. An alert is provided to the crew when terrain/obstacles are located within the boundaries of the caution or warning envelopes.

The envelopes generated according to this embodiment of the invention eliminate or reduce the number of nuisance alarms likely to occur. For instance, as illustrated in FIG. 20, the caution and warning envelopes typically have a predefined look ahead distances, 254 and 256, that define the distance ahead of the path of the marine vessel in which terrain is analyzed and caution and warning alerts are generated. Furthermore, the caution and warning envelopes also include lower boundaries or terrain clearance floor boundaries respectively that define the depth below the marine vessel for which caution and warning alerts are generated. Further detail on the construction of these boundaries is provided below.

As illustrated in FIG. 20, the caution and warning envelopes each have an associated look ahead distance boundary, 254 and 256, respectively, past which caution and warning alerts are not generated. The determination of these look ahead distance boundaries is typically based on the operational characteristics of the marine vessel. Specifically, the look ahead distance values for the caution and warning envelopes are typically selected such that the user of the marine vessel will have sufficient time to note the alert and perform an evasive maneuver. The look ahead distance values are also typically restricted in length to avoid generation of nuisance alarms.

In a preferred embodiment of the invention, the look-ahead distance is equal to 15 ship lengths or the stopping distance of the vessel as discussed in Section 4.2.1. Optionally, the look ahead distance value (LAD) for the caution envelope may be defined as two times the time needed for the vessel to perform a turn at present speed plus an added reaction time (nominally 10 seconds) for the user to note the alert and initiate the turn, each multiplied by the speed of the vessel.

$$LAD = \bar{U}[(2 \times \text{turn time}) + \text{react time}] + C \text{ where } C \text{ is a fixed distance constant, e.g. } C=0$$

The stopping time and turning characteristics of the vessel for use in the calculation of the look ahead distance can be obtained in the manner described in Section 2.0. The LAD may also be provided with a configurable upper and lower limit. For example, for large vessels the limit may be set, for example, at 0.5 nm at low speeds (<2 kts) and 4 nm at cruising speed.

As detailed above, the caution and warning envelopes of the present invention may thus include look ahead distance values based on either the time required to turn the marine vessel or the time required to stop the marine vessel. In some embodiments, however, it may be advantageous to generate separate look ahead distance values, one based on the time to turn the marine vessel and one based on the time to stop the marine vessel. Specifically, depending on the operational parameters of the marine vessel it may take less time to stop the marine vessel than to turn the marine vessel to miss the terrain. For example, if the marine vessel is traveling at a slow speed, turning effectiveness is reduced and it may take less time or distance to stop the marine vessel. As such, in this embodiment, the caution and warning generator generates look ahead distance values based on both the time to turn the marine vessel and to stop the marine vessel and then selects the smaller respective look ahead distance values for both the caution and warning envelopes.

In a preferred embodiment, the look ahead distances 254 and 256 of FIG. 20 extend vertically from a lower value defined by a terrain clearance floor 258,260 referenced from hull maximum depth to a height above the water surface. The extent of boundaries 254,256 above the surface is at least equivalent to the maximum ship height or similar value to ensure clearance beneath overhead obstacles. As shown in FIG. 20, terrain clearance floors, 258 and 260 are referenced from the hull maximum depth as obtained according to Section 2.0 to provide clearance from underwater terrain and obstructions. The terrain clearance floors relate to a distance $\Delta H$ below the marine vessel for which caution and warning alerts concerning underlying terrain are generated.

For marine vessels, the terrain clearance floor may may be defined with reference to the shoreline or a closest shallow geographic point. Specifically, when the marine vessel is a considerable distance from the shoreline or a shallow geographic point, the depth of the terrain clearance floor below the marine vessel may be deeper, as there is typically less terrain closer to the bottom of the marine vessel that would create nuisance alarms. However, as the marine vessel approaches a known port or moorage contained in the terrain data base, if the depth $\Delta H$ of the terrain clearance floor is not decreased, the approaching terrain near the shoreline or shallow point will create nuisance alarms. As such, the depth of the terrain clearance floor envelopes may be dynamically varied with respect to the marine vessel's proximity to the port such that adequate protection is provided in open waters and channels where collision with terrain is less expected, while nuisance alarms are reduced in moorages and ports where there ocean bottom is rising to meet the land, but where the vessel must nonetheless make way. For example, the terrain clearance floor may be in terms of 5 to 10 feet of clearance when the marine vessel is offshore and decreases from 5 to 2 feet as the marine vessel nears port.

Figure 21:
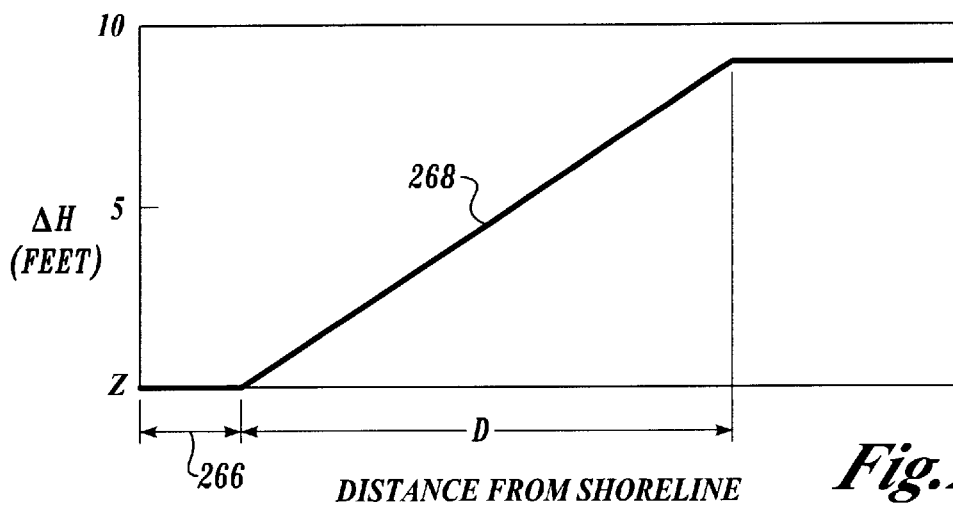
FIG. 21 illustrates a terrain clearance floor as a function of distance from moorage according to a preferred embodiment of the invention.

FIG. 21 illustrates graphically an example of the terrain clearance floor for a caution warning envelope for different distances from port. The horizontal axis of the graph represents the distance from stored moorage, while the vertical axis represents depth $\Delta H$ of the terrain clearance floor. As illustrated, there is typically an initial offset distance 266 between the beginning of the envelope and the moorage. This offset is an added distance that accounts for inaccuracies in the position data associated with the stored position for the moorage and the position data indicated by the navigation system as the current position of the marine vessel. Further, the graph for the terrain clearance floor of this embodiment, includes a first segment 268 that extends from the offset distance 266 out to a distance D. Beyond the distance D, the terrain clearance floor has a constant depth $\Delta H$ of 10 feet.

Figure 22:
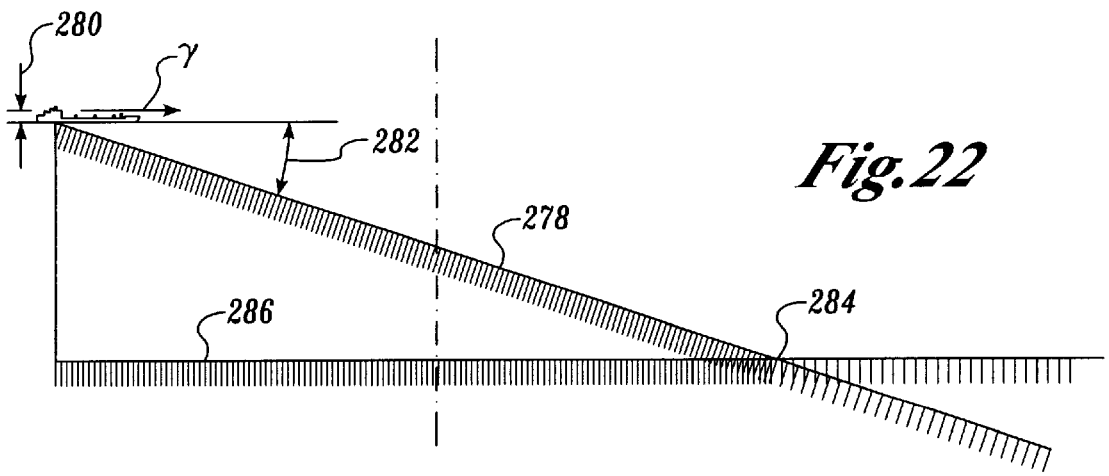
FIG. 22 is a graphical illustration of an alert envelope having a cut off boundary according to an embodiment of the present invention.

In some embodiments of the present invention, the caution and warning envelopes may further include cut-off boundaries to avoid spurious warnings when the marine vessel passes terrain or obstacles at a relatively close distance. Without the cut-off boundaries, alerts would be generated although the terrain is below the marine vessel and no terrain is ahead of the marine vessel. In FIG. 22, the cut-off boundary 278 begins at a predetermined envelope cut-off offset 280 below the marine vessel and extends in a direction in front of the marine vessel at a predetermined envelope cut-off angle 282. The cut-off angle is equal to the angle of the marine vessel plus a configurable predetermined cut-off angle 282. For surface operation of a marine vessel, as shown in FIG. 22, the cut-off boundary 278 extends from the cut-off offset 280 in the direction of the cut-off angle 282 in the direction of travel of the marine vessel to a point 284 where it intersects either a caution or warning envelope boundary 286. For surface travel, y is zero. Thus, the cut-off boundary 278 illustrated in FIG. 22 extends from the cut-off offset 280 along an angle equal to the cut-off angle. The boundary for the caution or warning envelope is selected to be the higher of the boundary 286 or cut-off boundary 278. Thus, as illustrated in FIG. 22, the envelope comprises the cut-off boundary 278 to the point 284, where the cut-off boundary intersects the envelope boundary 286. From the point 284, the boundary is envelope boundary 286. Thus, if either a caution or warning envelope is below the cut-off boundary, cut-off boundary becomes the new boundary for the envelope.

Figure 23:
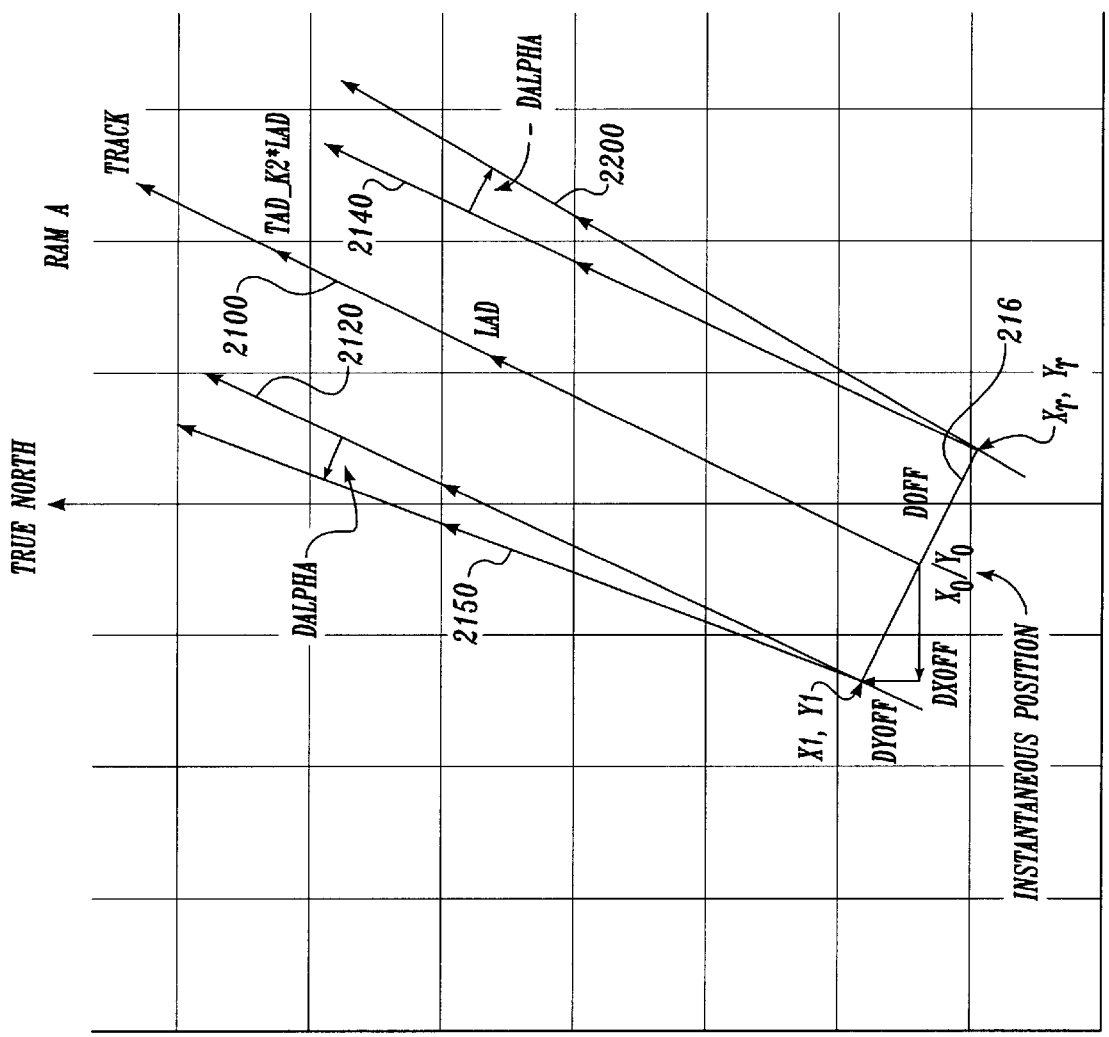
FIG. 23 is a plan view of an array of track vectors useful for defining the internal boundaries of the look ahead/look down/look up alert envelopes according to a preferred embodiment of the invention.

In the discussion above, the caution and warning envelopes are discussed in terms of a single vector along the track of the marine vessel. The single vector provides acceptable results because the relatively crude resolution of the terrain database stored in the first memory device is based upon the shallowest depth per cell and the natural noisiness of the heading and position information. However, the single vector approach does not take into account various errors, due to, for example, the terrain database, GPS longitude and latitude errors, as well as the heading accuracy. As such, the single vector along the track of the marine vessel may be substituted with an array of vectors, as generally shown in FIG. 23, which takes such errors into account. In particular, the track vector is identified with the reference numeral 2100 originating at the instantaneous position $X_0$, $Y_0$. A pair of vectors 2212 and 2214 are disposed at a configurable distance $D_{OFF}$, for example 0.2 nm, along a segment 2216, perpendicular to the vector 2100 at points $X_l$, $Y_l$, and $X_r$, $Y_r$. A pair of outside vectors 2218 and 2220, originating at points $X_l$, $Y_l$, and $X_r$, $Y_r$, respectively, are directed at a configurable angle $D_{ALPHA}$, relative to the vectors 2212 and 2214. The configurable angle $D_{ALPHA}$ may be selected as 3°, equivalent to the track accuracy of the GPS.

The coordinates $X_l$, $Y_l$ and $X_r$, $Y_r$ for the vectors 2218 and 2220, respectively, are determined. More particularly, the incremental X and Y vectors, $DX_{OFF}$ and $DY_{OFF}$, are determined as set forth in the equations below:

$$DX_{OFF} = \{D_{OFF}/\text{Cos (Latitude)}\} * \text{Cos (Track)},$$

where $D_{OFF}$ is a configurable distance between $X_0$, $Y_0$ and $X_l$, $Y_l$, for example 0.2 nm and the factor 1/cos(Latitude) is used to convert $DX_{OFF}$ to nautical miles when $DX_{OFF}$, $DY_{OFF}$ is in minutes and $D_{OFF}$ is in nautical miles.

$$DY_{OFF} = D_{OFF} * \text{Sin (Track)}$$

The coordinates $X_r$, $Y_r$ can be determined in a similar manner. Optionally copending attorney docket no. 543-99-006 Ser. No. 09/496,297 incorporated herein by reference describes a method of trident width expansion which can be adapted to marine applications to obtain the array of vectors. In addition, the width of the caution and warning envelopes may be defined with reference to the displacements required to complete IMO standard maneuvers as discussed in Section 4.2.1. This dimension can be further modified to account for narrow channels and confined operations as also previously described in Section 4.2.1.

4.2.4 Predicted Track Alerts

Another alternate embodiment of the invention utilizes predictions of the vessel's position at future points in time to obtain a projected track of the vessel. This embodiment differs from the previous embodiments described in that it is based on the predicted position vector rather than defining a dynamic protection envelope based on the vessel's current heading and speed. In this embodiment, an unsafe condition is detected when any point along the predicted track intersects the terrain or obstruction.

Figure 24:
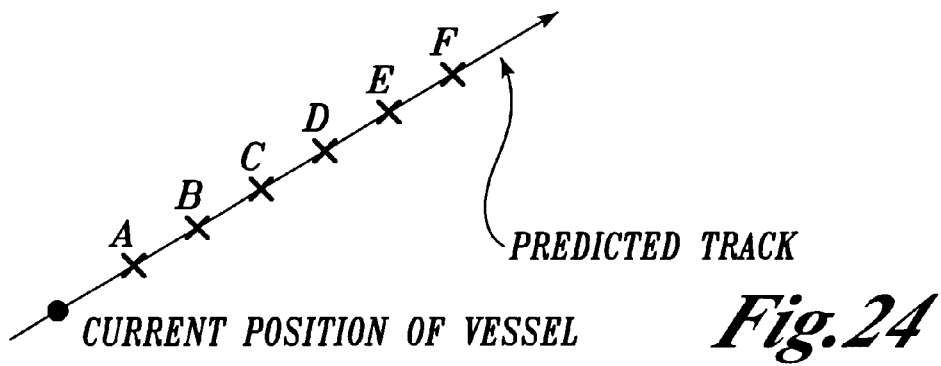
FIG. 24 illustrates a projected track vector according to a preferred embodiment of the present invention.

The projected track of the vessel is defined by a certain number of points A to F starting from its actual position, as illustrated in FIG. 24. This track is established from the current position of the vessel and its velocity and acceleration vectors in the manner previously described in Section 2.0.

Uncertainty in position along the projected track may be accounted for by defining a volume around the vessel having the following axes: an uncertainty margin in latitude $LAT_e$, an uncertainty margin in longitude $LONG_e$, and a vertical uncertainty margin $Z_e$, (optionally $Z_{e_d}$ and $Z_{e_h}$) to account for uncertainties in the keel depth and optionally the height of the ship. Preferably the magnitude of $Z_e$ is based upon the ship's response to waves presently being encountered by the ship as governed by the ship's sea keeping state equations and that all uncertainty margins account for errors in the measurement/navigation system.

Figure 25:
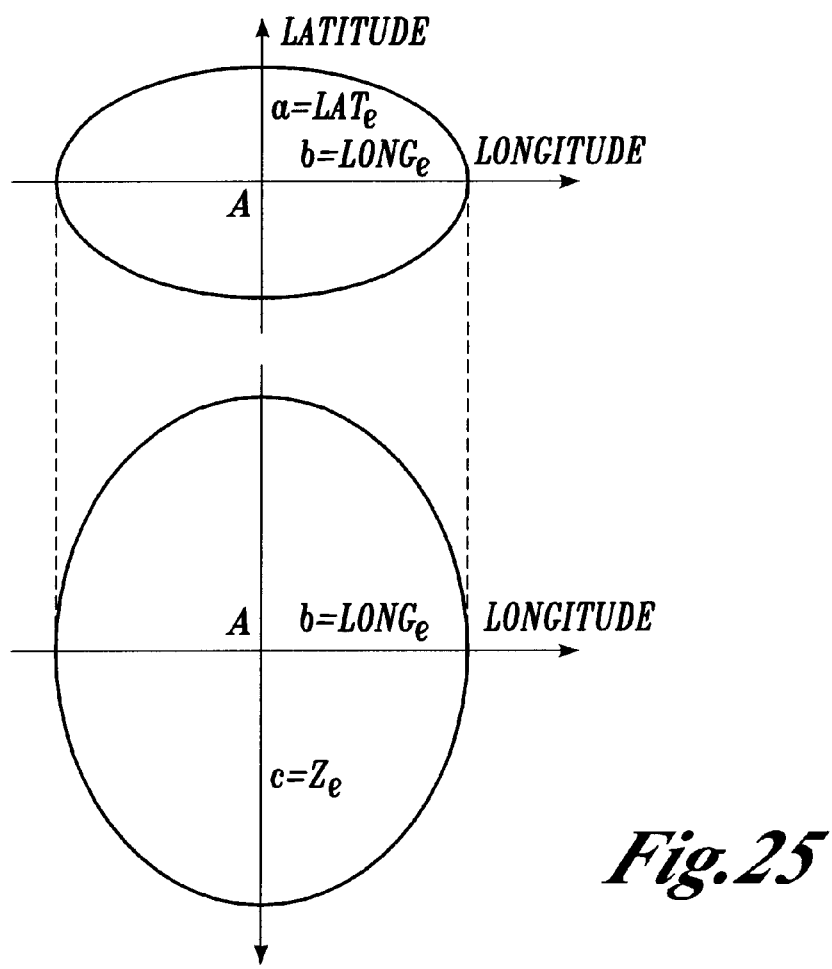
FIG. 25 illustrates an ellipsoid of uncertainty in position according to a preferred embodiment of the present invention.
Figure 26:
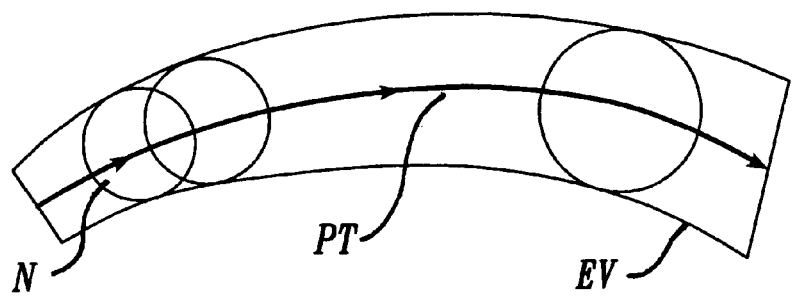
FIG. 26 illustrates use of ellipsoids of uncertainty about the projected track to obtain an envelope of probable position according to an embodiment of the present invention.

The volume of uncertainty resulting therefrom is an ellipsoid of revolution as shown in FIG. 25 whose half axes a, b and c are not necessarily equal. Thus, as illustrated in FIG. 26, an uncertainty range is associated with each point along the projected track of the vessel. In the explanation to follow, the simplifying assumption is made that $LAT_e = LONG_e$. Thus, the vertical projection in the horizontal plane of FIG. 26, results in an uncertainty circle of navigation N (an ellipse in the general case). The envelope of these circles in turn defines a projected track envelope EV round the predicted tack PT.

The length of predicted track PT for purposes of detecting unsafe clearances is configurable, but in a preferred embodiment may be determined using the look ahead distance calculations defined in any of the previous sections and/or by the vessel stopping or turning time.

Figure 27:
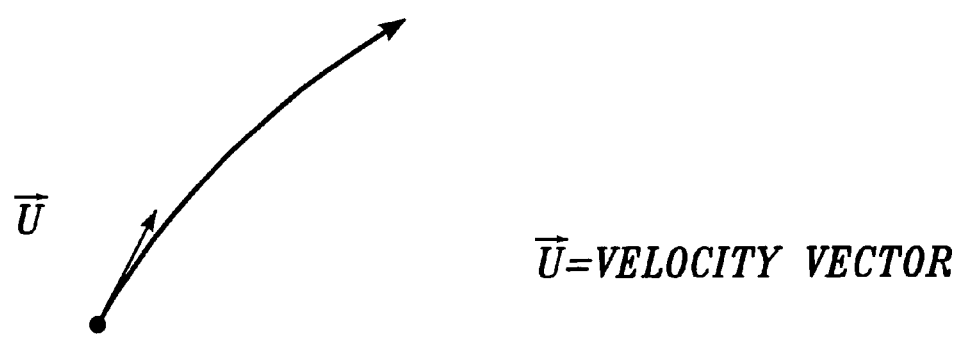
FIG. 27 illustrates the progress of vessel along the projected track in the local terrain map according to an embodiment of the present invention.

FIG. 27 schematically illustrates the progress of the position of the vessel in relation to the grids contained in the local memory. The updating of the local memory may be effected by retaining the region wherein the vessel is situated and by updating the three adjoining regions as illustrated in FIG. 27 by a dashed line.

Figure 28A:
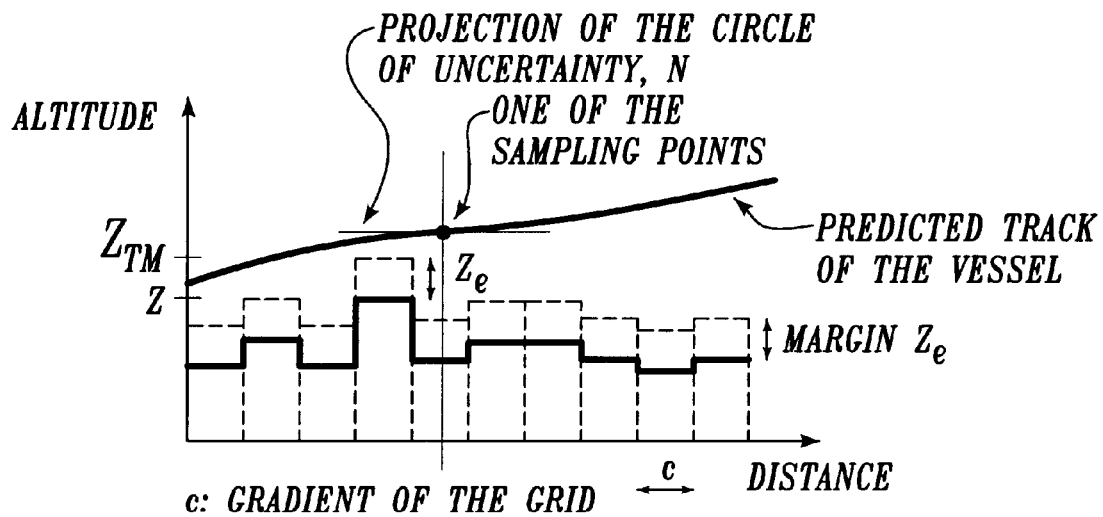
FIG. 28A illustrates an alert logic along a projected track sampling point according to an embodiment of the present invention.
Figure 28B:
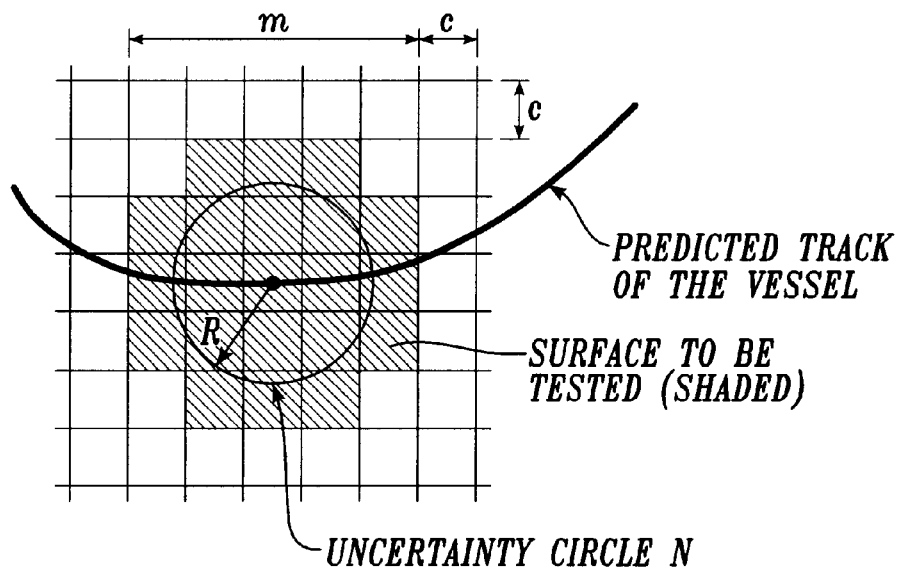
FIG. 28B illustrates a plan view of an alert logic along a projected track sampling point according to an embodiment of the present invention.

FIGS. 28A and 28B show the square uncertainty surface with maximum dimensions of m×m grids. All the depths are read and only the value of the shallowest depth Z, is retained and added to the uncertainty margin $Z_{ed}$ defined above. The resulting sum, ZTM, is illustrated in dashes. The set of values ZTM on the map will give the theoretical profile beneath the ship, and the alert logic compares this theoretical profile beneath the ship with the anticipated track of the ship. Optionally, as described above in Section 2.0 the uncertainty margin $Z_e$ may be added to the keel depth valve to save on computation.

In yet another embodiment of the invention, the alert logic also checks for clearance with obstacles, such as a bridge, under which the vessel must pass. In this embodiment, a second set of values ZTM2 is obtained and comprises the uncertainty warning in $Z_{e_h}$ representing the height of the ship summed with the clearance height Z of the obstacle. The alert logic compares the anticipated track of the ship with this overhead theoretical profile and outputs a warning signal when a collision possibility is detected. In a preferred embodiment of the invention, both a caution and a warning logic are associated with the curves of FIGS. 28A dn 28B. A warning is given when a point of the terrain intersects a sampling point in close proximity to the vessel such that the helmsman must intervene to avoid grounding the vessel or colliding with an overhead obstacle. The location of this sampling point can be determined by reference to the point at which a turning or stopping maneuver can be executed. A caution is given to forewarn the helmsman that projected track will encounter an obstacle if it is continued as it is and that he must consider an avoidance maneuver. The look-ahead distances for the caution and warning sampling points can be determined as described in any of the preceding sections.

4.3 Avoidance Maneuver Logic

When a possible collision with underwater terrain or overhead obstacles is detected then the present invention may optionally be provided with a device and or logic for calculating an avoidance law.

Figure 29A:
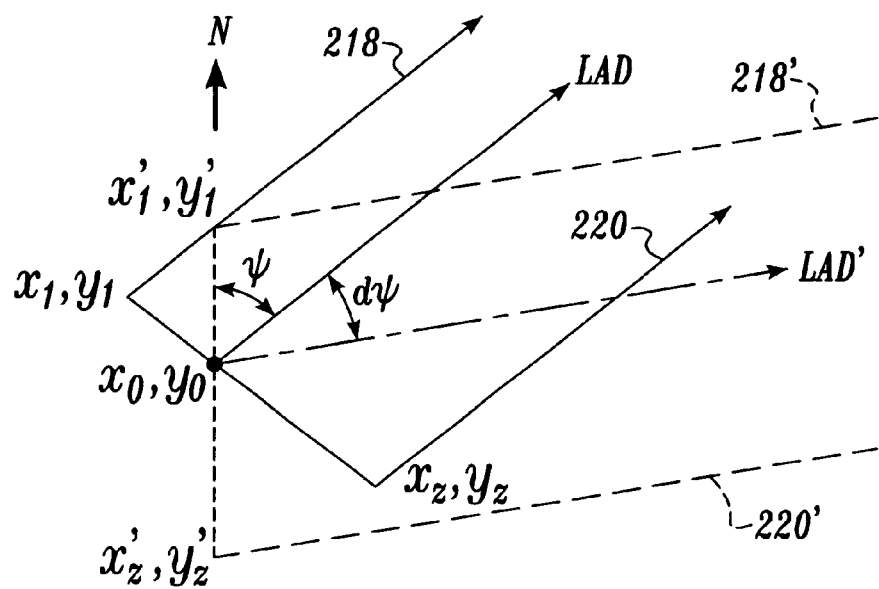
FIG. 29A illustrates calculation of an avoidance maneuver in accordance with an embodiment of the present invention.
Figure 29B:
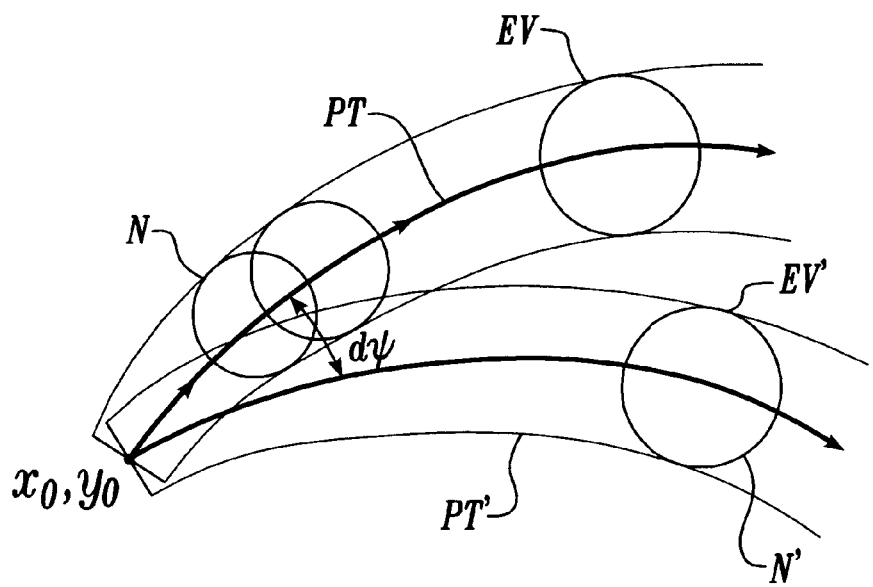
FIG. 29B illustrates calculation of an avoidance maneuver using projected track alert envelopes in accordance with an embodiment of the present invention.

The invention constructed in accordance with this embodiment may optionally further include an avoidance logic which alerts the crew to a new heading to steer and/or engine setting to avoid collisions. Specifically when a potential conflict is detected using one of the predictive alerting schemes in the manner described above in Sections 4.2, the invention next checks for an available collision free pathway having an origin point at the present position of the vessel. FIGS. 29A and 29B illustrate operation of this feature. By way of example, FIG. 29A illustrates operation of the avoidance logic when one of the envelope based methods of Section 4.2.1, 4.2.2, or 4.2.3. is used. FIG. 29A shows a plan view wherein the ship's heading is incremented by a nominal step size $d\psi$. A protective envelope is constructed as indicated by the boundaries 2180', 2200', LAD', $X_1'$, $Y_1'$, and $X_2'$, $Y_2'$. This envelope is checked for terrain clearance in accordance with the methods described in the aforesaid sections.

FIG. 29B illustrates operation of the avoidance logic when the alerting scheme of Section 4.2.4 is used. In FIG. 29B, an alternate track PT' is first generated by incrementing the ship's current heading by nominal step size $d\psi$. Alternate track PT as surrounded by envelope EV' is then checked for terrain clearance in accordance with the method described in Section 4.2.4.

When selecting alternate track candidates the routine may preferably also consider the performance parameters of the ship. A genetic algorithm or other optimization routine well known to those of skill in the art may be used to refine the initial heading guess $d\psi$. The optimization routine can be constrained if desired by eliminating non practical or illegal maneuvers. For example, if the data base contains shipping lane information and the avoidance manoeuver places the vessel in the oncoming sea lane, this guess may be eliminated as a valid candidate from the alternate track choices. Such tracks, which represent an illegal maneuver but do not themselves represent an immediate grounding hazard, may be retained, however, when it proves to comprise the entire set of alternative tracks. Candidate tracks that themselves, present a grounding or obstruction hazard are also removed as a candidate track option. Preferably, the optimization routine selects a track with a constraint of minimizing changes in the ship's current heading. This constraint avoids major course corrections and deviations from the intended course of the vessel. If no safe alternate heading can be found during calculation, or if the solution heading approaches 90°, the avoidance logic defaults to recommending a stopping maneuver, course reversal or other operational procedure.

Use of the avoidance logic in conjunction with the predictive alerting schemes may be of benefit not only in suggesting evasion maneuvers, but also in reducing nuisance alarms. For example, if the vessel is operating in confined areas such as a river bend or canyon, the alerting envelope area can be reduced and need not take into account the area of a pre-assumed stopping or turning response to an alert. The alerting envelope internal area to each side of the ship can therefore be reduced or eliminated. Terrain and obstacles located within the region of the pre-assumed standard evasive maneuver which may have previously generated an erroneous, or nuisance, alert is thereby no longer a factor.

4.4 Strategic Alerting

The reactive and predictive alerts of Sections 4.1 and 4.2 provides tactical information to the ship's crew useful for avoiding potential grounding hazards or collisions. The predictive logic of Section 4.2 can also be additionally used in a strategic manner for route proving. In such an embodiment, the intended course or points of intended movement are received as input and any of the logic of Section 4.2 can be used to check for sufficient terrain clearance along the plotted course. The invention can further refine the robustness of this check by including the tide data and any known currents (set and drift data) for the estimated time of arrival at points along the route. In this manner, the crew can be alerted to any errors in navigation plotting and/or to areas along the intended course that may present an increased collision hazard. The crew can then make a course correction or will alternatively maintain heightened vigilance when traversing these high risk areas.

5.0 Display System

A display system, generally identified with the reference numeral 4000, is illustrated in FIGS. 30–44. The display system 4000 is used to provide a visual indication of the terrain advisory and terrain warning indications discussed above as a function of the current position of the vessel. Background terrain/obstacles information is also provided which provides an indication of significant terrain relative to the current position of the vessel.

In order to declutter the display, background information may be displayed in terms of predetermined dot patterns whose density varies as a function of the elevation of the terrain relative to the altitude of the vessel. Terrain advisory and terrain warning indications may be displayed in solid colors, such as yellow and red, relative to the anticipated track of the vessel.

The terrain background information as well as the terrain advisory and warning indications may be displayed on a navigational or weather display, normally existing on the bridge, which reduces the cost of the system and obviates the need for extensive modifications to existing displays, such as a navigational and weather radar type display. The terrain and obstacle display can be toggled from the existing displays or superimposed on the existing weather/radar display. In particular, the terrain data is converted to a weather radar format in accordance with any standard digital bus protocol used aboard commercial shipping vessels. The terrain data, masked as weather data, can then be easily displayed on an existing navigational or a dedicated weather radar display.

Figure 30:
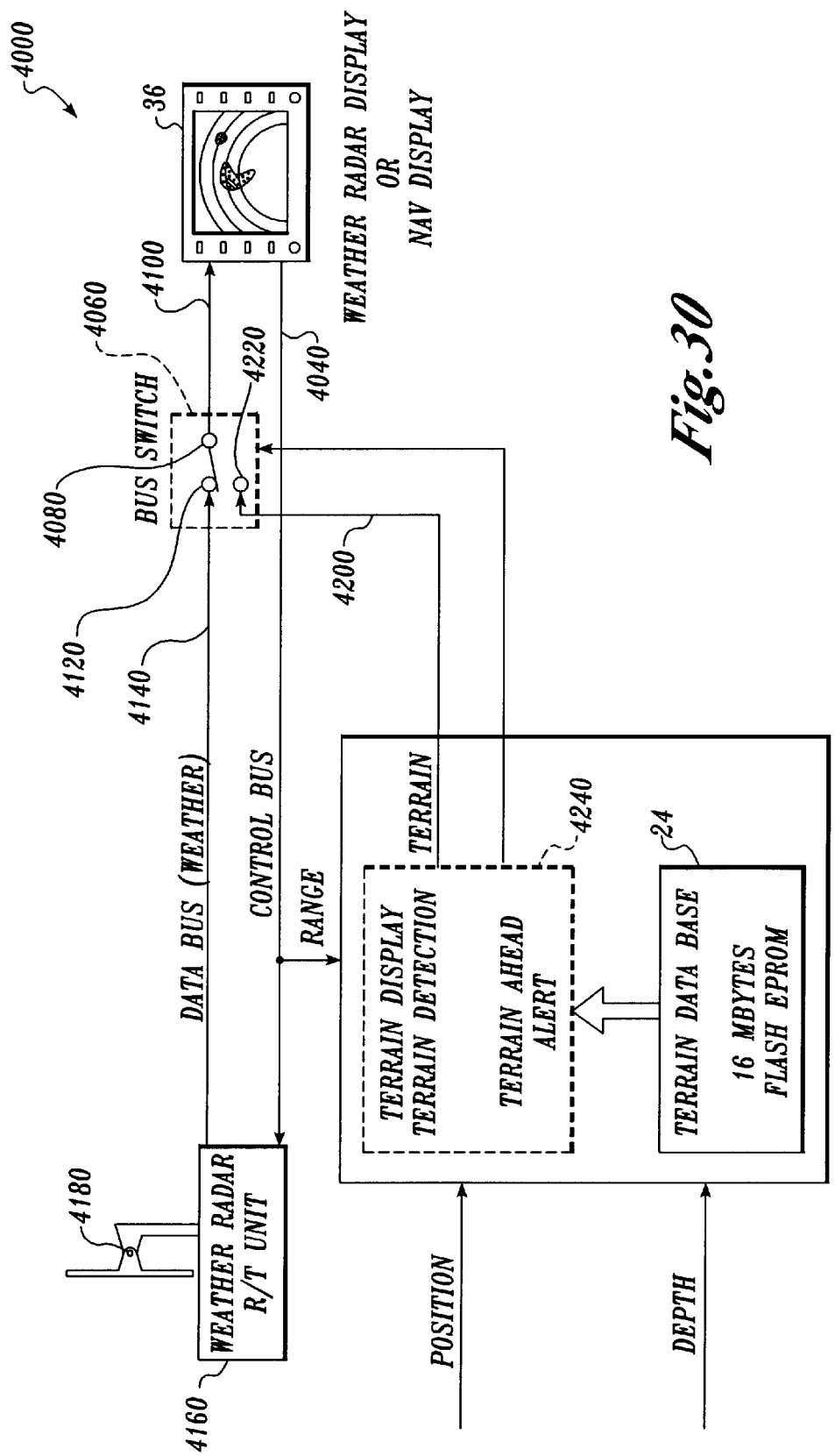
FIG. 30 is a block diagram of a display system according to one embodiment of the present invention.

As shown in FIG. 30, display system 4000 includes a weather radar display or navigational display 36 connected to a control bus 4040 conforming to a predetermined bus standard and a terrain data bus switch 4060. The terrain data bus switch 4060 enables selection between terrain data and weather radar data for display. More particularly, data bus switch 4060 includes a common pole 4080 connected to the display 36 by way of a serial display bus 4100. One contact 4120 on the data bus switch 4060 is connected to a serial weather data bus 414 and, in turn, to a weather radar R/T unit 4160, which transmits weather radar data over the weather data bus 4140.

An antenna 4180 provides weather radar data to weather radar R/T unit 4160. Weather radar R/T unit 4160 is also connected to control bus 4040, which is used for range and mode data.

To facilitate compatibility with existing radar displays, which sweep out data over an arc, the terrain advisory and terrain warning indications, as well as the background information discussed above, may be converted to "RHO/THETA" format. The converted terrain data is then applied to a terrain data serial bus 4200 and connected to a contact 4220 on the data bus switch 4060 to enable selective display of either weather radar or terrain data on display 36.

Figure 31:
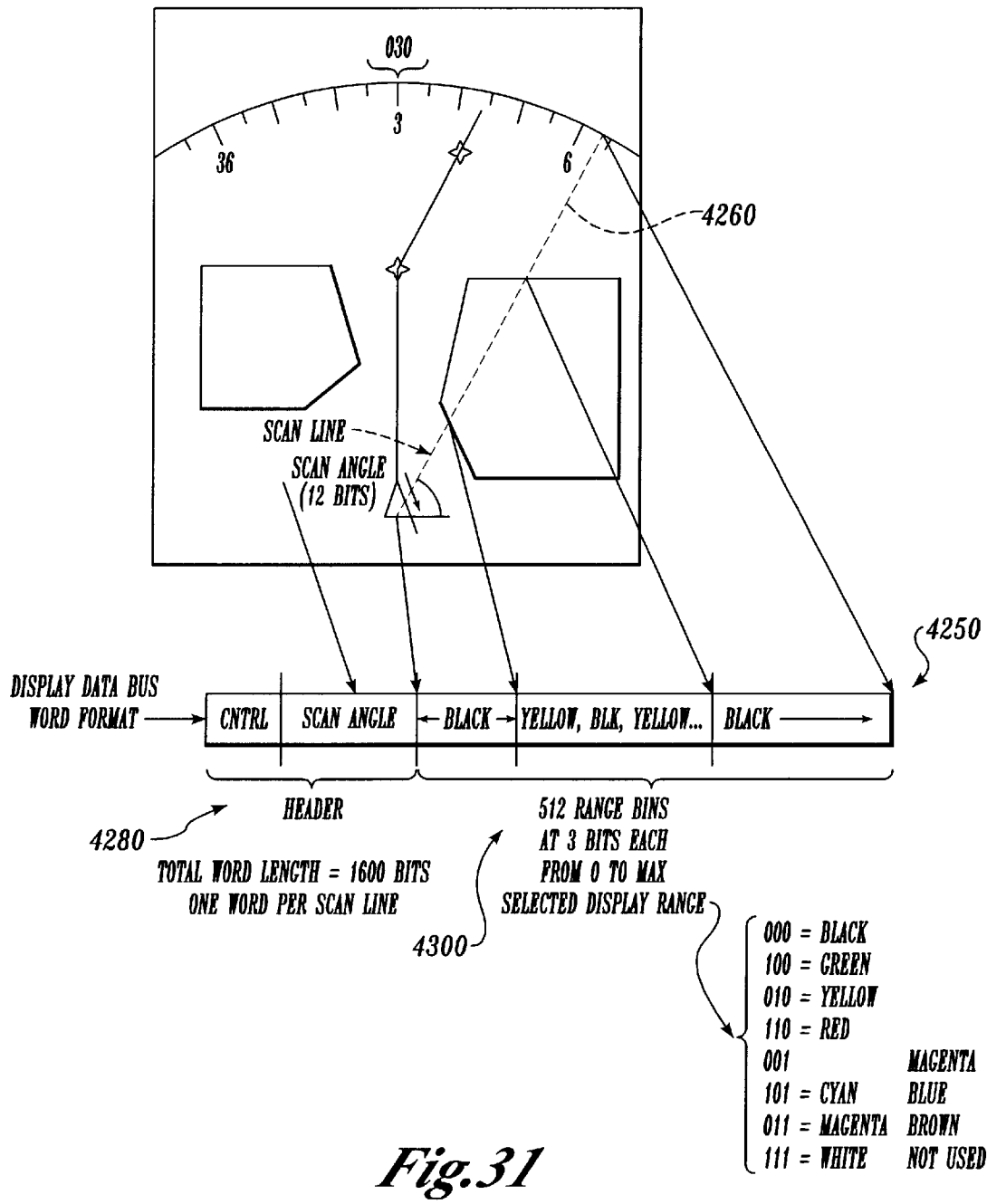
FIG. 31 is a functional diagram of the display data format in accordance with a preferred embodiment of the invention.

FIG. 31, illustrates a preferred embodiment of the invention in which each word 4250 is 1600 bits long and represents one spoke or radial 4260 of the display 36. Normally, 512 spokes or radials 4260 are transmitted for each complete sweep of the display 36. At a transmission rate of, for example, 1 megahertz (MHz), each word 4250 takes about 1.6 milliseconds (msec) to transmit. For 512 spokes, one complete sweep will thus take about 4 seconds.

The 1600-bit words 4250 include a header 4280 and 512 range bins 4300. The header 4208 includes the control data on the control bus 4040 and also includes a 12-bit code representing the antenna scan angle; the angle of the spoke relative to the vessel heading equivalent to an indicator UP direction. The range bins 4300 cover the distance from the antenna 4180 to the maximum selected. Each of the 512 range bins includes three intensity bits, encoded into colors as indicated in Table II below.

TABLE II

| 3-BIT RANGE CODE | COLOR |
| --- | --- |
| 000 | BLACK |
| 100 | GREEN |
| 010 | YELLOW |
| 110 | RED |
| 001 | — |
| 101 | CYAN |
| 011 | MAGENTA |
| 111 | — |

As will be discussed in more detail below, display system 4000 is capable of displaying background terrain information as well as terrain threat indications as a function of the current position of the vessel. For convenience, where a specific example is desirable to illustrate the display of tactical terrain/obstacle alerts according to the invention, the predictive algorithm of 4.2.3 is used as an example. The threat detection algorithm is run along the projected track of the vessel. Thus, terrain threat indications are typically displayed along the projected track while background terrain is displayed relative to the heading of the vessel.

Figure 32:
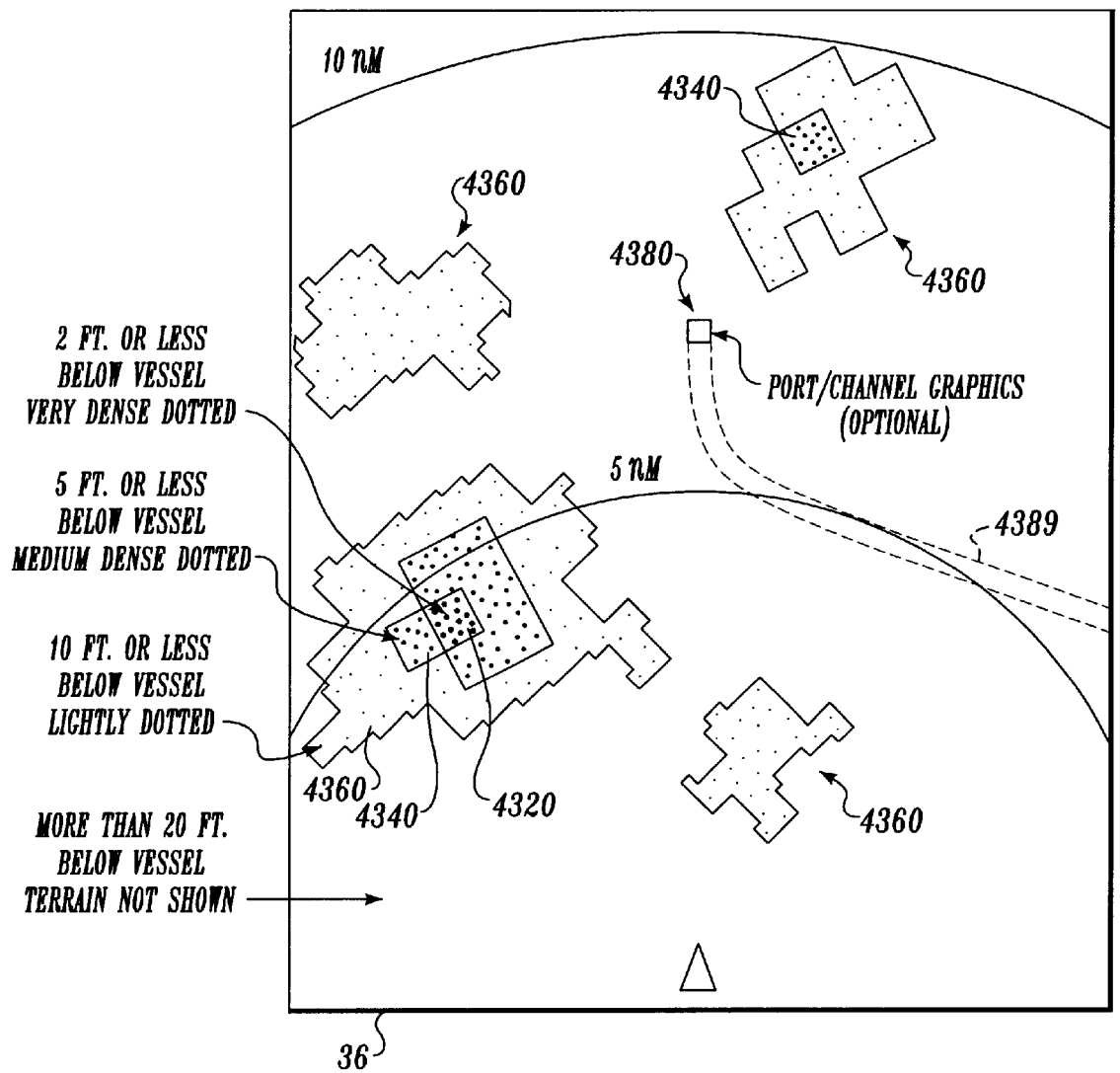
FIG. 32 is a plan view of a background terrain display illustrating the variable density dot pattern.

In FIG. 32, the terrain background information is shown on the display 36. As will be discussed in more detail below, the depth of the terrain most proximate to the ship is shown as a series of dot patterns whose density varies as a function of the distance between the vessel and the terrain. For example, a relatively dense dot pattern 4320 may be used to indicate terrain that is, for example, 2 feet or less below the vessel. A medium dense dot pattern 4340 may be used to represent terrain that is 5 feet or less below the vessel, while a lightly dotted pattern 4360 may be used to indicate terrain 10 feet or less below the vessel. In order to declutter the display 4020, terrain more than, for example, 20 feet below the vessel, is not shown. The dots may be displayed in one of the colors indicated in Table II above, for example, yellow (amber). In addition, in the vicinity of a port or known waterway, port structures 4380 and/or a shipping channel pathway 4389, for example, in green, may also be provided. The apparent display resolution may be increased by using more than one color along with the variable density dot patterns, for example, as shown in Table III below.

TABLE III

| DOT DENSITY | HIGH | 3000 | 0 |
| --- | --- | --- | --- |
| PATTERN | MEDIUM | 4000 | 1000 |
| | LOW | 5000 | 2000 |
| COLOR | | GREEN | YELLOW |

Figure 33:
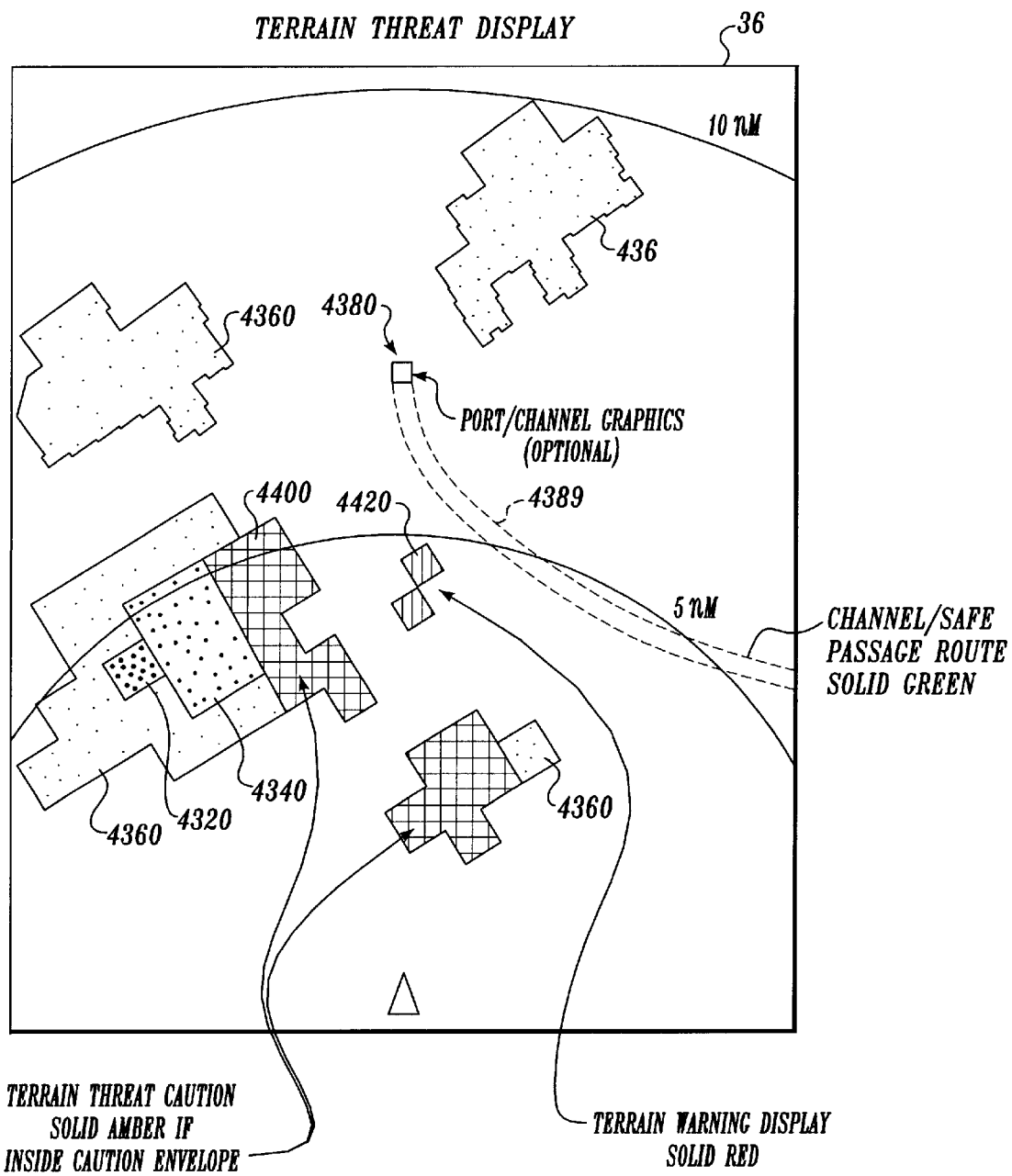
FIG. 33 is similar to FIG. 32 but additionally illustrates the terrain threat indications.

The display of a terrain threat indication is illustrated in FIG. 33. As shown, the terrain threat indication may be displayed contemporaneously with the background terrain information. Terrain advisory and terrain warning indications are displayed in solid shapes 4400 and 4420, respectively, for example, "squares"; the displayed terrain map cells which represent a threat painted solid yellow or red. More particularly, at an aspect ratio for the display of, for example, 3×4 (vertical to horizontal), the terrain cells will appear "square", particularly at relatively low-range settings. Colors are used to distinguish between terrain advisory and terrain warning indications. For example, red may be used to represent a terrain warning indication 4420 while yellow or amber is used to represent a terrain advisory indication 4400. By using colored shapes for terrain threat indications and dot patterns of variable density for the terrain background information, clutter of the display 4020 is minimized.

The terrain data from the terrain data base 24, for example, as illustrated in FIG. 8, is used to compute the terrain threat indications as well as background information for the display 36. As discussed above, the terrain data base 24 may be stored in a flash ROM 4440 (FIG. 9) for convenience of updates. In order to facilitate update of the display 36 as a function of the position of the vessel, terrain data from the flash ROM 4440 is transferred to a random access memory (RAM) A, identified with the reference numeral 4460. As will be discussed in more detail below, the RAM A is mapped with terrain data from the flash ROM 4440, centered about the current position of the vessel, as illustrated in FIG. 9.

Figure 34:
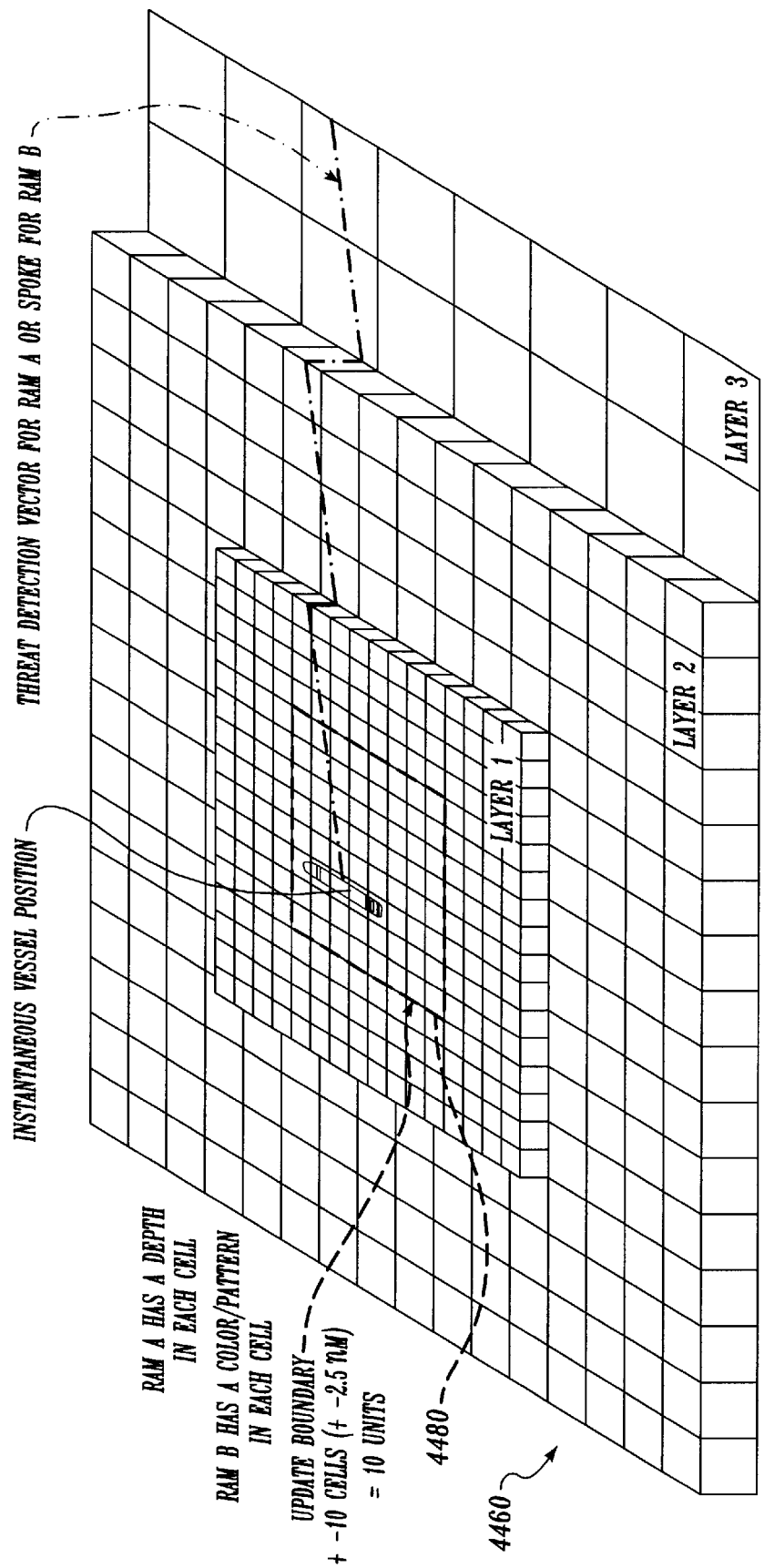
FIG. 34 illustrates a wedding-cake configuration for a RAM utilized in the present invention.

In order to provide a relatively large display range, while minimizing processing time as well as the size of the RAM A, the RAM A is configured as a "wedding cake" as generally illustrated in FIG. 34 and configured such that the finest terrain resolution is near the position of the vessel and the terrain farthest from the vessel position has the lowest resolution. For example, the RAM A may be provided with four (4) layers. As shown, the instantaneous vessel position is shown generally centered in layer 1, having the highest resolution. The resolution of layer 2 lies between the resolution of layer 3 and layer 1. Layer 4 (not shown) is provided with a relatively coarse resolution for use in a cruising mode.

Such a variable resolution display, configured as a layered wedding cake, minimizes the memory size of RAM A as well as the processing time. In order to improve the performance of the system, the flash ROM 4440 may also be configured similar to a "wedding cake", as generally illustrated in FIG. 9.

As discussed above, the terrain data base 24 may be provided with variable resolution. Relatively coarse resolution can be formed by combining finer resolution maps. With such a resolution, the configuration of RAM A may be selected, for example, in accordance with Table IV. Finer resolutions layers may be used if desired, such as near ports.

TABLE IV

TABLE IV

| LAYER | RESOLUTION (MINUTES) | LAYER SIZE (MINUTES) |
|---|---|---|
| 1 | ½ × ½ | 32 × 32 |
| 2 | 1 × 1 | 64 × 64 |
| 3 | 2 × 2 | 128 × 128 |
| 4 | 5 × 5 | REMAINING AREA |

Each layer is generally centered relative to the vessel position as shown in FIG. 34 at the time of the update of RAM A. Each layer of the "wedding cake" has its own update boundary. For example, layer 1 of the RAM A includes an update boundary 4480. As the vessel passes through the update boundary 4480, the RAM A is updated with new terrain data from the flash ROM 4440 (FIG. 9) as will be discussed in more detail below.

Figure 10:
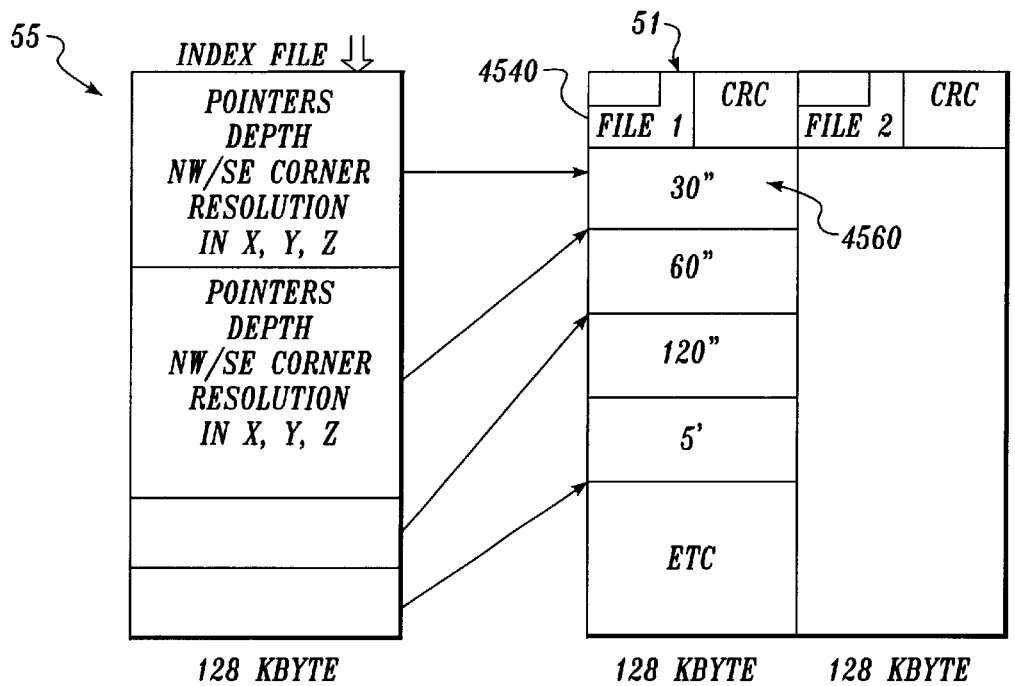
FIG. 10 is a diagram of the file format of the files in the terrain data base in accordance with a preferred embodiment of the present invention.

Because of the refresh rates required for the display 36, the terrain data may be stored in files alternative to the format illustrated in FIG. 8A. For example, the file format of the terrain data may include an index file or header 55, stored in one or more 128 K byte storage blocks and a plurality of data files 51, as generally shown in FIG. 10.

As shown, each index file 55 may include pointers to specific data files 51, the length of the map file, as well as the position of one or more of the corner boundaries of the file 51, for example, northwest and southeast corners of each map file 51, which facilitates updates of the display 36 as a function of the current vessel position. The index file 55 may contain information regarding the length of the map file 51, a start of file or altitude offset, the resolution of the map file 51, and whether and how the file 51 is compressed to enable use of various compression algorithms.

The data files 51 may include a file header 4540 as well as data blocks 4560 shown in FIG. 35, which, as shown, can be grouped according to resolution size. The file header 4540 indicates various information about the file. The format of the header 4540 may be structured as follows:

<MAJOR VERSION BYTE><MINOR VERSION BYTE><FILE STATUS BYTE><ATTRIB BYTE>

<FILE NAME (8 CHARACTERS)><EXTENSION (4 CHARACTERS)>

<FILE LENGTH LONGWORD>

<TIME STAMP LONGWORD>

<CRC LONGWORD>

<SPME LONGWORD>

The major and minor version bytes relate to the revision status of the data in the data files 51. The minor version is set as the inverse of the byte value of the major version such that a default erase will indicate a zero version. The file status byte 4570 provides various information regarding the status of the file as discussed below, while the attribute byte is reserved. The file name, extension file length, and spare data are self-explanatory. The time stamp relates to the operational time of the system (i.e. length of time in use) while the CRC data relates to the data files 51. The status byte may be used to provide the following information regarding the data blocks 4560, for example, as set forth in Table V below:

TABLE 6

| FLAG BYTE VALUE | INFORMATION |
|---|---|
| FF | EMPTY |
| FE | DOWNLOADING |
| FO | VALID |
| EO | READY TO ERASE |
| . | RESERVED |
| . | RESERVED |
| 00 | RESERVED |

The EMPTY status (FF) is set by erasing the data blocks 4560, while the DOWNLOADING status (FE) is set as part of the image. The VALID status (FO) is set when the file is loaded. The READY TO ERASE (EO) is set by the file system for obsolete blocks.

As indicated below, various corrections of the data files 51 may be required in areas near ports and shorelines. The depths, as discussed above, are generally selected to be the shallowest depths within the cells, rounded up to the next highest resolution increment, for example 2 or 54 feet. While such a system provides useful and conservative terrain data for use with the terrain data base 24, such a system in the vicinity of a port or shoreline can cause the elevations of critical features to be too high or too low. Such errors in feature depth can degrade system performance, and, in particular, cause improper performance of the terrain advisory and terrain warning cut-off boundaries.

In order to solve this problem, the actual depth below mean sea level of the terrain feature, rounded to the nearest resolution, is used for cells 4550 around a perimeter of the terrain feature.

Figure 36:
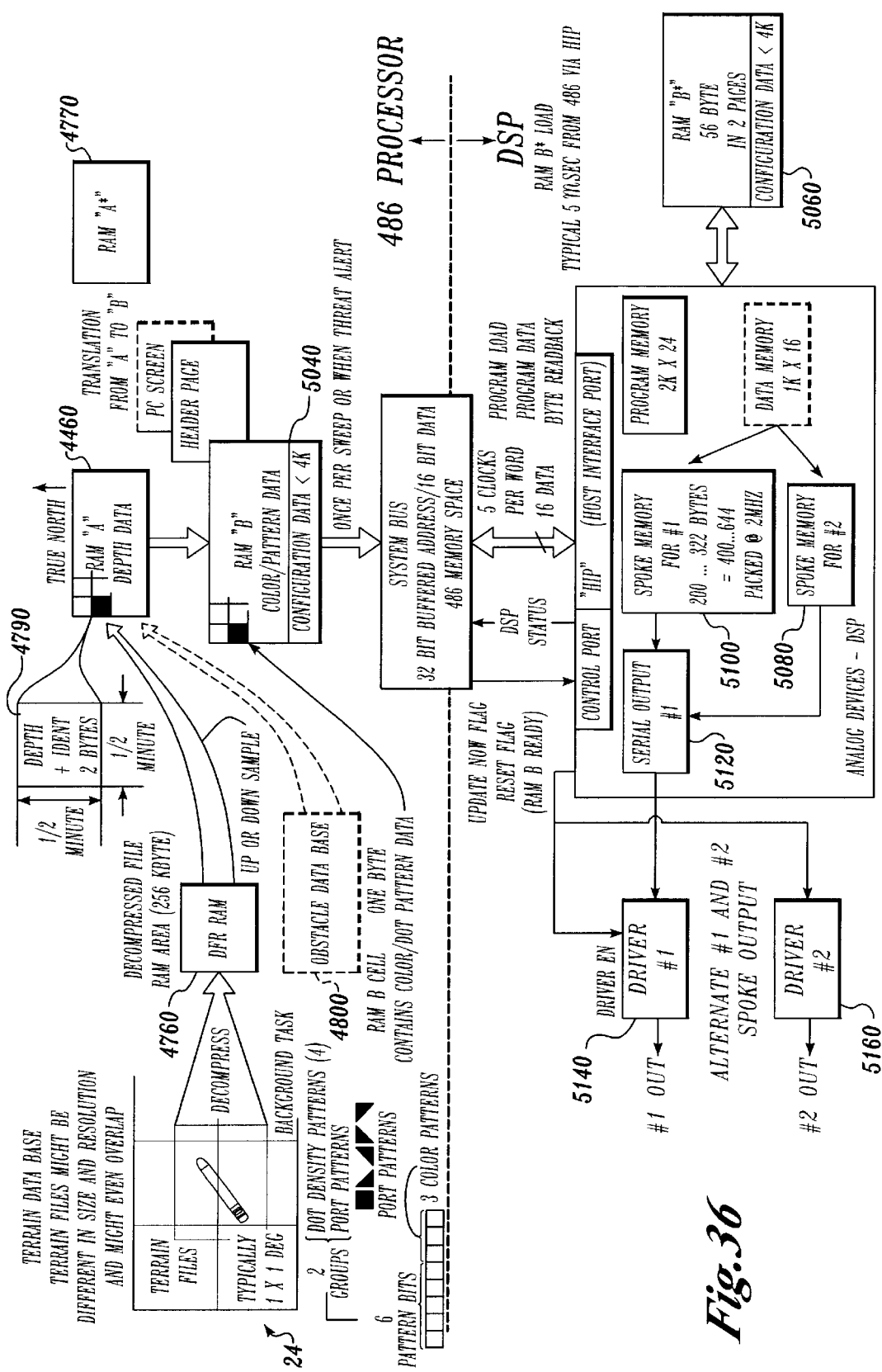
FIG. 36 is a block diagram of the display system in accordance with a preferred embodiment of the present invention illustrating the memory configuration and the data flow.

FIG. 36 represents a simplified block diagram for implementation for the display system 4000 in accordance with the present invention. Display system 4000 may include a microprocessor, for example, an Intel type 80486, 25 MHz type microprocessor ("486") and an Analog Devices type digital signal processor (DSP). The DSP is primarily used for calculating the RHO/THETA conversions to off load the 4860.

Display system 4000 may have a normal mode and a cruise mode. In a normal mode, display system 4000 displays terrain out to, for example, 10 minutes sailing time, while in cruise mode out to about ½ hour of sailing time. In the cruise mode, it is contemplated that the background terrain display levels can be lowered by the crew such that terrain, for example 100 feet or 200 feet below the vessel, can be displayed. Alternatively, the display level could automatically be adjusted to the highest terrain within the selected display range; the value of this level set forth in amber, for example.

The 486 runs a "file picker" routine which searches terrain data base 24 for terrain data covering the area relative to the current position of the vessel. For example, in a normal mode, the file picker routine searches the terrain data base 24 for terrain data covering a given area relative to the current position of the vessel. As indicated above, the terrain data base 24 includes index files 55 (FIGS. 8B and 10) which may include the northwest and southeast corners of each map file 51 in order to facilitate the search. A list of files covering the area is assembled and maintained.

Index file 55 also includes information as to whether and how data files 51 are compressed. The files may be compressed/decompressed by a modified Huffman code, or techniques known to those of ordinary skill in the art.

If data files 51 are compressed, the files are decompressed in the background because of the relatively long decompression time and stored in a decompressed file RAM (DFR) 4760, for example 256 words. The decompressed files are then transferred to RAM A, identified with the reference number 4460. On power-up, one or two files around the vessel are decompressed and displayed to allow immediate display of a limited range, relative to the position of the vessel. As more terrain data files are decompressed, the additional range is displayed.

The RAM A may be configured in a plurality of cells 4790, as shown in FIG. 36, representative of a terrain area 15 arc seconds×15 arc seconds, with true north appearing at the top of RAM A as shown. Each cell 4790 is two bytes wide and includes data regarding the shallowest depth in the cell as well as the identity of each cell 4790. As such, the RAM A is addressable by X and Y coordinates and thus represents a map with a depth in each cell 4790. The identity of the cell may be used to distinguish between terrain data, for example, from terrain data base 24 and obstacle data. In some applications, an obstacle data base indicating underwater obstructions may be utilized.

As indicated above, the RAM A may be configured as a wedding cake with various layers, as generally shown in FIG. 34 with the top layer (i.e. layer 1) having the highest resolution. Terrain data is loaded into the RAM A such that the vessel is roughly centered in the top layer, where the terrain advisory and warning detection algorithms are run. Once the vessel moves outside the update boundary 4480 of FIG. 34, the top layer of the RAM A is reloaded with terrain data with the vessel centered. The lower layers may also be provided with update boundaries, which enable the lower layers to be updated independently and less frequently than the top layer.

Figure 37:
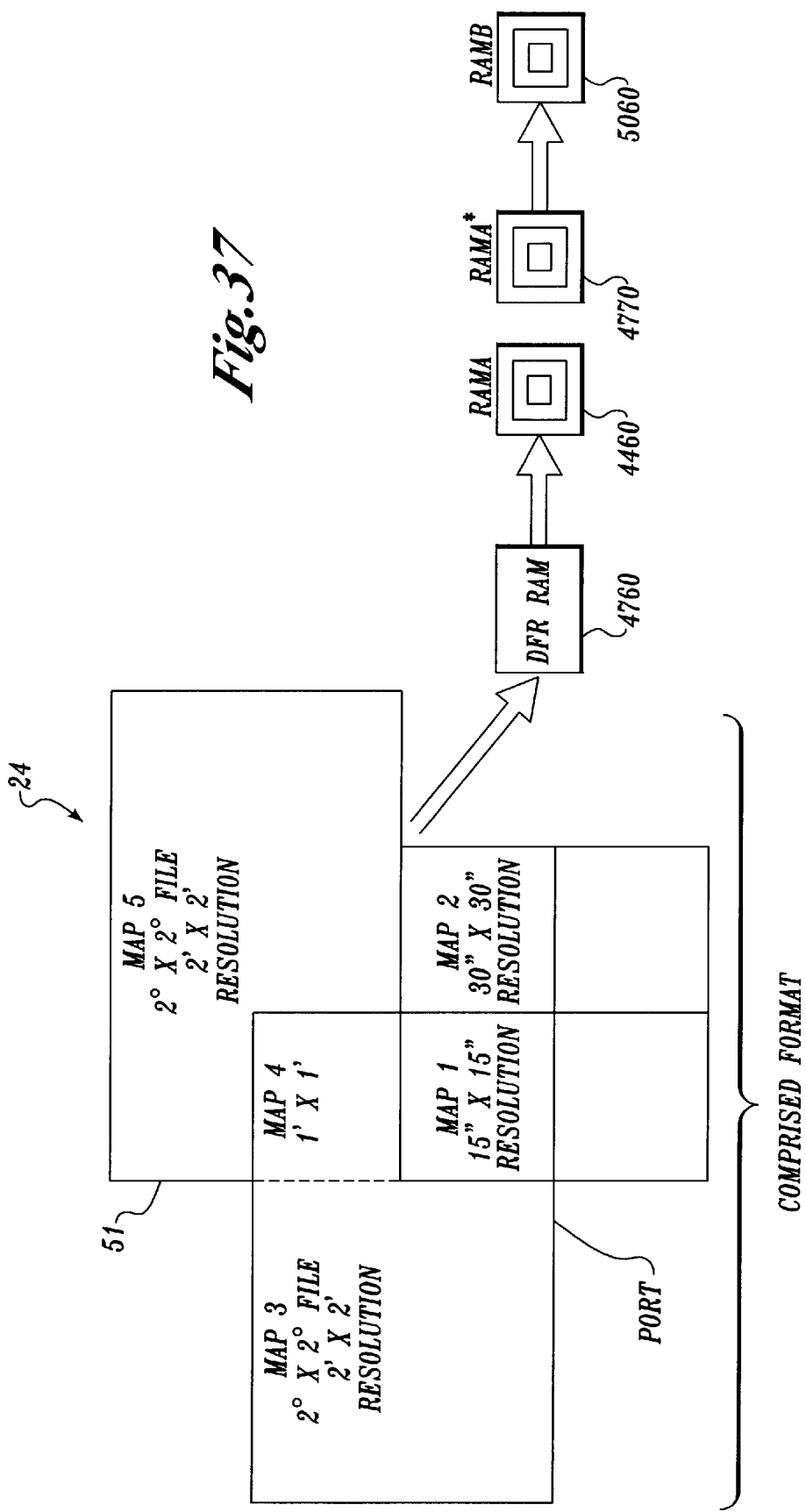
FIG. 37 is a block diagram of a configuration alternative to that shown in FIG. 36.

As discussed above and illustrated in FIG. 9, the flash ROM 4440 for terrain data base 24 may also be configured as a wedding cake as illustrated in FIG. 34. In such an implementation, the highest resolution is provided near ports and shorelines while coarser resolutions are provided elsewhere. For example, as illustrated in FIG. 37, the terrain data base 24 may be configured with 1°×1°, 2°×2° or 10°×10° map files. Some of the map files may overlap, similar to a "wedding cake." Maps further away from the port may be provided with resolutions of, for example, 1×1 minute or 2×2 minutes while a coarse resolution (i.e. 5N×5N or 10N×10N) may be provided even further from the port.

Figure 40:
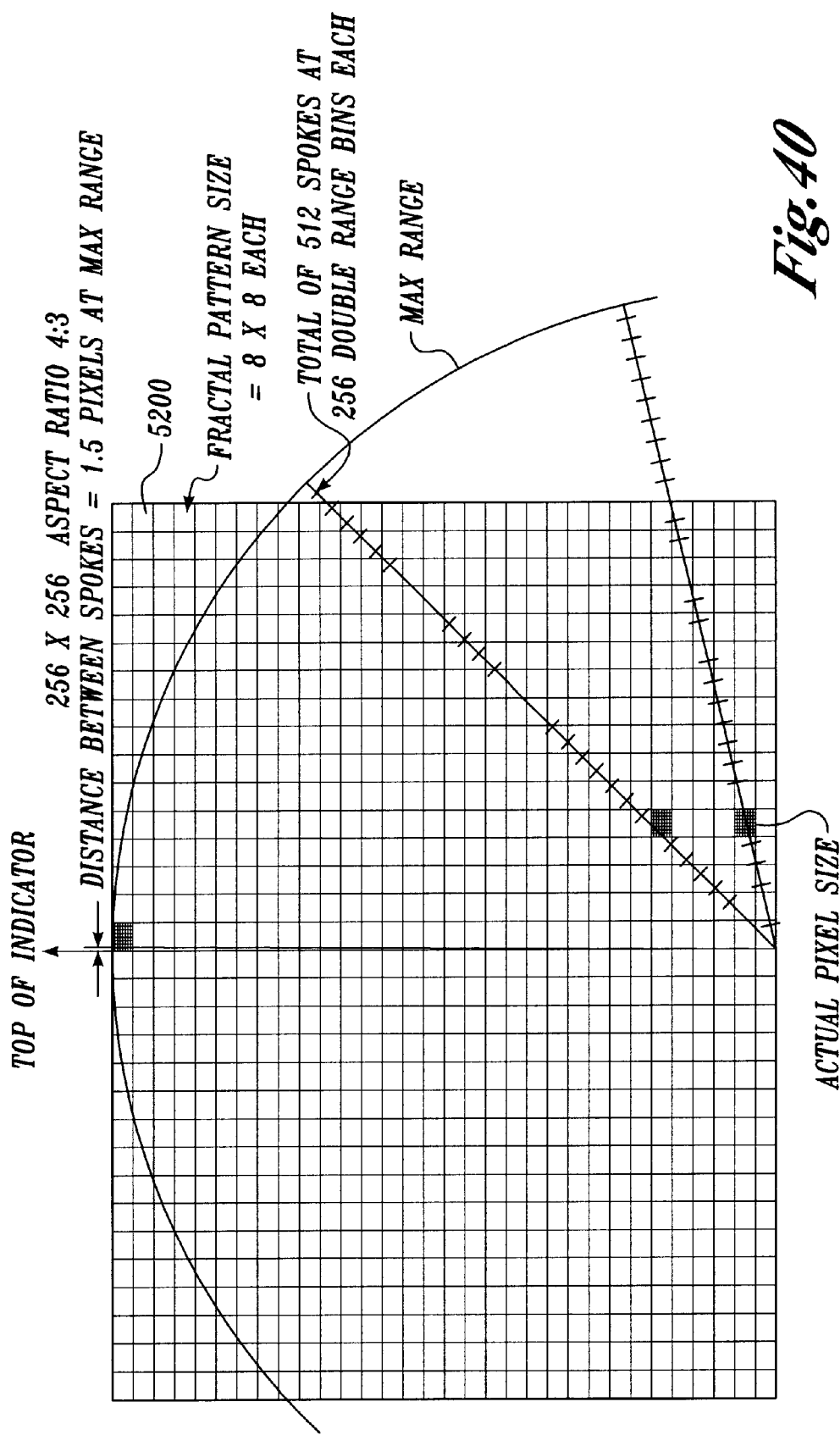
FIG. 40 is a diagram of a pixel map of the display.

An upload routine may be used to upsample or downsample terrain or obstacle data into the RAM A from the DFR RAM 4760 as shown in FIG. 40. Such a routine is well within the ordinary skill in the art. The top three layers (i.e. layers 1, 2 and 3) of the RAM A of FIG. 38 are updated from the map file source from the flash ROM 4440 for terrain data base 24 having the highest resolution, except for the 5×5 minute layer, which is updated only from a 5×5 minute file source to reduce processing time.

Alternatively, as shown in FIG. 37, an additional RAM A*, identified with the reference numeral 4770, may be provided and structured similar to the RAM A 4460, forming a "ping-pong" memory arrangement. In this embodiment, one terrain data file 51 is decompressed one file at a time and loaded into the DFR RAM 4760 and then upsampled to either the RAM A or RAM A*. For example, while the RAM A is being loaded with additional decompressed files, the terrain threat and display algorithms are executed from the RAM A*. Once the RAM A is updated, the RAM A is then used for the computations while the other RAM A* is updated with new data from the DFR RAM 4760 to account for changes in the vessel position.

The 5×5 minute resolution layer is primarily intended for use in a cruise mode to provide a look-ahead range of about a half hour. As was illustrated in FIG. 10, each file includes an index file 55 which contains data relative to the resolution of the terrain data in a particular map file 51. Such information can be used to vary the resolution of the map files as a function of longitude and latitude position. For example, the latitude resolutions of the map files can be decreased at higher latitudes in a northward direction. Moreover, longitude resolution in the RAM A can be varied and provided with, for example, a one degree latitude hysteresis to prevent flipping back and forth as a vessel cruises northwardly. Once the terrain data from terrain data base 24 is loaded into the RAM A, the terrain advisory and warning algorithms ("detection algorithms") are run, for example, at once per second.

Figure 38:
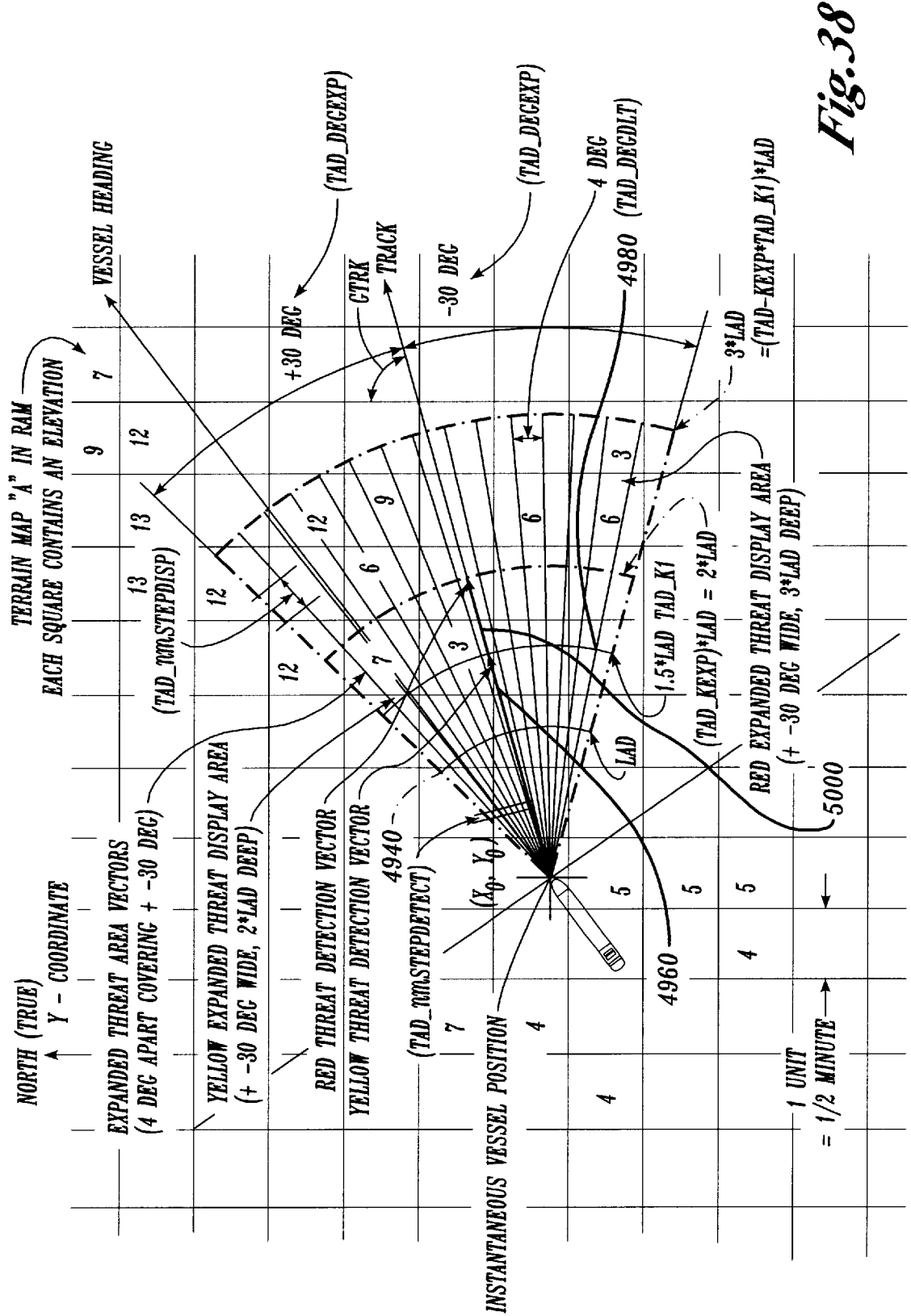
FIG. 38 is a terrain map illustrating the computation of the hazardous terrain.

Whenever the threat detection algorithm detects terrain along, for example, the look-ahead vector arrays 4900 and 4920 (FIG. 23), the offending terrain is painted in an expanded cone around the groundtrack as shown in FIG. 38. In particular, the expanded cone includes a plurality of vectors, spaced, for example, 4° apart (configurable value), for 90° (configurable value) on each side of the groundtrack. For an expanded terrain warning, the cone may be expanded out distances, for example as set forth in Table VI below.

TABLE VI (For an expansion factor of 2)

| TYPE OF THREAT | NORMAL | | EXPANDED | |
|---|---|---|---|---|
| | LOOK-AHEAD/ LOOK-DOWN | LOOK-UP | LOOK-AHEAD/ LOOK-DOWN | LOOK-UP |
| ADVISORY | 1.0* LAD | 2.0* LAD | 2.0* LAD | 4.0* LAD |
| WARNING | 0.5* LAD | 1.5* LAD | 1.0* LAD | 3.0* LAD |

The terrain threat is painted on the display 36 by calculating the starting vector angle DISPA as set forth in equation (29) when a terrain threat along the track has been detected.

$$DISPA = \text{ANTICIPATED TRACK} + 30 \text{ degrees} \quad (29)$$

The range increments are then determined as set forth in equations (30) and (31).

$$\text{DELTA } X_{NS} = \text{DISPLAY STEP SIZE} * \text{SIN}(DISPA) * 1/\text{COS (LATITUDE)} \quad (30)$$

$$\text{DELTA } Y_{NS} = \text{DISPLAY STEP SIZE} * \text{COS}(DISPA), \quad (31)$$

where the display step size is a configurable constant, for example ½ unit.

After the range increments DELTA $X_{NS}$ and DELTA $Y_{NS}$ are determined, the instantaneous position of the vessel $X_0$, $Y_0$ is incremented by the same and the range is incremented by the step size. The DEPTH is then determined for the current position on the terrain map. Subsequently, the threat detection algorithms are run for the distances as discussed above. Should a threat be detected, a color is loaded into a RAM B, identified with the reference numeral 5040 as shown in FIG. 36. At the end of the yellow and red threat vectors 4960 and 5000, the vector angle DISPA is incremented by 4 degrees with the above steps being repeated until all vectors are done.

In addition to the terrain detection and display algorithms, a background terrain algorithm is also executed relative to the terrain data in RAM A of FIG. 36 once every screen update, about 4 seconds. The background terrain algorithm simply compares the current depth of the vessel with the various terrain dpeth data in the RAM A. Any of the dot patterns 4320, 4340 and 4306 shown in FIG. 32 resulting from the computation are stored in the RAM B organized in a wedding-cake configuration according to FIG. 34, similar to the RAM A. In addition, the RAM B is organized in single byte cells containing the color/dot pattern as discussed above.

The color/dot pattern in the RAM B is transferred to the DSP memory RAM B*, identified with the reference numeral 5060, once per screen update (i.e. 4 sec) and synchronized to the DSP screen painting period. If a threat is detected as discussed above, a new RAM B image is transferred to the DSP RAM B* 5060 immediately. The image transfer time typically fits between two spokes. If not, the DSP will send an old spoke stored in its spoke memory 5080, 5100 twice.

The DSP then performs the RHO/THETA conversion on the data in RAM B* 5060 using the updated position, selected range and heading data from the 486, as discussed below. Changes in the selected range are implemented on the fly (i.e. the next spoke) without restarting the sweep.

One possible weather radar format includes 512 spokes covering a configurable scan range of typically 90 degrees and a range selected, for example, on a weather data control panel. In a preferred embodiment, each spoke is calculated twice, once for the left selected range and once for the right selected range. The spokes are then transmitted by way of a serial port 5120, interleaved left spoke and right spoke to bus switch 4060 by way of a pair of drivers 5140 and 5160.

The resolution of the scan conversion is 256 range bins; each range bin actually being a double range bin per the ARINC 708/453 standard format. Such a resolution is sufficient for the dot patterns illustrated in FIGS. 32 and 33.

Figure 39:
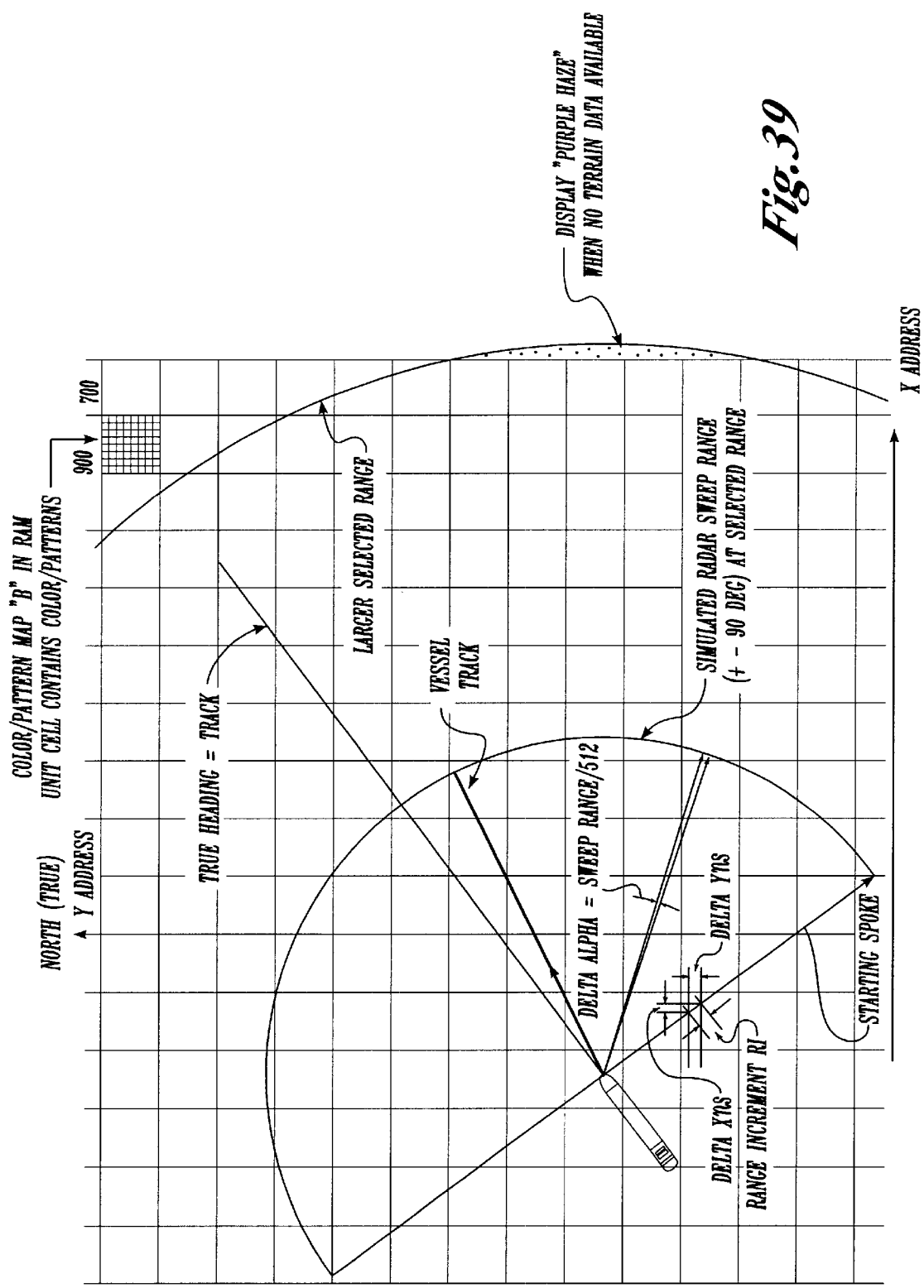
FIG. 39 is a diagram of a terrain map superimposed on a display screen illustrating the sweep range and the determination of the incremental range increments.

The RHO/THETA conversion is best understood with reference to FIG. 39. In particular, once per sweep (i.e. every 4 seconds) the range increment R1 is determined. The range increment is the selected range divided by 256. After the range increment is determined, the starting spoke angle is determined (e.g.., the vessel true heading plus 90 degrees). The incremental spoke angle DELTA ALPHA is determined. The incremental spoke angle DELTA ALPHA is the sweep range divided by 512; the total number of spokes per sweep.

Once per spoke (i.e. 512 times per 4 second sweep), the incremental range coordinates DELTA $X_{ns}$, DELTA $Y_{ns}$ are computed and the spoke angle is incremented by DELTA ALPHA, as discussed above. The incremental range increment coordinates $X_{ns}$ and $Y_{ns}$ are computed in accordance with equations (32) and (33), respectively.

$$\text{DELTA } X_{ns}=RI*\text{SIN (SPOKE ANGLE)}* 1/\text{COS (LATITUDE)} \quad (32)$$

$$\text{DELTA } Y_{ns}=RI*\text{COS (SPOKE ANGLE)} \quad (33)$$

Once per range increment (i.e. 512×256 times per 4 second sweep), the instantaneous position $X_0$, $Y_0$ is incremented by DELTA $X_{ns}$ and DELTA $Y_{ns}$. The color/pattern for the new position is looked up and output to the display 36. These steps are repeated for the rest of the spoke.

With the use of the DSP, two computations can be done in parallel. In particular, the color/pattern of each range bin including the conversion of the longitude to nautical miles (i.e. multiplication by 1/COS (LAT)). With reference to FIG. 39, this computation is performed relative to the true north map coordinate system with the vessel true heading pointing up and the spoke angles referenced to it. The second computation addresses each display indicator pixel in order to paint the required dot pattern, relative to the display screen coordinate system.

Figure 42:
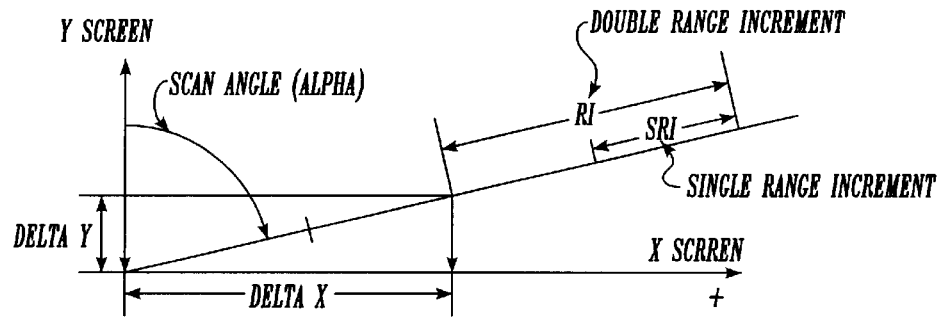
FIG. 42 is a diagram illustrating the determination of the X and Y increments of the display screen.
Figure 43:
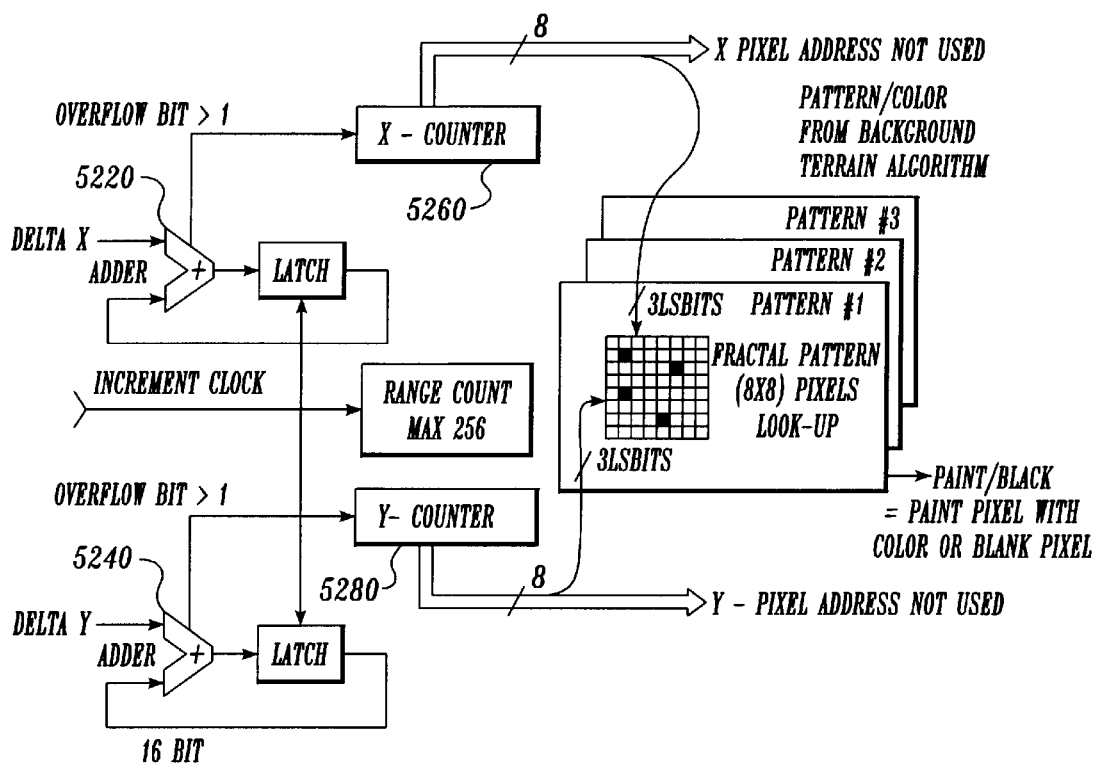
FIG. 43 is a diagram of the method for superimposing the fractal patterns on the displayed pixel map.

The generation of dot pattern is illustrated in FIGS. 41–43. In general, the scan conversion is simulated by overlaying each RHO/THETA range bin over a calculated indicator pixel map which includes corrections for display aspect ratio using fractal 8×8 dot patterns.

The fractal patterns corresponding to the variable density dot patterns 4320, 4340 and 4360 of FIG. 32 are illustrated in FIG. 41. The fractal pattern size is selected to be 8×8 pixels. The densest pattern 4320 includes ½, or 32, of the 64 pixels are filled. In the medium density pattern 4340, 16, or ¼, of the pixels are filled. In the least dense pattern 4364, 4 or ¹⁄₁₆, of the pixels are filled.

As illustrated in FIG. 40, the display screen is divided into a pixel map, having for example, 256×256 pixels 5200. As mentioned above, the 8×8 fractal patterns are overlaid onto the pixel map to provide the variable density dot patterns 4320,4340 and 4360 illustrated in FIG. 32.

The computation of the dot patterns is best understood with reference to FIGS. 40, 42 and 43. Using an X-Y coordinate system, each spoke is determined at the bottom center of the display 36. For a 256×256 pixel display, the starting point corresponds to 120, 0. Next, the incremental X and Y coordinates relative to the scan angle ALPHA are determined according to equations (34) and (35).

$$\text{DELTA } X=RI*\text{SIN (ALPHA)} \quad (34)$$

$$\text{DELTA } Y=RI*\text{COS (ALPHA)}, \quad (35)$$

where RI=a double range increment and ALPHA=the scan angle. These increments are added to the starting point 128, 0. After each increment, the selected fractal pattern is looked up in the RAM B * to determine whether to send the last range increment as either block or colored.

In FIG. 43, the increments DELTA X and DELTA Y are applied to a pair of adders 5220 and 5240, which, in turn, are applied to an X-counter 5260 and a Y-counter 5280. The X counter 5260 starts at 128 and counts up if DELTA X>0. If DELTA X<0, the X-counter counts down, indicating a pixel on the left (FIG. 40) of the starting position. Since the starting pixel is at the bottom of the display, the Y-counter 5280 starts at zero and always counts up. A range counter 5280 counts up to 256; the maximum number of double range bins. The range counter 5280 is driven by an increment clock such that the pattern/color is painted once per range increment. The output indicates whether the pixel is to be painted or left blank.

The background terrain algorithm determines the particular fractal pattern to be used. This data is applied to the DSP to enable the pixels on the pixel map (FIG. 10) to be painted or left blank. In particular, the three least significant bits from the X counter 5260 and Y counter 5280 are used to select the fractal pattern as shown.

The scan conversion simulation is performed in parallel with the RHO/THETA conversion which determines the color/dot pattern of the range bin to be transmitted. The color/dot pattern provided by the RHO/THETA conversion is then overlaid with the fractal dot pattern to determine whether the range bin color should be black or painted to provide the proper dot pattern on the display.

Figure 44:
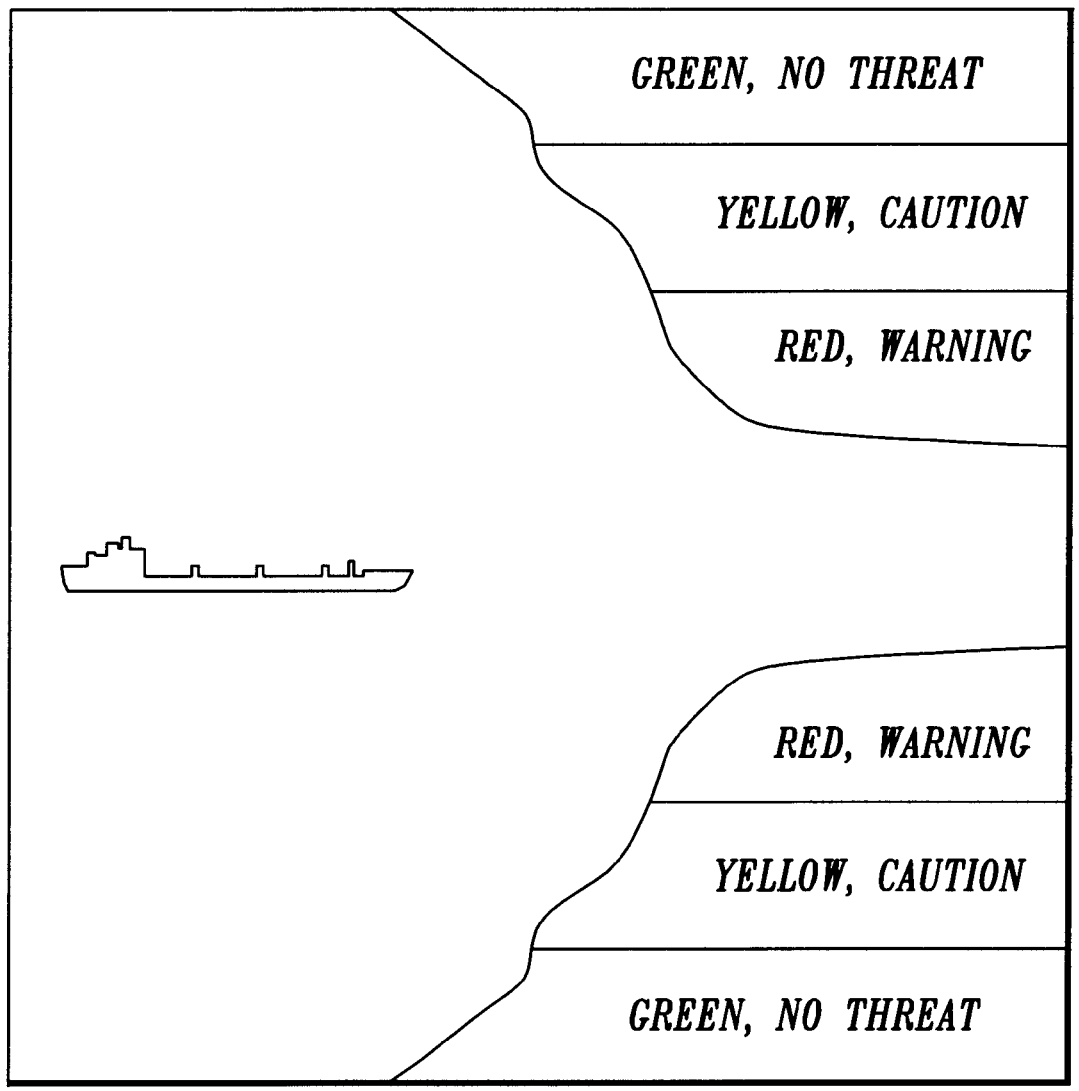
FIG. 44 is a diagram of a three dimensional terrain display according to an embodiment of the present invention.

In an alternate embodiment of the invention, display 36 may also show the terrain/obstacles in a three dimensional view in the in lieu of, or in addition to the plan view described above. FIG. 44 shows one embodiment of display 36 on which terrain 6000 and overhead obstacles 6001 are shown in profile view, color coded to show degree of threat and depicted relative to the position of vessel 100, indicated by a vessel or other suitable symbol.

Appendix 1

Terrain Data Structure

The terrain data format is made up of four distinct parts, the file indirection table, the group index, the data index, and the compressed elevation data itself. Notes: All multi-byte numbers are stored Little Endian (LSB . . . MSB)

File Indirection Table

A file indirection table is provided at the top of the index file block. The file index field is each data index is used to index into this table to get the ASCII filename for file system usage. This filename is then mapped be the file system to the correct 128 kbyte physical memory block. A time stamp is provided for each file, this can be used to match to the time stamp in the file header for each file. This helps check for consistency between the index files and the data files.

```
SIZE         16-bits - unsigned
             Number of filenames defined:
             Repeated for each filename
FILE NAME    16-bytes - ASCII
             ASCII filename with the extension included
             <Drive>:<File 8>.<Ext 3>
TIME STAMP   32 bits - unsigned
             The number of seconds since January 1, 1980
             (DOS's time base).
```

Group Index

The group index is used to reduce the number of data indexes which must be searched to find the area of interest. The group indexes are built by dividing the earth into TBD bands or geographic areas of 5° latitude by 10° longitude. These bands need not be of equal size. The group index points to the corresponding data index block to use for this area. The area covered by the group is preferably a rectangle. Note: the group index and data index occupy the same file.

```
Definitions
SIZE         16-bits - unsigned
             Number of groups
The following is repeated for each group defined:
INDEX        32-bits - unsigned
             |-------------|---------------|
             | 12 - bits | 20 - bits   |
             | File Index | offset |
             File Index: Always 0 for group index
             offset: offset in bytes to start of index file for this group
LAT MAX      24-bits - signed
             NW corner latitude
             Scaling: LSB = 180/2^23
             Sign: (+) = North, (−) = South
LAT MIN      24-bits - signed
             SB corner latitude
             Scaling: LSB = 180/2^23
             Sign: (+) = North, (−) = South
LON MIN      24-bits - signed
             NW corner longitude
             Scaling: LSB = 180/2^23
             Sign: (+) = East, (−) = West
LON MAX      24-bits - signed
             SE corner longitude
             Scaling: LSB = 180/2^23
             Sign: (+) = East, (−) = West
Memory Usage 16 bytes per group
             Assume 648 groups worst case = 10,368 bytes
```

Data Index

The data index contains information defining the coverage, resolution and storage location of each individual terrain data file. The data indexes are grouped together per the group index defined above (i.e. group 2's data indexes immediately follow group 1's data

```
Definitions
SIZE         16-bits - unsigned
             Number of indexes
The following is repeated for each index defined:
INDEX        32-bits - unsigned
             |-------------|---------------|
             | 12 - bits | 20 - bits   |
             | File Index | offset |
             File Index: Filename index for data
             offset: offset in bytes to start of index file for this group
LAT MAX      24-bits - signed
             NW corner latitude
             Scaling: LSB = 180/2^23
             Sign: (+) = North, (−) = South
LAT RES      8-bits - unsigned
             Number of rows per 1 degree
LAT M1N      24-bits - signed
             SE corner latitude
             Scaling: LSB = 180/2^23
LON MIN      24-bits - signed
             NW corner longitude
             Scaling: LSB = 180/2^23
             Sign: (+) = East, (−) = West
LON RES      8-bits - unsigned
             Number of columns per 1 degree
LON MAX      24-bits - signed
             SE corner longitude
             Scaling: LSB = 180/2^23
Memory Usage 18 bytes index (terrain file)
             Assume 8000 files = 144k-bytes
```

Data

The following defines the format for the actual depth (aka elevation) data. The index files above are used to locate the desired elevation file, and also contain information on the location, resolution etc.

Note: for all data types below, the return depth values at 16 bit singed values.

First value is always compression type as defined below:

COMPRESSION TYPE: 8 bits-unsigned

Compression:
    0=no compression
    1=HUFFCODE—type 1
    2=RLE—BYTE
    3=Run length word
    4=constant elevation (RLE-single)
    5=RLE—DYNAMIC For type 0, no compression, the uncompressed depth/elevation values are stored directly.

The following definition is for the HUFFCODE compressed data format:

The top of the data contains the decode tables needed to uncompress the terrain data.

Note: Decompression needs the Number of X and Y values of decoded file (from index file).

```
FIRSTCODE SIZE   1 byte - unsigned
                 Size in bytes of firstcode and symbol pointer
                 tables (max 32 bytes)
FIRSTCODE TAB    n bytes - unsigned
                 Firstcode table
```

| | |
|---|---|
| SYMBOL POINTER TABLE | n words - unsigned<br>Used with Firstcode table to index into symbol table. |
| SYMBOL SIZE | 1 word - unsigned<br>Size in bytes of symbol table (max 256 words) |
| SYMBOL TAB | n words - signed<br>Symbol table. Contains decoded symbol |
| FIRSTVALUE | 1 word - signed<br>First elevation value. Used by linear predictor |
| Note: typical words decode table size is less than 150 bytes. | |
| ELEVATIONS | Compressed elevation values in binary<br>Note: padded to align on byte boundary currently. |

For Compression type 4, (water/same elevation value), only 3 bytes are needed. The compression type byte defined above, and the 16 bit elevation value. This is used for files that contain only one elevation value. This will typically be used for "no-elevation" areas.

Build System

FIGS. 36 and 37 show a preliminary look at the steps to build the Terrain database from the original source data.
1. Currently basic input file is 1 degree at 30 arc-seconds. This matches NOAA data. System should be built to handle any file size.
2. Build system uses a control file automatically generated from a port database and a NOAA provided worldwide terrain file. Control file contains a list of every 1 degree quad, and what the desired resolution of that 1 degree file should be. Resolution is determined by proximity to a port or shoreline and the minimum depth value of that file. 1 of 3 resolutions are currently output, 30, 60, and 120 arc-seconds. In addition, the control file will indicate which 1 degree quads can be combined into one file. This is done for lower resolution quads in an attempt to keep the file sizes even and reduce the number of files.
3. Some files will need a special extrusion run on them. This will be defined in a separate control file.

Grouping and packaging control files are needed to ensure that the build system groups the files into the correct structure.

Notes on "Terrain Data Embedded Format"

Maps are read from the file system, decompressed, and then used to update "RAM A" as the vessel moves across it. Due to the slow speed of the decompression, two RAM As are used. The detection and display algorithm uses one RAM A while the file picker updates the other RAM A with the latest maps. After the file picker has updated its RAM A, the RAMs are swapped and the process starts over.

The file picker process starts by the TAD asking the file system to open a file with a known, fixed name ("TERRAIN.BMI"). This file contains the file indirection table, the group index table, and the data index tables. The TAD then periodically scans the group index table to find map groups that cover the general vicinity of the aircraft. This step quickly reduces the number of maps that need to be considered for decompression from several thousand down to a few hundred. It identifies candidate groups by comparing the group bounding box stored in the group index table entry against the vessel's current position. The number of group index table entries is stored at the top of the table, and all the entries immediately follow.

When a candidate group is found, the TAD uses the <fileindex> in the group index table entry to locate the file containing the data index tables. If the number is zero (the usual case), it indicates that the data is in the main index file (the one we are already reading). A future option would be to make the number non-zero. It would then identify a secondary index file named in the file indirection table. Once the file containing the data index table is opened, the TAD seeks to the <offset> in the group index table entry and starts reading the data index table for that group.

Each data index table begins with its number of entries. The TAD scans each of the data index table entries looking for any of the maps needed for the current vessel position.

If a data index table entry is found to describe one of the maps we need, the TAD uses the <fileindex> to get the name of the map package file from the file indirection table. A map package file is a concatenation of a couple hundred compressed maps. From there it reads the compression type and calls the correct decompression algorithm to decompress the file. The decompressed data is then up-sampled or down-sampled into the appropriate tiers of RAM A. When up-sampling (filing higher resolution tiers with lower resolution data), the highest resolution data is used. To support this TAD must keep track of the current resolution used to fill each cell of RAM A. For down-sampling the shallowest elevation is always used. The enroute tier of RAM A is always filled with only enroute data. When all map files within the vessel's area have been processed RAM A is released.

That which is claimed:

1. An apparatus for alerting the user of a surface marine vessel of proximity to terrain, said apparatus comprising:
   an input for receiving signals representative of a position, speed, and a track of the surface marine vessel, and coupled to a data base of stored terrain information;
   an output; and
   a signal processing device coupled to said input and said output, for
      defining a look ahead distance as a function of the speed of the surface marine vessel;
      defining a first alert envelope indicative of a first level of terrain proximity alert, wherein boundaries of the first alert envelope are determined as a first function of the track, look ahead distance, and a terrain floor boundary;
      defining a second alert envelope indicative of a second level of terrain proximity alert, wherein boundaries of the second alert envelope are determined as a second function of the track, look ahead distance, and the terrain floor boundary; and
      outputting an alert signal when a subset of the stored terrain information is located within the boundaries of at least one of the first and second alert envelopes.

2. An apparatus according to claim 1, wherein said signal processing device defines at least one of the first and second envelopes to be bounded by a cutoff envelope.

3. An apparatus according to claim 1, wherein said signal processing device further defines at least one of the first and second envelopes as a function of a configurable datum.

4. An apparatus according to claim 1, wherein said signal processing device further defines at least one of the first and second envelopes to include a subset of alert envelopes representing various severities of hazard to the surface marine vessel.

5. An apparatus according to claim 1, wherein said signal processing device comprises a microprocessor.

6. An apparatus according to claim 1, wherein said signal processing device comprises a means for outputting the alert signal as a video control signal, wherein the video control signal is useful for controlling representations of terrain on a video display in various colors according to a degree of terrain threat.

7. An apparatus according to claim 1 further comprising a voice warning generator coupled to said signal processing device, and wherein the alert signal output from said signal processing device comprises an audio control signal to command said voice warning generator to output an aural alert.

8. A method for alerting the user of a surface marine vessel of proximity to terrain comprising the steps of:
   accessing a database of terrain information;
   receiving signals representative of a position, speed, and a track of the surface marine vessel;
   defining a look ahead distance as a function of the speed of the surface marine vessel;
   defining a first alert envelope indicative of a first level of terrain proximity alert, wherein boundaries of the first alert envelope are determined as a first function of the track, look ahead distance, and a terrain floor boundary;
   defining a second alert envelope indicative of a second level of terrain proximity alert, wherein boundaries of the second alert envelope are determined as a second function of the track, look ahead distance, and the terrain floor boundary; and
   outputting an alert signal when a subset of the stored terrain information is located within the boundaries of at least one of the first and second alert envelopes.

9. A method according of claim 8, wherein said step of outputting an alert signal further comprises the step of outputting a video control signal to control display of terrain on a display device.

10. A method according to claim 8 further comprising the step of defining a cut off envelope to form a boundary of at least one of the first and second alert envelopes.

11. A method according to claim 8, wherein said outputting step comprises outputting an audio control signal to generate an aural alarm.

12. A method according to claim 8, wherein at least one of said defining an alert envelope steps comprises defining at least one of the first and second envelopes as a function of a configurable datum.

13. A method according to claim 8, wherein at least one of said defining an alert envelope steps comprises defining at least one of the first and second envelopes to include a subset of alert envelopes representing various severities of hazard to the surface marine vessel.

14. A computer program product for alerting the user of a surface marine vessel of proximity to terrain, wherein the computer program product comprises:
   a computer readable storage medium having computer readable program code means embodied in said medium, said computer-readable program code means comprising:
      first computer instruction means for accessing a database of terrain information;
      second computer instruction means for receiving signals representative of a position, speed, and a path angle of the surface marine vessel;
      third computer instruction means for defining a look ahead distance as a function of the speed of the surface marine vessel;
      fourth computer instruction means for defining a first alert envelope indicative of a first level of terrain proximity alert, wherein boundaries of the first alert envelope are determined as a first function of the path angle, look ahead distance;
      fifth computer instruction means for defining a second alert envelope indicative of a second level of terrain proximity alert, wherein boundaries of the second alert envelope are determined as a second function of the track, look ahead distance, and the terrain floor boundary; and
      sixth computer instruction means for outputting an alert signal when a subset of the stored terrain information is located within the boundaries of at least one of the first and second alert envelopes.

15. A computer program product according to claim 14, wherein said sixth computer instruction means further outputs a video control signal to control display of terrain on a display device.

16. A computer program product according to claim 14, further comprising seventh computer instruction means for defining a cut off envelope to form a boundary of at least one of the first and second alert envelopes.

17. A computer program product according to claim 14, wherein said sixth computer instruction means further outputs an audio control signal to generate an aural alarm.

18. A computer program product according to claim 14, wherein said at least one of said fourth and fifth computer instruction means defines at least one of the first and second envelopes as a function of a configurable datum.

19. A computer program product according to claim 14, wherein said at least one of said fourth and fifth computer instruction means defines at least one of the first and second envelopes to include a subset of alert envelopes representing various severities of hazard to the surface marine vessel.

20. The computer program product of claim 14 further comprising a seventh computer instruction means for defining an avoidance maneuver and outputting an avoidance guidance signal when said stored terrain information is located within the boundaries of at least one of said first or said second alert envelopes.

21. The computer program product of claim 20 further comprising an eighth computer instruction means for preventing output of said alert signal when said avoidance guidance signal is output.

22. The computer program product of claim 15 wherein said video control signal includes a signal to display said terrain in profile view.

23. The apparatus of claim 1 where said signal processing device determines an avoidance maneuver and outputs an avoidance guidance signal when said subset of terrain information is located within the boundaries of said first or said second alert envelopes.

24. The apparatus of claim 6 wherein said video control signal is useful for controlling said representations of terrain in profile view.

25. The method of claim 8 further comprising the step of outputting an avoidance guidance signal when said terrain information is located within the boundaries of said first or said second alert envelopes.

26. The method of claim 8 wherein said step of outputting a video control signal includes a signal to display terrain in profile view.

* * * * *